United States Patent
Benoit et al.

(10) Patent No.: US 9,100,382 B2
(45) Date of Patent: Aug. 4, 2015

(54) NETWORK SECURITY CONFIGURATION USING SHORT-RANGE WIRELESS COMMUNICATION

(71) Applicant: QUALCOMM Incorporated, San Diego, CA (US)

(72) Inventors: Olivier Jean Benoit, San Diego, CA (US); Anand Palanigounder, San Diego, CA (US); Sai Yiu Duncan Ho, San Diego, CA (US); Aram Perez, San Diego, CA (US); Bibhu Prasad Mohanty, San Diego, CA (US); Etan Gur Cohen, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/843,395

(22) Filed: Mar. 15, 2013

(65) Prior Publication Data
US 2013/0254519 A1   Sep. 26, 2013

Related U.S. Application Data

(60) Provisional application No. 61/613,438, filed on Mar. 20, 2012, provisional application No. 61/637,234, filed on Apr. 23, 2012.

(51) Int. Cl.
*G06F 13/00* (2006.01)
*H04L 29/06* (2006.01)
(Continued)

(52) U.S. Cl.
CPC .......... *H04L 63/062* (2013.01); *G06F 11/3051* (2013.01); *H04W 12/04* (2013.01); *G06F 13/10* (2013.01); *H04L 63/08* (2013.01); *H04W 4/008* (2013.01); *H04W 12/06* (2013.01)

(58) Field of Classification Search
CPC .............................. G06F 11/3051; G06F 13/10
See application file for complete search history.

(56) References Cited

U.S. PATENT DOCUMENTS 7,350,076 B1   3/2008   Young et al.
8,001,584 B2   8/2011   Lortz et al.
(Continued)

FOREIGN PATENT DOCUMENTS

CN   104205899       12/2014
EP   1881663 A1 *   1/2008
(Continued)

OTHER PUBLICATIONS

International Search Report and Written Opinion—PCT/US2013/033161—ISA/EPO—Jun. 6, 2013.
(Continued)

*Primary Examiner* — Zachary K Huson
(74) *Attorney, Agent, or Firm* — DeLizio Law, PLLC

(57) ABSTRACT

A configuration device is disclosed for configuring a network device in a communication network. The configuration device initiates pairing operations with the network device via a short-range communication connection. The configuration device determines whether the network device is in a registered state or an unregistered state. If the configuration device determines that the network device is in the unregistered state, the configuration device establishes a secure short-range communication channel between the configuration device and the network device. The configuration device transmits a network key to the network device via the secure short-range communication channel for configuring the network device to communicatively connect to the communication network. If the configuration device determines that the network device is in the registered state, the configuration device determines whether to unregister the network device.

68 Claims, 24 Drawing Sheets

(51) Int. Cl.
*G06F 11/30* (2006.01)
*H04W 12/04* (2009.01)
*G06F 13/10* (2006.01)
*H04W 12/06* (2009.01)
*H04W 4/00* (2009.01)

(56) References Cited

U.S. PATENT DOCUMENTS

| | | | |
|---|---|---|---|
| 8,364,963 | B2 | 1/2013 | Lind et al. |
| 8,583,915 | B1 | 11/2013 | Huang |
| 2009/0222659 | A1 | 9/2009 | Miyabayashi et al. |
| 2009/0227282 | A1 | 9/2009 | Miyabayashi et al. |
| 2010/0318795 | A1 | 12/2010 | Haddad et al. |
| 2011/0116631 | A1 | 5/2011 | Shon et al. |
| 2011/0210831 | A1 | 9/2011 | Talty et al. |
| 2011/0275316 | A1 | 11/2011 | Suumäki et al. |
| 2012/0077432 | A1 | 3/2012 | Rose et al. |
| 2012/0167176 | A1 | 6/2012 | Hwang et al. |
| 2014/0047510 | A1 | 2/2014 | Belton et al. |

FOREIGN PATENT DOCUMENTS

| | | |
|---|---|---|
| EP | 1898570 A1 | 3/2008 |
| EP | 1993301 A1 | 11/2008 |
| GB | 2411086 B | 12/2006 |
| KR | 1020147029199 | 12/2014 |

OTHER PUBLICATIONS

Co-pending U.S. Appl. No. 61/613,438, filed Mar. 20, 2012, 22 pages.
Co-pending U.S. Appl. No. 61/637,234, filed Apr. 23, 2012, 60 pages.
"Wi-Fi Protected Access (WPA) in a Cisco Unified Wireless Network Configuration Example", Feb. 26, 2008, 24 pages.
"PCT Application No. PCT/US2013/033161 International Preliminary Report on Patentability", Oct. 2, 2014, 8 pages.
"Wi-Fi Alliance: "Wi-Fi Certified for Wi-Fi Protected Setup, Easing the User Experience for Home and Small Office Wi-Fi Networks"", Internet Citation, XP002567243, Retrieved from the Internet: URL:http://www.wi-fi.org/wp/wifi-protected-set, 2007, pp. 1-16.

\* cited by examiner

NETWORK SECURITY CONFIGURATION USING SHORT-RANGE WIRELESS COMMUNICATION

RELATED MATTERS

This application claims the priority benefit of U.S. Provisional Application No. 61/613,438 filed on Mar. 20, 2012 and U.S. Provisional Application No. 61/637,234 filed on Apr. 23, 2012.

BACKGROUND

Embodiments of the inventive subject matter generally relate to the field of communication networks, and, more particularly, to network security configuration using short-range wireless communication.

In communication networks, a secure association between devices in a communication network can be accomplished using a push button configuration and/or a user configured passphrase/key, etc. In the push button configuration, a user can push a button on each of the devices within a certain time and the devices can associate with each other. In the user configured passphrase/key technique, the user can enter an ASCII encoded passphrase with specified rules which can either be converted to a communication network key or directly configured as the network key. However, it is cumbersome to enter the user configured passphrase/key manually into multiple network devices. Also, the user configured passphrases are susceptible to dictionary attacks and network keys are often too complex to configure manually. The push button configuration is not very secure, and with physical access to a device in the network, the push button can be triggered to associate a device under control of malicious users to associate with the devices in the network and thereby obtain security settings associated with the network.

SUMMARY

Various embodiments are disclosed for configuring a network device. In one embodiment, a configuration device initiates pairing operations with the network device of a communication network via a short-range communication connection with the network device. The configuration device determines whether the network device is in a registered state or an unregistered state. If the configuration device determines that the network device is in the unregistered state, the configuration device establishes a short-range communication channel between the configuration device and the network device. The configuration device transmits a network key to the network device via the short-range communication channel for configuring the network device to communicatively connect to the communication network. If the configuration device determines that the network device is in the registered state, the configuration device determines whether to unregister the network device.

DESCRIPTION OF EMBODIMENT(S)

Figure 1:
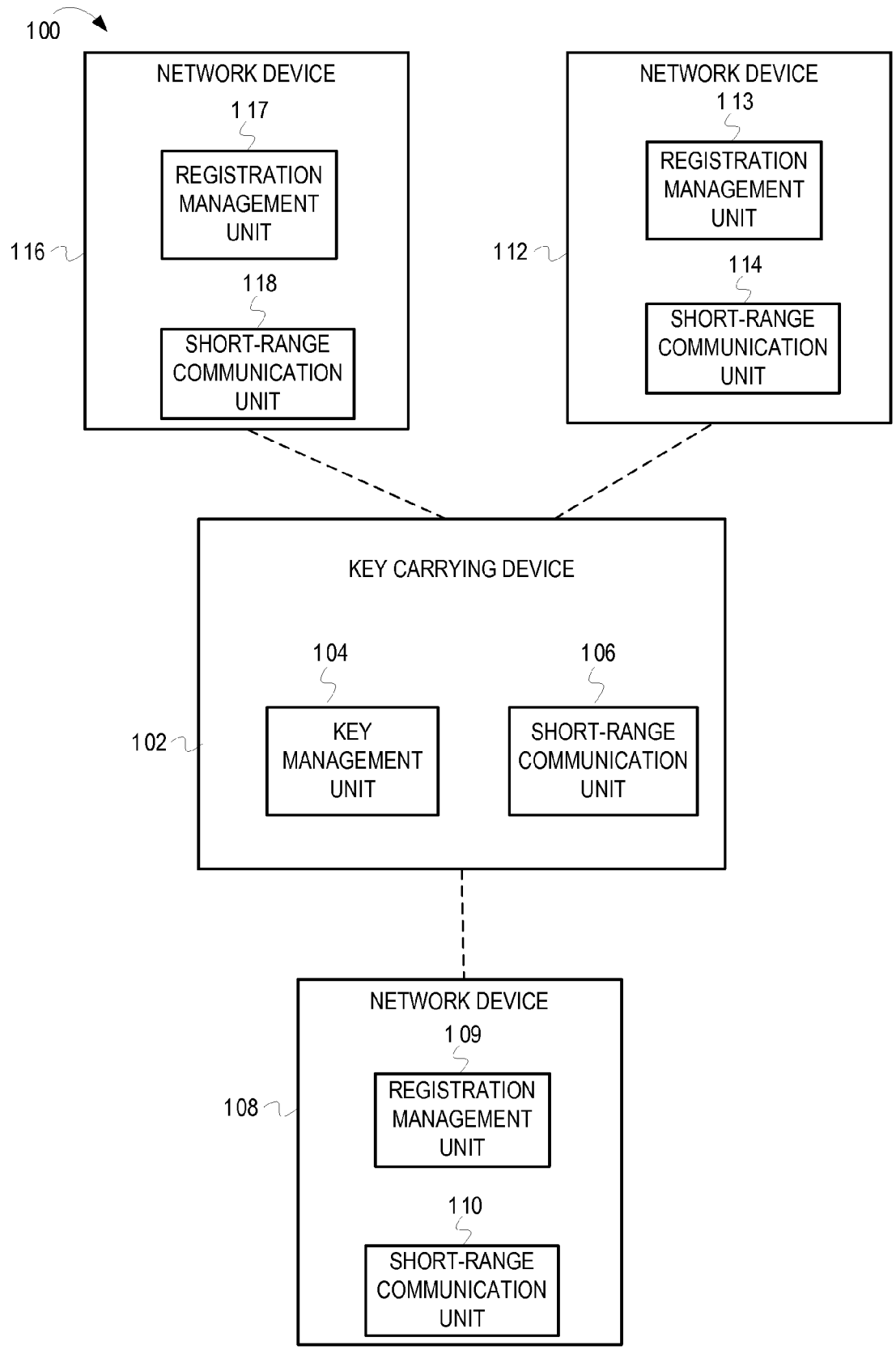
FIG. 1 depicts an example block diagram of a key carrying device and network devices in a communication network.

The description that follows includes exemplary systems, methods, techniques, instruction sequences and computer program products that embody techniques of the present inventive subject matter. However, it is understood that the described embodiments may be practiced without these specific details. For instance, although examples refer to a key carrying device securely configuring a network device in a communication network, in other implementations the key carrying device may configure multiple network devices in one or more communication networks simultaneously. In other instances, well-known instruction instances, protocols, structures and techniques have not been shown in detail in order not to obfuscate the description.

In some embodiments, a key carrying device with support for short-range communication can securely configure network devices of a communication network by sending a network key to the network devices over a secure communication channel. The key carrying device can register a network device with the key carrying device by exchanging pairing data and storing pairing data at the network device and/or the key carrying device. The key carrying device can securely configure the network device with the communication network by sending the network key of the communication network to the network device once the network device is registered with the key carrying device. The key carrying device can also unregister the network device from the key carrying device by deleting the pairing data and the network key stored at the network device and/or the key carrying device.

In some embodiments, the key carrying device can utilize one or more configuration techniques to securely configure the network device. For example, in a first configuration technique, the key carrying device can register the network device with the key carrying device by storing an integrity key, an encryption key and a sequence number as pairing data at both the key carrying device and the network device. Also, the key carrying device can store a device identifier of the network device as a part of the pairing data, and the network device can store the device identifier of the key carrying device as a part of the pairing data. In a second configuration technique, the key carrying device and the network device can pair by storing a public key of the key carrying device as pairing data at the network device. In both the first and the second configuration techniques, the key carrying device can then exchange one or more messages with the network device to determine whether the network device is in the registered state or the unregistered state, and to accordingly register or unregister the network device (or maintain current configuration). In a third configuration technique, the key carrying device and the network device can pair by storing a secret key (e.g., a registration key) as pairing data. The key carrying device can securely exchange one or more messages to determine whether the network device is in the registered state or the unregistered state based on the pairing data. In one example, the key carrying device and the network device can utilize a hashing algorithm to securely exchange messages that include the pairing data (e.g., the registration key) and/or a network key. Based on determining whether the network device is in the unregistered state or the registered state, the key carrying device can accordingly register or unregister the network device (or maintain current configuration). In a fourth configuration technique, the key carrying device and the network device can pair by storing a secret key (e.g., a registration key) at both the key carrying device and the network device, and a status field at the network device as pairing data. In the fourth configuration technique, the network device can securely exchange one or more messages that include the pairing data (e.g., the registration key) and/or the network key with the key carrying device using a hashing algorithm. The network device can indicate to the key carrying device whether the network device is in the registered state or the unregistered state using the status field, and can accordingly determine whether to register or unregister the network device. In a fifth configuration technique may be similar to the fourth configuration technique, except that the network device and the key carrying device can establish a secure communication channel before exchanging any messages that include the pairing data and/or a network key. The network device and the key carrying device can securely exchange messages that include the pairing data and/or the network key over the secure communication channel. The configuration techniques that utilize the key carrying device to securely configure the network device will be further described below with reference to FIGS. 1-24.

FIG. 1 depicts an example block diagram of a key carrying device and network devices in a communication network. FIG. 1 depicts a communication network 100. For example, the communication network 100 may be a home or enterprise network system using one or more network communication standards (e.g., a network system based on one or more of IEEE 802.3, IEEE 802.11 or Wi-Fi®, IEEE P1905.1, Broadband over Power Line network standards, Ethernet over Coaxial cable, ZigBee® or IEEE 802.15.4, etc.). The communication network 100 includes a key carrying device 102 having a key management unit 104 and a short-range communication unit 106. The communication network 100 also includes a network device 108 having a registration management unit 109 and a short-range communication unit 110, a network device 116 having a registration management unit 117 and a short-range communication unit 118, and a network device 112 having a registration management unit 113 and a short-range communication unit 114. In one implementation, the key carrying device 102 may include a communication unit (e.g., an integrated circuit, system-on-a-chip, or a circuit board) that includes the key management unit 104 and the short-range communication unit 106.

The key carrying device 102 may be one of various types of network devices with support for short-range communication and managing the communication network 100, e.g., a mobile phone, a tablet computer, a notebook computer, a smart remote control device, etc. The key carrying device 102 typically includes a display unit to display to the user the status of a network device, registration confirmation, unregistration confirmation, etc. The short-range communication unit 106 in the key carrying device can establish an out-of-band communication link (i.e., a communication link in a different frequency band than that used by the communication network 100) with the network devices 108, 116 and 112. In one implementation, the short-range communication unit 106 can establish a near field communication (NFC) link as the out-of-band communication link and utilize Near Field Communication Interface and Protocol (e.g., NFCIP). In other implementations, the short range communication unit 106 can establish communication using other short-range communication technologies/protocols (e.g., Bluetooth®, etc.).

The key management unit 104 of the key carrying device 102 can exchange one or more messages with a network device (e.g., the network device 116, 112 or 108) to securely configure the network device. In some implementations, the key carrying device 102 may have capabilities of configuring network devices in multiple communication network systems at the same time. The key management unit 104 can establish a secure communication channel with a network device. For example, the secure communication channel can support encryption of messages, integrity protection for messages and protect against replay attacks by malicious key carrying devices. In one implementation, when the short-range communication unit 106 establishes the NFC link, the key management unit 104 establishes a secure communication channel (e.g., via NFC-SEC Cryptography Standard using Elliptic curve Diffie-Hellman (ECDH) and Advanced Encryption Standard (NFC-SEC-01)). It is noted, however, that in other implementations other secure channel techniques can be utilized (for example, the Registration protocol specified in Wi-Fi Simple Configuration (WSC)). In some implementations, the key management unit 104 can establish the secure communication channel with integrity and replay protection using a secure channel key and sequence numbers (e.g., generated using a sequence number counter). The sequence numbers allow the key carrying device 102 and a network device (e.g., the network device 112) to keep track of exchanged messages and provide protection against replay attacks. For example, each exchanged message can include a sequence number generated by the sequence number counter, and the sequence number counter can be incremented on sending/receiving a message. The key carrying device 102 and the network device 112 can determine whether a received message is associated with a sequence number that is less than or equal to the current value of the sequence number counter. If the received message is associated with a sequence number that is less than or equal to current value of the sequence number counter, the stale sequence number can indicate a replay attack by a malicious device. The key management unit 104 can then ignore received messages with stale sequence numbers in order to avoid replay attacks. The key carrying device 102 and the network device 112 are not limited to utilizing sequence numbers to detect replay attacks. In some implementations, the key carrying 102 and the network device 112 can utilize time-stamps to detect replay attacks.

The key management unit 104 of the key carrying device 102 includes capabilities to generate and store one or more network keys, and is capable of sending/receiving a network key to/from a network device. For example, when a network device is configured with the communication network 100 and a user uses the key carrying device 102 for the first time to register the network device, the key management unit 104 may receive the network key of the communication network 100 from the network device and store the network key. In one implementation, the user may register one or more network devices configured with the communication network 100 with the key carrying device 102, and a network key may not be transferred between the network devices and the key management unit 104. In another implementation, the user may register a network device (not configured with the communication network 100) with the key carrying device 102, and the key management unit 104 can send the network key of the communication network 100 to the network device. In some implementations, in the absence of the communication network 100, neither the key carrying device 102 nor any of the network devices may have a network key and the user may register one or more network devices with the key carrying device 102. The key management unit 104 may generate a new random network key and send the network key to each of the network devices registered with the key carrying device 102 and set up a communication network. In some implementations, instead of generating the new random network key, the key management unit 104 may receive a network key from a network administrator, or from a network device via another out-of-band communication link. The key management unit 104 can store information about the network devices registered with the key carrying device 102. Also, the key management unit 104 can store pairing information and information about the secure communication channel (e.g., secure channel keys) for each of the network devices registered with the key carrying device 102. For example, the key management unit 104 may store secure channel keys corresponding to a device identifier of a network device in a table at the memory of the key carrying device 102. In some implementations, the key carrying device 102 can support functions to export, import, and backup settings and information of the key carrying device 102 to a second key carrying device or to a server in the network. The second key carrying device can then be used to configure one or more network devices. Additional features and operations of the key carrying device 102 with respect to various network configuration techniques will be further described below with reference to FIGS. 2-23).

The network devices 108, 112 and 116 can be various types of network devices in the communication network 100 e.g., a laptop computer, a television, a camera, a game console, a digital thermostat, an electronic door lock, etc. In some implementations, the network devices 108, 112 and 116 may be multi-homed devices and may be configured with multiple communication network systems at the same time. In one example, the network devices 108, 112 and 116 may be devices in an IEEE P1905.1 communication network. In some implementations, the short-range communication units 118, 114, and 110 of the network devices 116, 112, and 108 respectively can establish a short-range communication link (e.g., an NFC link) with the short-range communication unit 106 of the key carrying device 102. The network devices 108, 112 and 116 include capabilities to receive a network key from the key management unit 104 and register with the key carrying device 102, as will be further described below. For example, the registration management units 117, 113, and 109 in the network devices 116, 112, and 108 respectively can register with the key carrying device 102 and receive a network key from the key carrying device 102. In some implementations, the key management unit 104 in the key carrying device 102 may request a network key from the network devices 116, 112 and 108. When the key carrying device requests for the network key, the registration management units 117,113, and 109 in the respective network devices 116, 112 and 108 can send the network key to the key management unit 104. The network devices 108, 112 and 116 may be reset by deleting pairing data corresponding to the key carrying device 102 and thereby unregistering from the key carrying device 102. For example, the network devices 108, 112 and 116 can be reset via hardware (e.g., a reset button, etc.) or via software (e.g., program instructions, etc.). In some implementations, the network devices 108, 112 and 116 can include light emitting diodes (LEDs) to display their state through different colors (e.g., red color for an un-registered state, green color for a registered state and yellow color when a registration process is in progress). Additional features and operations of the network devices 108, 112 and 116 with respect to various network configuration techniques will be further described below with reference to FIGS. 2-23).

Figure 2:
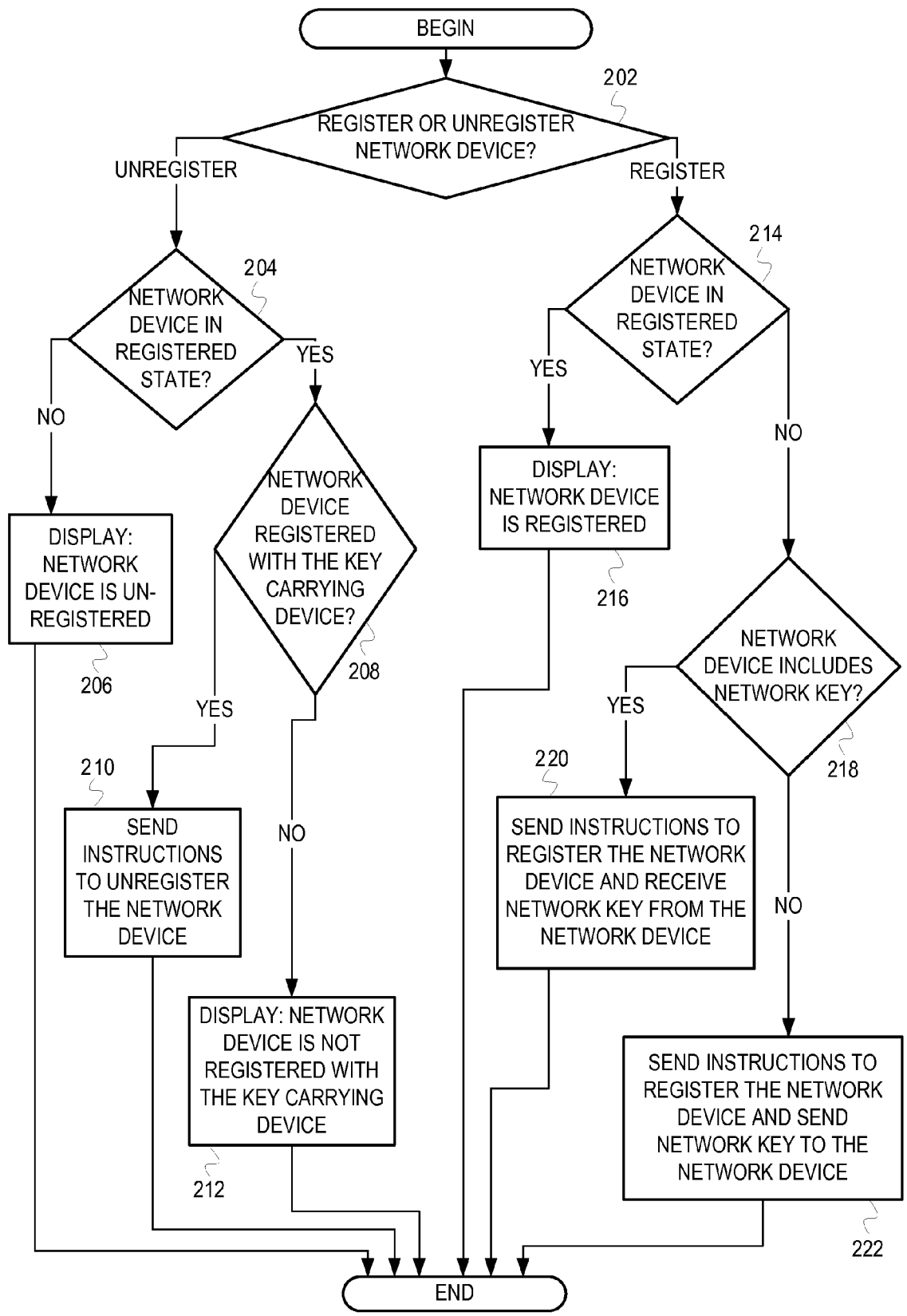
FIG. 2 illustrates a flow diagram of example operations to configure a network device.

FIG. 2 illustrates a flow diagram of example operations to configure a network device. For example, FIG. 2 illustrates the operations performed at the key carrying device 102 (as described above with reference to FIG. 1) once a short-range communication link is established with the network device 112. For simplification, FIG. 2 does not illustrate procedures for establishing a secure communication channel between the key carrying device 102 and the network device 112, and does not illustrate other details of the various configuration techniques, which will be described in detail below with reference to FIGS. 3-23.

At block 202, it is determined whether to register or unregister a network device. For example, the key management unit 104 of the key carrying device 102 determines whether to register or unregister the network device 112. In one implementation, the key management unit 104 may receive an input from a user to register or unregister the network device 112. In other implementations, the user may place the key carrying device 102 within a predetermined proximity of the network device 112 to automatically trigger the registration of the network device 112 (which is in an unregistered state) via the short-range communication link (e.g., NFC). Similarly, the key management unit 104 may automatically unregister the network device 112 (which is in a registered state) when the key carrying device 102 is placed within a predetermined proximity of the network device 112. If it is determined to register the network 112, control flows to block 214. If it is determined to unregister the network device 112, control flows to block 204.

At block 204, in response to determining to unregister the network device, the key carrying device 102 determines whether the network device 112 is in the registered state. For example, the key management unit 104 may exchange one or more messages with the network device 112 to determine whether the network device 112 is in the registered state. In some implementations, the key management unit 104 may process the information received from the network device 112 during the exchange of messages in order to determine whether the network device 112 is in the registered state. In other implementations, the key management unit 104 may receive the information about the status of the network device 112 during the exchange of messages. For example, the status of the network device 112 may indicate whether the network device 112 is in the registered state or not. If the network device 112 is in the registered state, control flows to block 208. If the network device 112 is not in the registered state, control flows to block 206.

At block 206, the unregistered status of the network device is displayed. In one implementation, a display unit in the key carrying device 102 may display that the network device 112 is unregistered. For example, on determining that the network device 112 is not in the registered state at block 204, the key management 104 unit may instruct the display unit of the key carrying device 102 to display that the network device 112 is unregistered. In some implementations, the network device 112 may also have display capabilities and display that it is unregistered.

At block 208, it is determined whether the network device is registered with the key carrying device. In one implementation, the key management unit 104 determines whether the network device 112 is registered with the key carrying device 102. For example, the key management unit 104 can determine whether the network device 112 is registered with the key carrying device 102 by processing the information received from the network device 112 during the initial message exchange. In some implementations, the key management unit 104 may determine whether the network device 112 is registered with the key carrying device 102 based on the information received regarding the status of the network device 112. If the network device 112 is registered with the key carrying device 102, control flows to block 210. If the network device is not registered with the key carrying device, control flows to block 212.

At block 210, instructions are sent to unregister the network device. In one implementation, the key management unit 104 sends instructions to unregister the network device 112. For example, the key management unit 104 can send instructions to the network device 112 to delete a network key and pairing data (corresponding to the key carrying device 102). In some implementations, the key management unit 104 may also delete any pairing data for pairing with the network device 112 stored at the key carrying device 102. In some implementations, unregistration of the network device 112 may only be effective if the key carrying device 102 is able to authenticate itself with the network device 112 securely. For example, the key carrying device 102 may exchange one or more messages with the network device 112 to prove that it is not a malicious device and the unregistration procedure can be continued after authentication.

At block 212, a status is displayed indicating that the network device is not registered with the key carrying device. In one implementation, the display unit in the key carrying device 102 displays that the network device 112 is not registered with the key carrying device 102. For example, the key management unit 104 may instruct the display unit to display a message that the network device 112 is not registered with the key carrying device 102 (depending on the determination made at block 208). In some implementations, the network device 112 may also have display capabilities and display that it is not registered with the key carrying device 102 to indicate that unregistration is not permitted.

At block 214, in response to determining to register the network device, the key carrying device 102 determines whether the network device 112 is already in the registered state. For example, the key management unit 104 may exchange one or more messages with the network device 112 to determine whether the network device 112 is in the registered state. In some implementations, the key management unit 104 may process the information received from the network device 112 during the exchange of messages in order to determine whether the network device 112 is in the registered state. In other implementations, the key management unit 104 may receive the information about the status of the network device 112 during the exchange of messages. For example, the status of the network device 112 may indicate whether the network device 112 is in the registered state or not. If the network device 112 is in the registered state, control flows to block 216. If the network device 112 is not in the registered state, control flows to block 218.

At block 216, a registered status of the network device is displayed. In one implementation, the display unit of the key carrying device 102 displays that the network device 112 is registered. For example, the key management unit 104 can instruct the display unit to display that the network device 112 is registered (based on the determination made at block 214). In some implementations, the network device 112 may also have display capabilities and display the registered status.

At block 218, it is determined whether the network device includes a network key. In one implementation, the key management unit 104 determines whether the network device 112 includes the network key. For example, the network device 112 determines whether the network device 112 includes the network key based on information received during the exchange of messages with the network device 112. If the network device 112 includes the network key, control flows to block 220. If the network device does not include the network key, control flows to block 222.

At block 220, if the network device includes the network key, instructions are sent to register the network device and the network key is received from the network device. In one implementation, the key management unit 104 sends instructions to register the network device 112 and receives the network key from the network device 112. For example, the key management unit 104 sends instructions to update pairing data stored at the network device 112. The key management unit 104 may establish a secure communication channel with the network device 112 and send instructions to update the pairing data at the network device 112 over the secure communication channel. The key management unit 104 may also request for the network key of the communication network 100 from the network device 112 over the secure communication channel. For example, the network device 112 may already be configured with the communication network 100 and the network key of the communication network 100 may be stored at the network device 112. The key management unit 104 can receive the network key of the communication network 100 from the network device 112 over the secure communication channel and can store the network key at the key carrying device 102.

At block 222, if the network device includes the network key, instructions are sent to register the network device and the network key is sent to the network device. In one implementation, the key management unit 104 sends instructions to register the network device 112 and sends the network key of the communication network 100 to the network device 112. For example, the key management unit 104 sends instructions to update pairing data at the network device 112. The key management unit 104 may establish a secure communication channel with the network device 112 and send instructions to update pairing data at the network device 112 over the secure communication channel. The key management unit can also send the network key of the communication network 100 to the network device 112 over the secure communication channel. For example, the key carrying device 102 may be configured with the communication network 100 and the network key of the communication network 100 may be stored at the key carrying device 102. The key carrying device 102 can send the network key of the communication network 100 to the network device 112. In some implementations, the key carrying device 102 may not be configured with the communication network 100 and the network key of the communication network 100 may not be stored at the key carrying device 102. The key carrying device 102 can generate a new random network key and send the network key to the network device 112.

It is noted that the procedures described in the flow diagram of FIG. 2 are exemplary in nature, and for simplification not all procedures are described in the flow diagram of FIG. 2. It is further noted that one or more procedures may be performed in a different order. For example, instructions to register the network device 112 (at block 220 and 222) may be sent prior to determining whether the network device 112 includes the network key.

Figure 3:
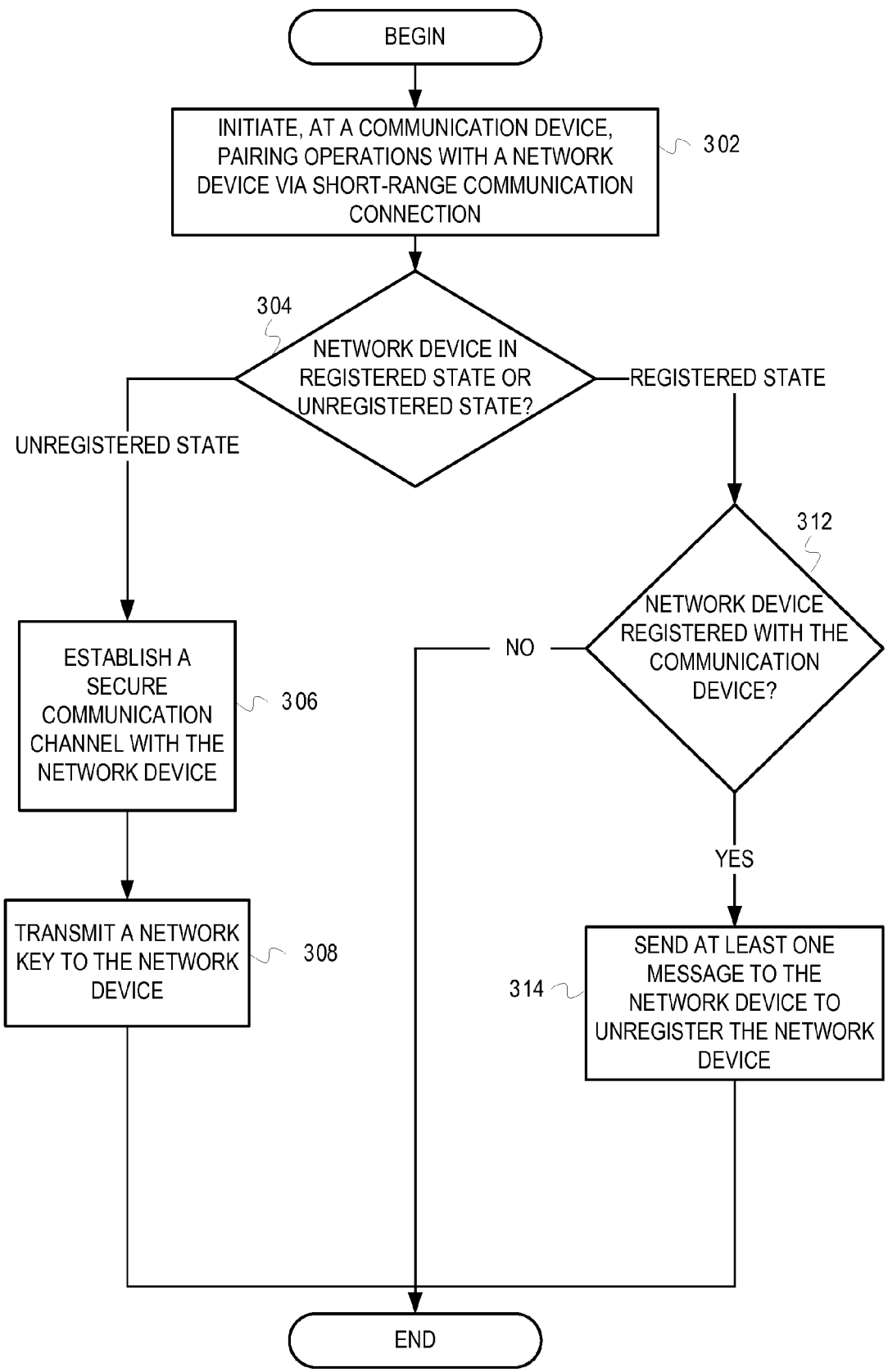
FIG. 3 illustrates a flow diagram of example operations to configure a network device using first and second configuration techniques.

FIG. 3 illustrates a flow diagram of example operations to configure a network device using the first and second configuration techniques. FIG. 3 describes example operations that are common to both the first configuration technique (which is described below in FIGS. 5-6) and the second configuration techniques (which is described below in FIGS. 7-8) to configure the network device using a communication device. In one example, the communication device may be referred to as the key carrying device of the communication network described herein (e.g., the key carrying device 102 of the communication network 100 shown in FIG. 1). The communication device (or the key carrying device) may also be referred to as the configuration device of the communication network (e.g., the communication network 100).

At block 302, pairing operations with a network device are initiated at a communication device via a short-range communication connection. In one implementation, the key carrying device 102 initiates pairing operations with the network device 112 via NFC. For example, the key management unit 104 of the key carrying device 102 can initiate pairing operations with the registration management unit 113 of the network device 112 to register or unregister the network device. In some implementations, the key management unit 104 may initiate pairing operations with the registration management unit 113 based on a user input. In other implementations, the key management unit 104 may initiate pairing operations with the registration management unit 113 when the key carrying device 102 is in vicinity of the network device 112 and as soon as the short-range communication link is established. The flow continues to block 304.

At block 304, it is determined whether the network device is in a registered state or an unregistered state. In one implementation, the key management unit 104 determines whether the network device 112 is in the registered state or the unregistered state based on one or more response messages received from the network device 112 after the key carrying device 102 transmits a registration or unregistration request to the network device 112. For example, the key management unit 104 can exchange one or more registration or unregistration request and response messages with the registration management unit 113 of the network device 112 to determine whether the network device 112 is in the registered state or the unregistered state. FIGS. 5, 6, 7 and 8 illustrate such message exchanges at stages A-D2, which as will be described in detail below. If the network device 112 is in the unregistered state, control flows to block 306 and the key management unit 104 may perform registration procedures. If the network device 112 is in the registered state, control flows to block 312 and the key management unit 104 may perform unregistration procedures.

At block 306, a secure communication channel is established with the network device 112. In one implementation, the key management unit 104 establishes a secure communication channel with the registration management unit 113 of the network device 112. For example, the key management unit 104 can establish the secure communication channel by performing key agreement, key derivation and key confirmation procedures. The key management unit 104 and the network device 112 can determine one or more secure channel keys (e.g., an integrity key, an encryption key, and a sequence number counter) for the secure communication channel and save the secure channel keys. For example, the key management unit 104 and the network device 112 perform key agreement, key derivation, and key confirmation procedures at stage E in FIGS. 5 and 7. The flow continues to block 308.

At block 308, a network key is transmitted to the network device. In one implementation, the key management unit 104 transmits the network key of the communication network to the registration management unit 113 of the network device 112 over the secure communication channel established at block 306. For example, in FIGS. 5 and 7 the key management unit 104 transmits the network key to the registration management unit 113 at stage F. On receiving the network key, the registration management unit 113 can save the network key and configure the network device 112 with the communication network 100 (e.g., join the communication network 100). Also, on completion of registration procedures, the key management unit 104 and the registration management unit 113 can update the pairing data (e.g., the device identifier and the secure channel keys in FIG. 5, and the public key in FIG. 7) stored at the key carrying device 102 and the network device 112, respectively.

At block 312, it is determined whether the network device is registered with the communication device. In one implementation, the key management unit 104 determines whether the network device 112 is registered with the key carrying device 102. For example, the key management unit 104 can determine whether the network device 112 is registered with the key carrying device 102 based on the message exchanges at stages D1 and D2 in FIGS. 6 and 8. The key management unit 104 can only proceed with the unregistration procedures when the network device 112 is registered with the key carrying device 102. If the network device 112 is registered with the key carrying device 102, control flows to block 314. If the network device 112 is not registered with the key carrying device 102, the key management unit 104 can stop the unregistration procedures.

At block 314, at least one message is sent to the network device to unregister the network device. In one implementation, the key management unit 104 sends at least one message to the registration management unit 113 in the network device 112 to unregister the network device 112. In one implementation, the key management unit 104 may send instructions to unregister the network device 112 over a secure communication channel. For example, in FIG. 6, the network device 112 and the key carrying device 102 store secure channel keys as part of the pairing data. The key management unit 104 can utilize the secure channel keys to establish the secure communication channel and send instructions to unregister the network device 112 over the secure communication channel as illustrated at stages E1-F in FIG. 6. On receiving the instructions to unregister, the registration management unit 113 in the network device 112 may determine whether the unregistration instructions are received from the key carrying device 102. The registration management unit 113 may flag an error if the unregistration instructions are not received from the key carrying device 102. In another implementation, the key management unit 104 may perform key agreement, key derivation and key confirmation procedures to prove its identity to the network device 112 as illustrated at stage E in FIG. 8. The registration management unit 113 may abort the unregistration procedures if the key agreement, key derivation, and key confirmation procedures are not successful.

It is noted that the procedures described in the flow diagram of FIG. 3 are exemplary in nature, and for simplification FIG. 3 does not illustrate all of the details of all the operations performed when implementing the first and second configuration techniques. Additional details of example operations performed at the key carrying device 102 and the network device 112 for the first and second configuration techniques will be further described below with reference to FIGS. 5-8.

Figure 4:
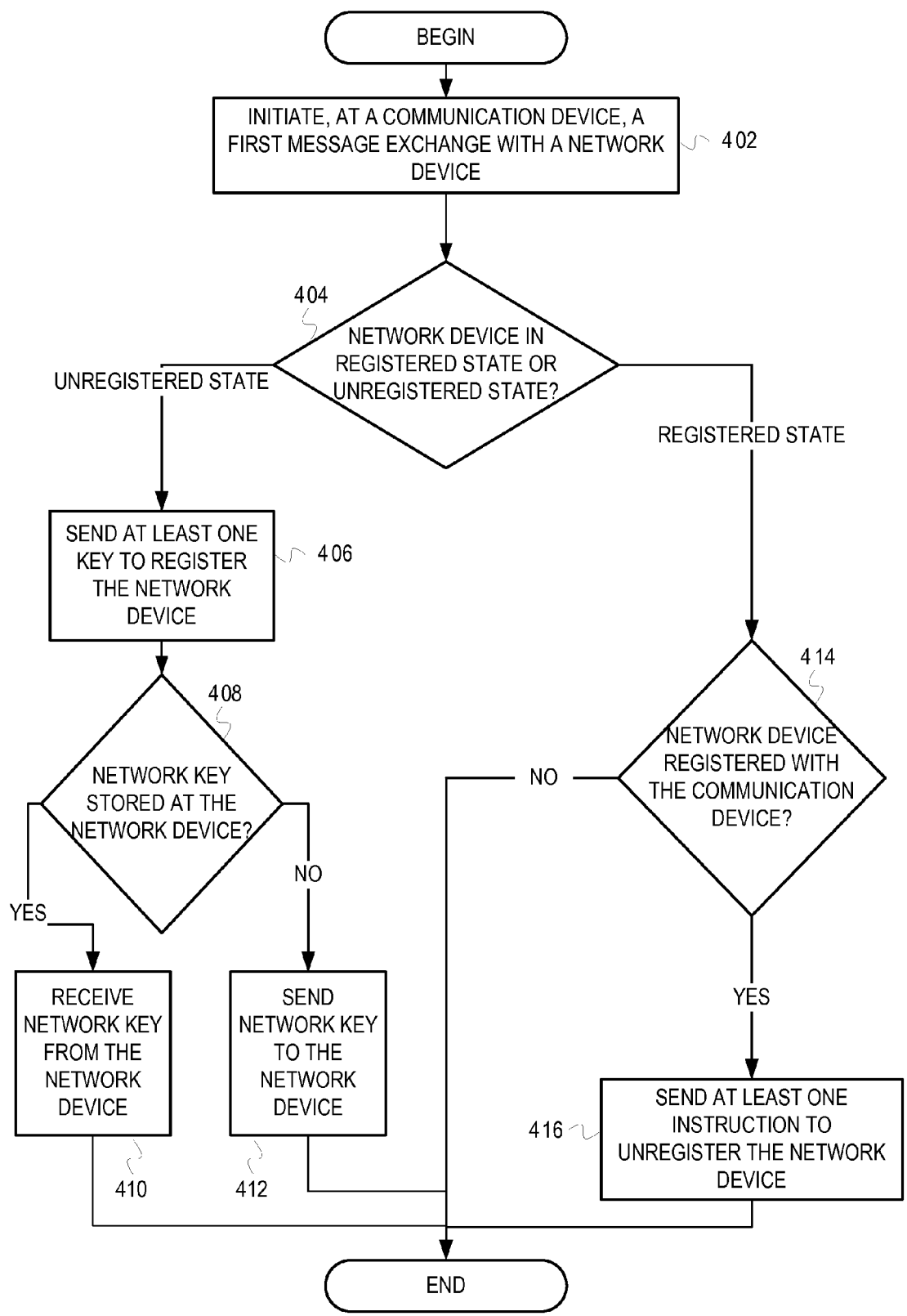
FIG. 4 illustrates a flow diagram of example operations to configure a network device using third, fourth and fifth configuration techniques.

FIG. 4 illustrates a flow diagram of example operations to configure a network device using the third, fourth and fifth configuration techniques. FIG. 4 describes example operations that are common to the third configuration technique (described below in FIGS. 9-14), the fourth configuration technique (described below in FIGS. 15-20), and fifth configuration techniques (described below in FIGS. 21-23) to configure the network device using a communication device. In one example, the communication device may be referred to as the key carrying device of the communication network described herein (e.g., the key carrying device 102 of the communication network 100 shown in FIG. 1). The communication device (or the key carrying device) may also be referred to as the configuration device of the communication network (e.g., the communication network 100).

At block 402, a first message exchange is initiated with a network device at a communication device. In one implementation, the key management unit 104 initiates the first message exchange with the network device 112. For example, the first message exchange may include a random number and encrypted data (encrypted using the random number). In the third, fourth and fifth configuration techniques, the pairing data includes a registration key stored at the key carrying device 102 (RKk) and a registration key stored at the network device 112 (RKn). The key carrying device 102 and the network device 112 can also store a network key as NK and NK', respectively. During the first message exchange, the key carrying device 102 may send a "hello" request (which may also be referred herein as a registration or unregistration request) with a random number N1, and the network device 112 may respond with an encrypted RKn, an encrypted NK' and another random number N2 (e.g., as illustrated in stages A-C in FIGS. 9 and 13). The network device 112 may encrypt RKn using a hashing algorithm known to the key carrying device 102 and the random number N1. The network device 112 can also encrypt NK' using the hashing algorithm known to the key carrying device 102. The random number N2 may be utilized by the key carrying device 102 to send encrypted data in one or more messages exchanges to the network device 112. In some implementations, the first message exchange may be a request for a random number from the key carrying device 102 and a response having a random number from the network device 112 (as illustrated at stages A-C in FIGS. 14 and 20, and at stages A1-A2 in FIGS. 15 and 18). In some implementations, the first message exchange may be establishment of a secure communication channel between the key carrying device 102 and the network device 112 (e.g., as illustrated at stage A in FIGS. 21 and 23). The flow continues to block 404.

Figure 9:
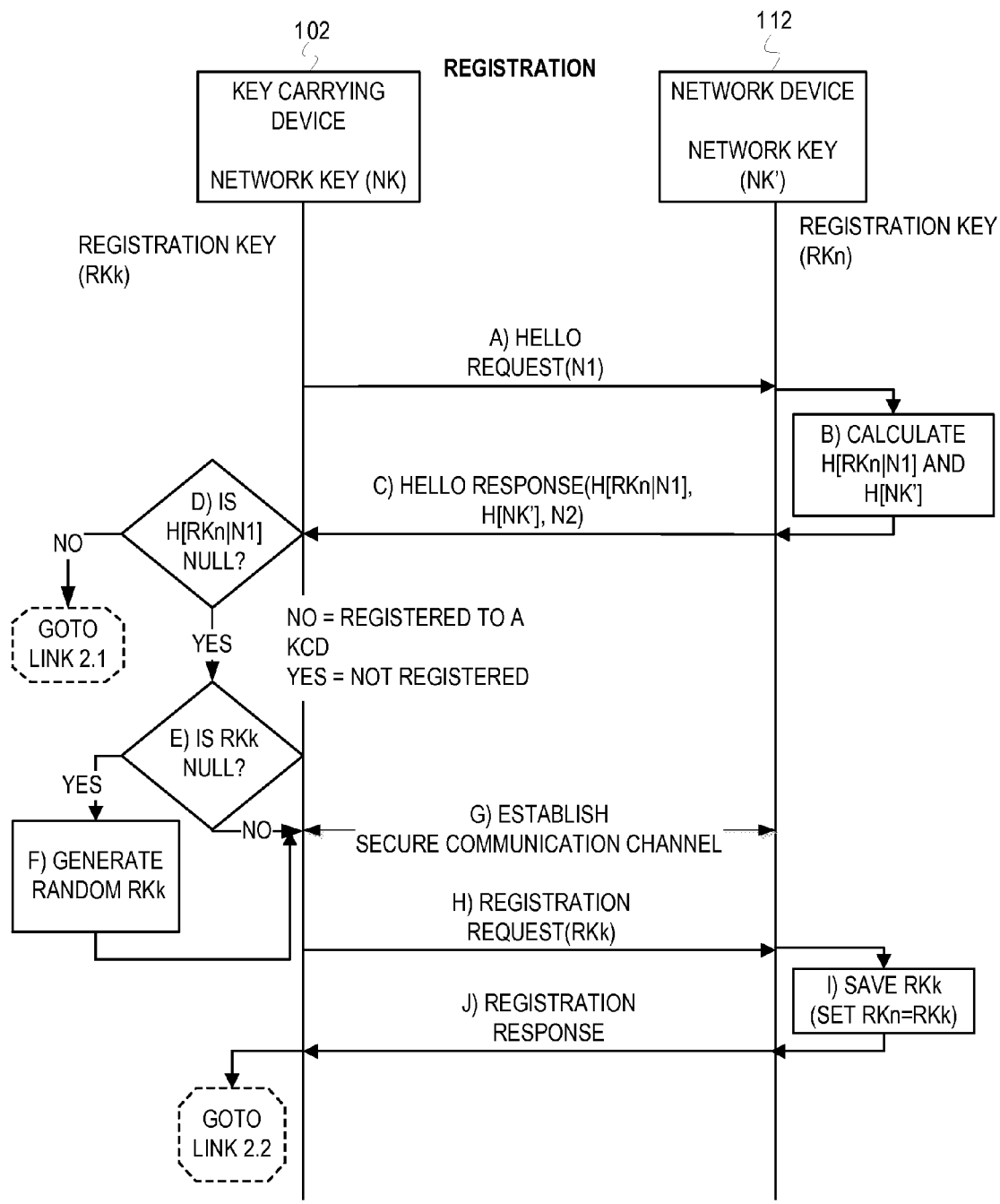
FIGS. 9, 10, 11 and 12 illustrate a sequence diagram of example operations to register a network device using a third configuration technique.
Figure 10:
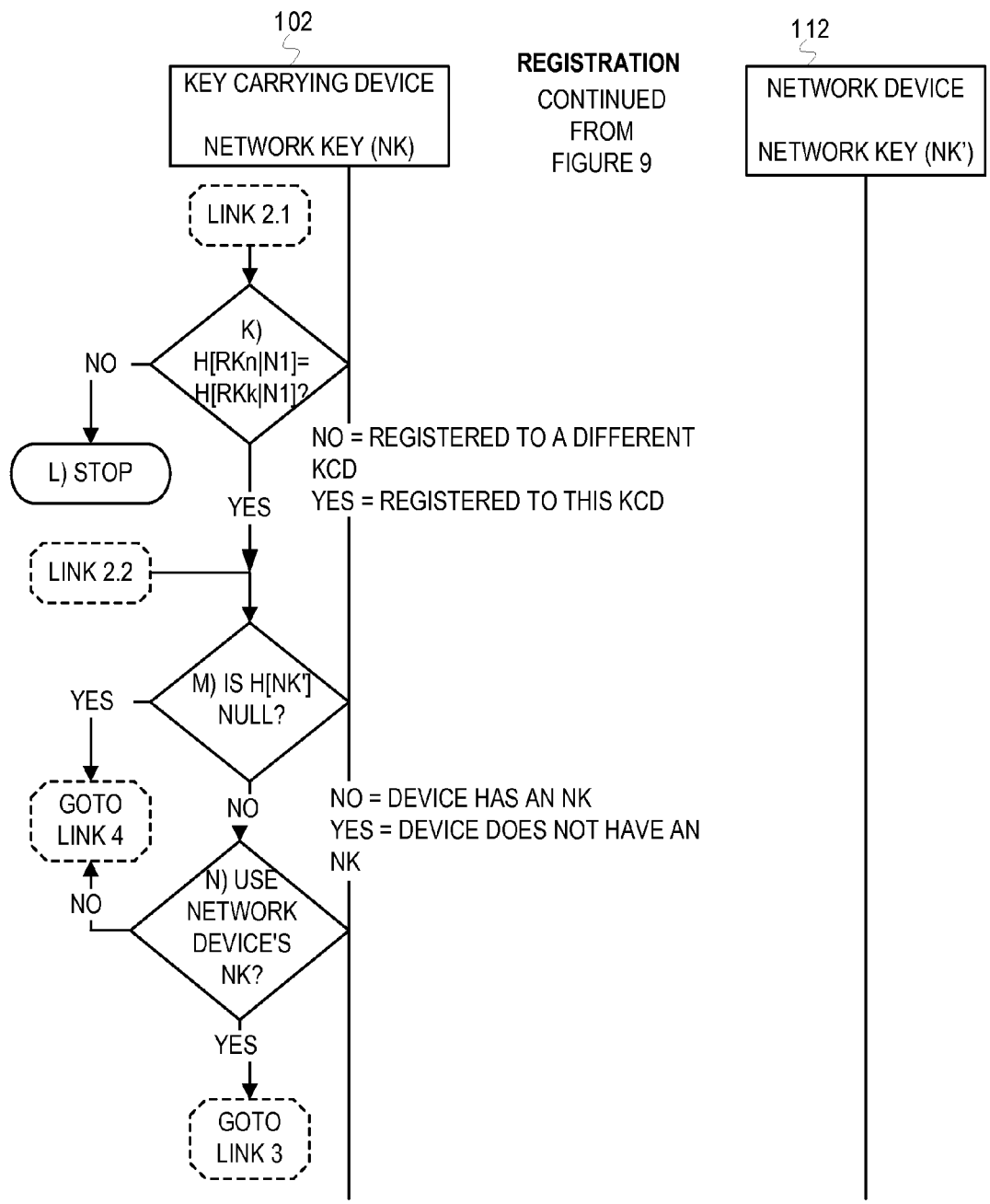
Figure 11:
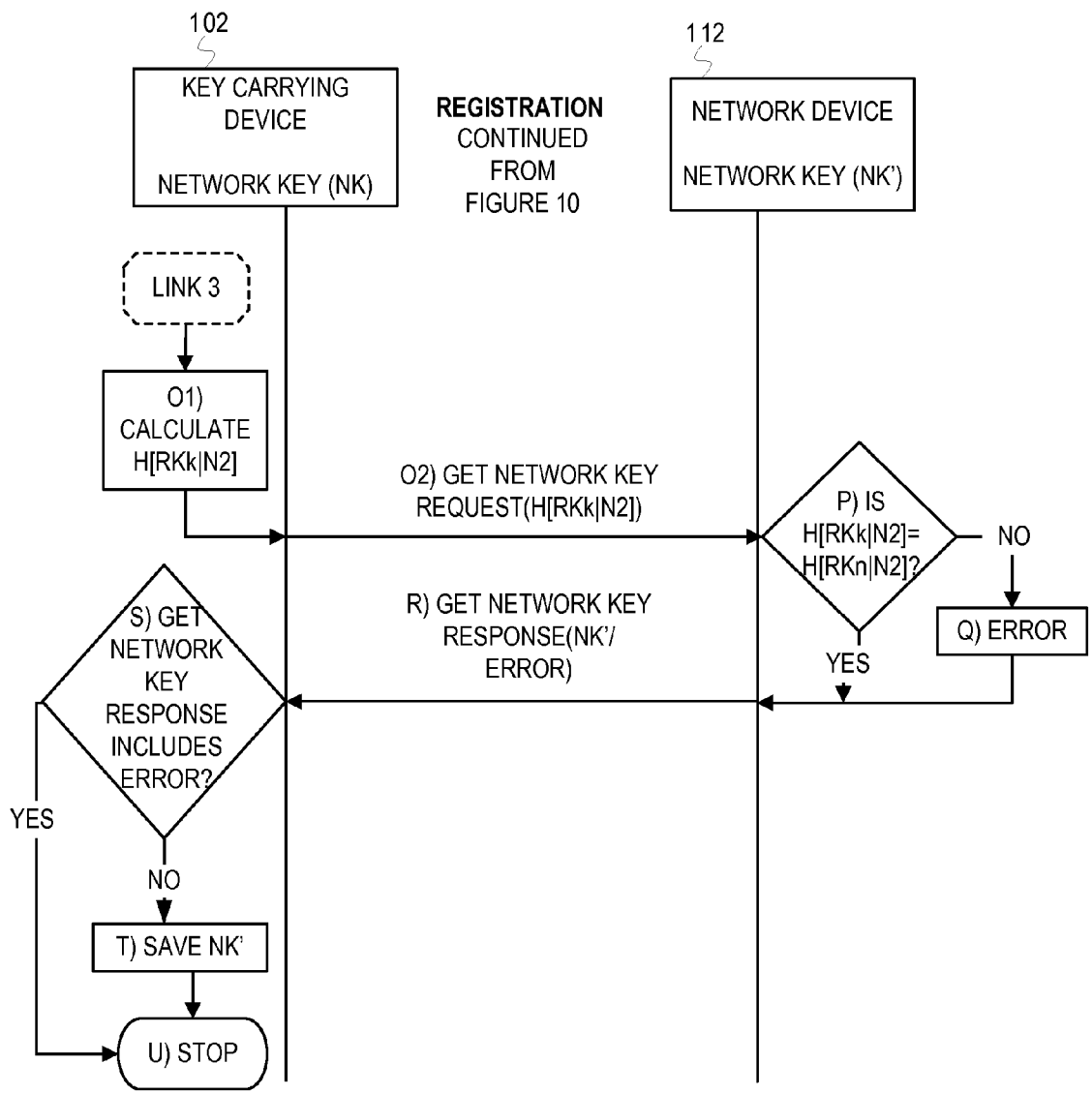
Figure 12:
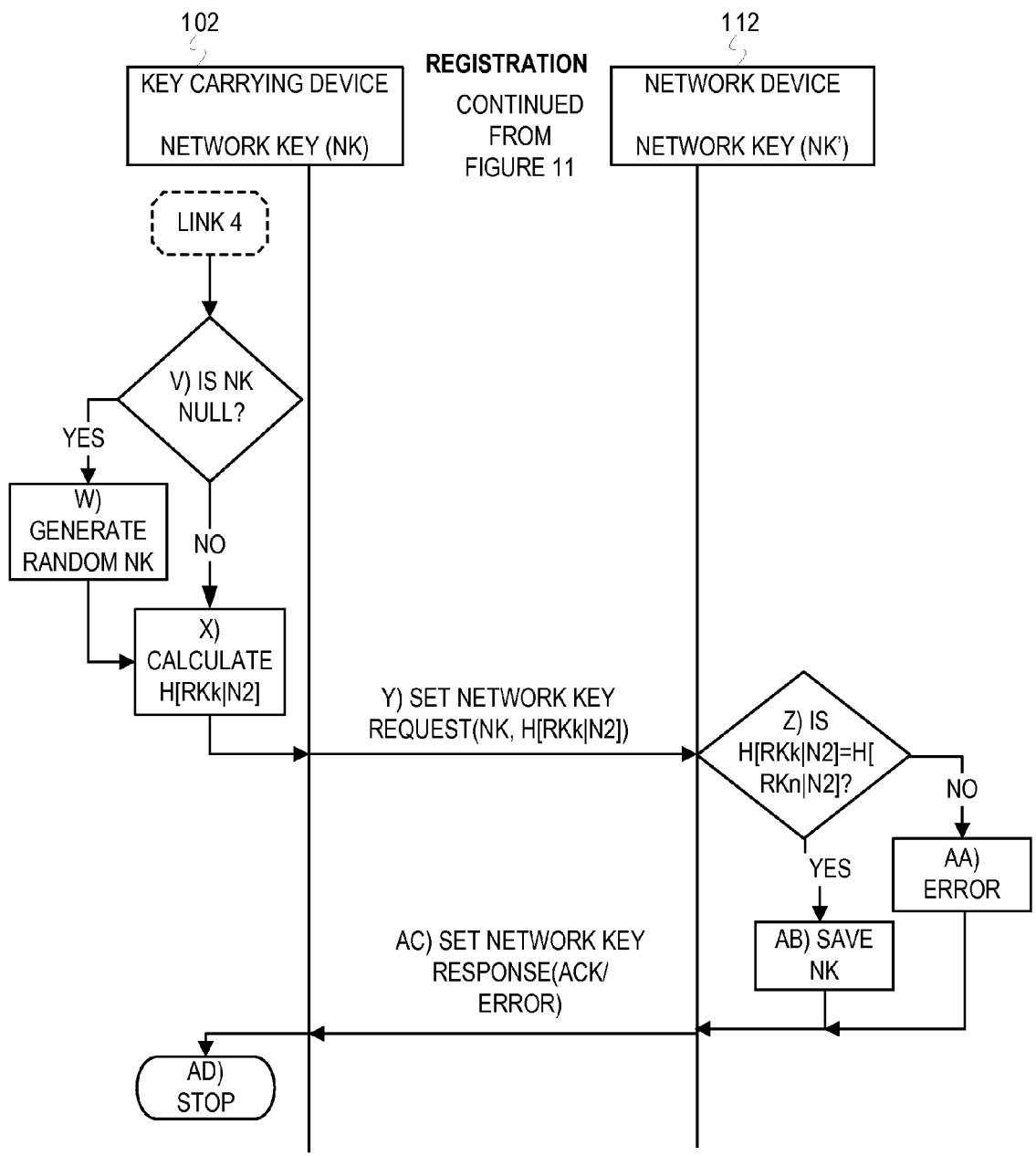
Figure 13:
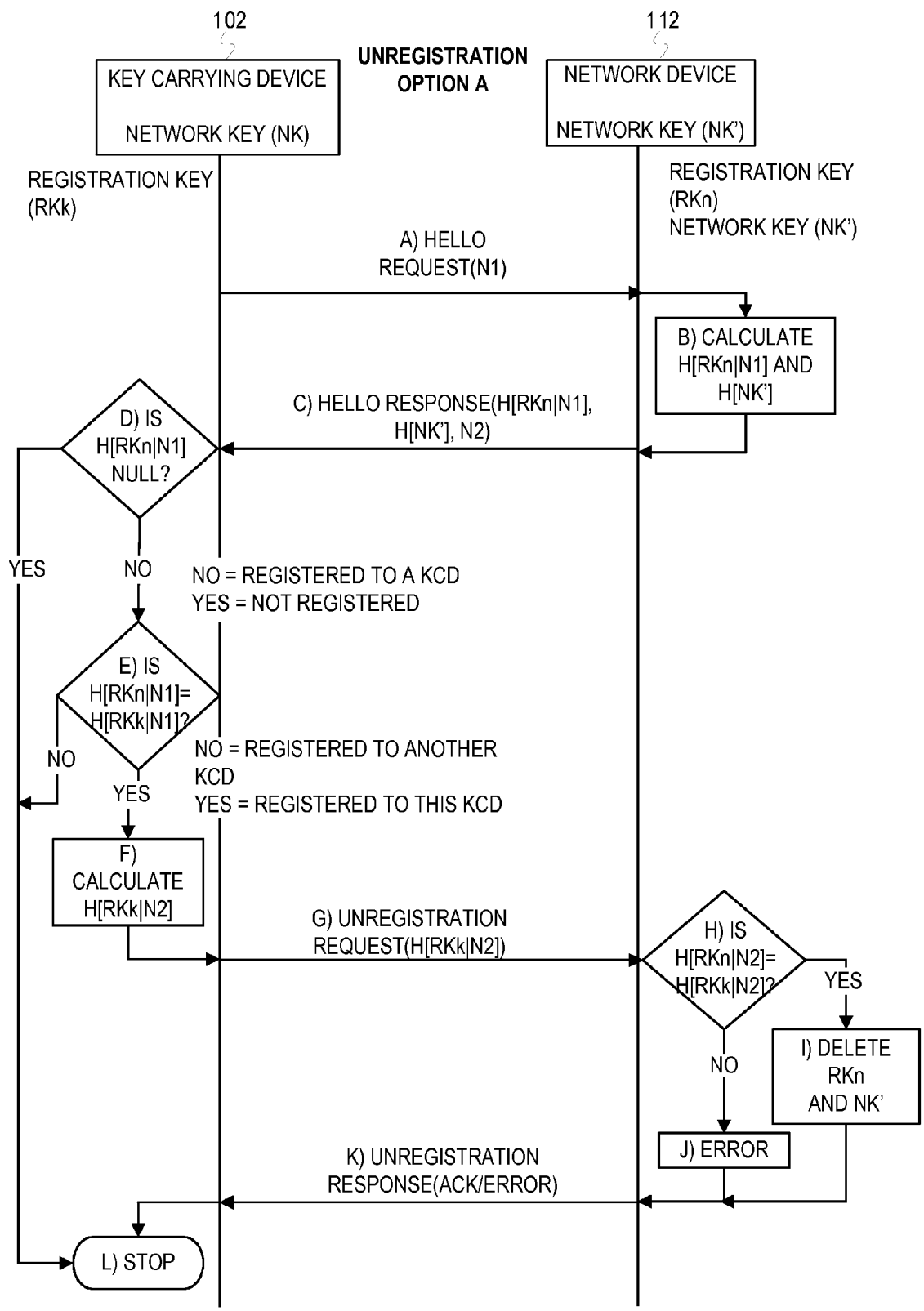
FIG. 13 illustrates a sequence diagram of example operations of a first option to unregister a network device using a third configuration technique.

At stage 404, it is determined whether the network device is in a registered state or the unregistered state. In one implementation, the key management unit 104 determines whether the network device 112 is in the registered state or the unregistered state by processing the data received from the network device 112 in the first message exchange. For example, FIGS. 9 and 10 illustrate the operations for determining whether the network device 112 is in the registered state or the unregistered state at stages D and K. FIG. 13 illustrates the operations for determining whether the network device 112 is in the registered state or the unregistered state at stages D and E. In some implementations, the key management unit 104 may determine whether the network device 112 is in the registered state or the unregistered state based on a subsequent message exchange after the first message exchange. For example, the key management unit 104 may receive a status of the network device 112 from the network device 112 (as illustrated at stage H in FIGS. 15, 18 and 23, and at stage I in FIG. 21). In some implementations, the key management unit 104 may not determine whether the network device 112 is in the registered state or the unregistered state, and instead the key management unit 104 may proceed to register or unregister the network device 112 based on an input from user. For example, in FIGS. 14 and 20, it is not determined whether the network device 112 is in the registered state or the unregistered state and instead an unregistration request is sent to the network device 112 at stage E. If it is determined that the network device 112 is in the registered state, control flows to block 414 and unregistration procedures to unregister the network device 112 may be performed. If it is determined that the network device 112 is in the unregistered state, control flows to block 406 and registration procedures to register the network device 112 may be performed.

At block 406, at least one registration key is sent to the network device to register the network device. In one implementation, the key management unit 104 sends at least one registration key to the network device 112 to register the network device 112. For example, the key management unit 104 may send RKk to the network device 112. The key management unit 104 may establish a secure communication channel (e.g., using key agreement, key derivation and key confirmation procedures) and send RKk over the secure communication channel (e.g., as illustrated at stage H in FIG. 9, at stage N2 in FIG. 16, and stage B in FIG. 21). In some implementations, when RKk stored at the key carrying device 102 is null, the key management unit 104 may generate a new random RKk and send the RKk to the network device 112. The flow continues to block 408.

At block 408, it is determined whether a network key is stored at the network device. In one implementation, the key management unit 104 determines whether the network key is stored at the network device 112 by processing the data received from the network device 112 in the first message exchange. For example, the key management unit 104 determines whether the encrypted NK' received from the network device 112 is null (e.g., as illustrated at stage M in FIG. 10, at stage Q in FIG. 16). In some implementations, the status sent by the network device 112 in a subsequent message exchange after the first message exchange may indicate whether the network key is stored at the network device 112 (e.g., as illustrated at stage L in FIG. 22). On determining that the network key is stored at the network device 112, the key management unit 104 may determine to utilize the network key stored at the network device 112 and control flows to block 410. If the network key is not stored at the network device 112, control flows to block 412.

At block 410, the network key is received from the network device 112. In one implementation, the key management unit 104 receives the network key from the registration management unit 113 in the network device 112. For example, the key management unit 104 may send a "get" network key request to the registration management unit 113 to receive the network key. In some implementations, the get network key request may include an encrypted RKk (e.g., as illustrated at stage O2 in FIG. 11 and stage T in FIG. 16). RKk may be encrypted using a hashing algorithm known to the network device 112 and using N2 received from the network device 112. In some implementations, the get network key request may be sent over a secure communication channel and may not include the encrypted RKk (as illustrated at stage N in FIG. 22). In response to the get network key request, the key management unit 104 may receive the network key stored at the network device 112 and save the network key.

At block 412, a network key is sent to the network device. In one implementation, the key management unit 104 sends the network key stored at the key carrying device 102 to the registration management unit 113 in the network device 112. For example, the key management unit 104 may send a "set" network key request to the network device 112. The set network key request may include the network key and an encrypted RKk (e.g., as illustrated at stage Y in FIG. 12 and stage AD in FIG. 17). RKk may be encrypted using a hashing algorithm known to the network device 112 and using N2 received from the network device 112. In some implementations, the set network key request may be sent over a secure communication channel and may not include the encrypted RKk (e.g., as illustrated at stage U in FIG. 22). In response to the set network key request, the key management unit 104 may receive a set network key response from the network device 112 which may include an acknowledgement that the network key is saved at the network device 112.

At block 414, it is determined whether the network device is registered with the communication device. In one implementation, the key management unit 104 determines whether the network device 112 is registered with the key carrying device 102 by processing the data received during the first message exchange. In another implementation, the key management unit 104 may not determine whether the network device 112 is registered with the key carrying device 102, and instead the key management unit 104 may send an unregistration request to the network device 112. The network device 112 may determine whether the network device 112 is registered with the key carrying device 102 based on the unregistration request (as described in block 416). In some implementations, the key management unit 104 may verify whether the encrypted RKn received from the network device 112 (received during the first message exchange) matches with an encrypted RKk (encrypted using the same random number and hashing algorithm utilized by the network device 112 to encrypt RKn) to determine that the network device 112 is registered with the key carrying device 102 (e.g., as illustrated at stage E in FIG. 13). In other implementations, the key management unit 104 may determine whether the network device 112 is registered with the key carrying device 102 based on a status of the network device 112 received from the network device 112 (e.g., at stage I in FIG. 18). If the network device 112 is registered with the key carrying device 102, control flows to block 416. If the network device 112 is not registered with the key carrying device 102, the key carrying device 102 may not be able to unregister the network device 112.

At block 416, at least one instruction is sent to unregister the network device. In one implementation, the key management unit 104 sends the instruction to unregister the network device 112. For example, the key management unit 104 may send an unregistration request to the registration management unit 113 in the network device 112. The unregistration request can include an encrypted RKk (as illustrated at stage G in FIG. 13, at stage E in FIG. 14, at stage L in FIG. 19, and at stage E in FIG. 20). RKk may be encrypted using a hashing algorithm known to the network device 112 and using a random number received from the network device 112. In some implementations, the key management unit 104 may not necessarily send the unregistration request having the encrypted RKk, but the unregistration request may include RKk instead of the encrypted RKk (e.g., as illustrated at stage B in FIG. 23). In some implementations, on receiving the unregistration request, the registration management unit 113 may determine whether the network device 112 is registered with the key carrying device 102 (e.g., as illustrated at stage F in FIG. 14, at stage M in FIG. 19, at stage F in FIG. 20, and at stage E in FIG. 23). If the network device 112 is registered with the key carrying device 102, the registration management unit 113 may perform one or more operations to unregister the network device 112 and send an unregistration response to the key management unit 104. If the network device 112 is not registered with the key carrying device 102, the registration management unit 113 may indicate to the key management unit 104 that the network device 112 is not registered with the key carrying device 102.

It is noted that the procedures described in the flow diagram of FIG. 4 are exemplary in nature, and for simplification FIG. 4 does not illustrate all of the details of all the operations performed when implementing the third, fourth and fifth configuration techniques. Additional details of example operations performed at the key carrying device 102 and the network device 112 for the third, fourth and fifth configuration techniques will be further described below with reference to FIGS. 9-23.

Figure 5:
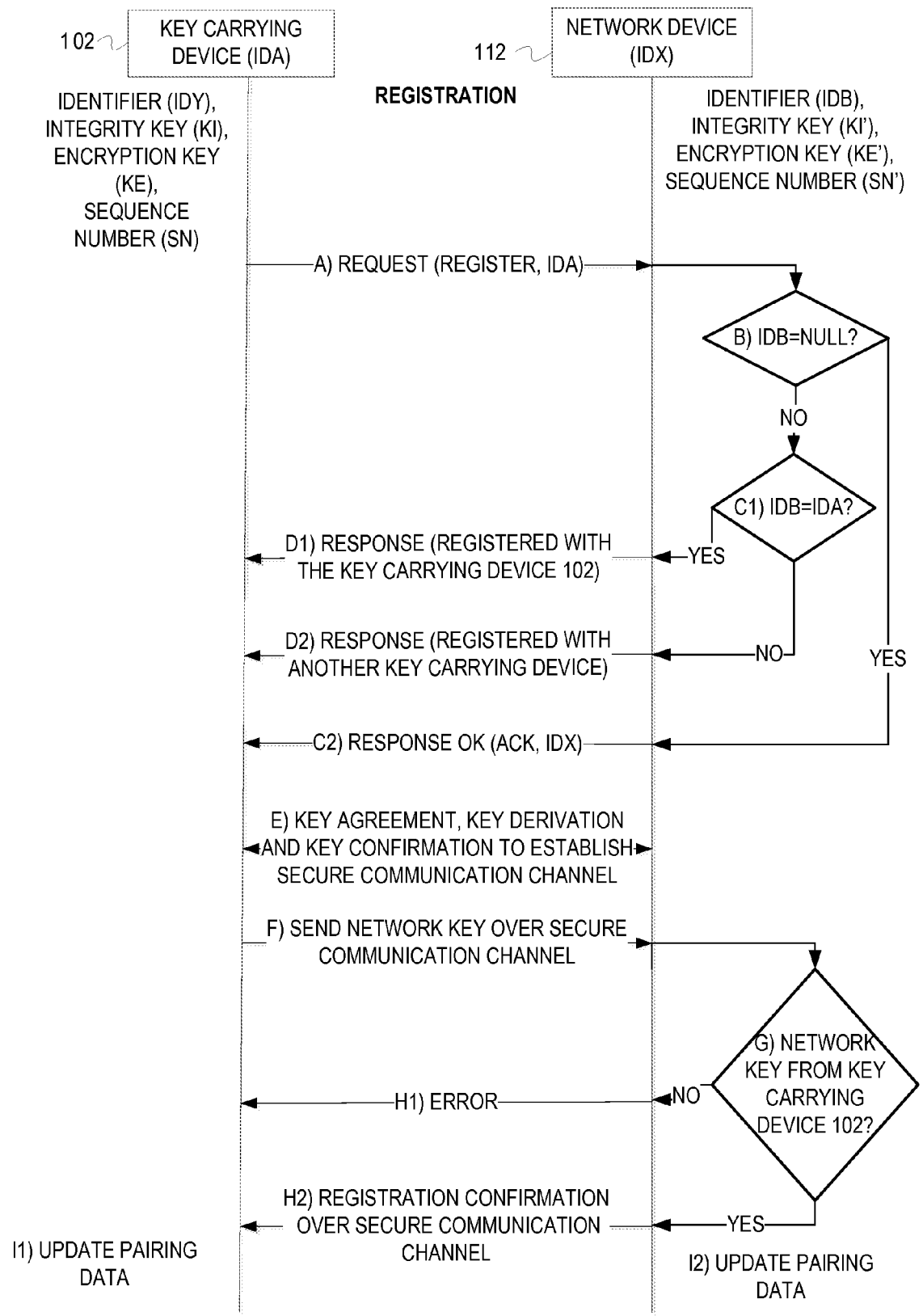
FIG. 5 illustrates a sequence diagram of example operations to register a network device using a first configuration technique.

FIG. 5 illustrates a sequence diagram of example operations to register a network device using a first configuration technique. FIG. 5 includes the key carrying device 102 and the network device 112 (as described above with reference to FIG. 1). The key carrying device 102 can utilize the first configuration technique when the pairing data stored on the key carrying device 102 includes a device identifier of a network device (IDY), an integrity key (KI), an encryption key (KE), and a sequence number counter (SN). The pairing data stored on the network device 112 can include a device identifier of a key carrying device (IDB), an integrity key (KI'), an encryption key (KE'), and a sequence number counter (SN'). It is noted that IDY, KI, KE, SN, IDB, KI', KE', and SN' represent example variables for storing the pairing data at the key carrying device 102 and the network device 112. It is also noted that the device identifier of the key carrying device 102 is IDA, and the device identifier of the network device 112 is IDX. It is further noted that the key carrying device 102 is capable of storing multiple sets of pairing data (i.e., IDY, KI, KE, and SN) corresponding to multiple network devices registered with the key carrying device 102. FIG. 5 illustrates interactions between the key carrying device 102 and the network device 112 to register the network device 112 in a sequence of stages A-I2. Although FIG. 5 illustrates the operations being performed by the key management unit 104 and the registration management unit 113, in some implementations the operations may be performed by other units in the key carrying device 102 and the network device 112, respectively.

At stage A, a registration request is sent to the network device 112. In one implementation, the key management unit 104 in the key carrying device 102 sends the registration request to the registration management unit 113. For example, the registration request may include IDA and an instruction to update the pairing data at the network device 112.

At stage B, it is determined whether IDB is null. In one implementation, the registration management unit 113 determines whether the value of IDB stored at the network device 112 is null. If IDB is null, the registration management unit 113 sends a response at stage C2 to the key management unit 104. If IDB is not null, the registration management unit 113 can determine whether IDB is equal to IDA at stage C1.

At stage C1, it is determined whether IDB is equal to IDA. In one implementation, the registration management unit 113 determines whether IDB is equal to IDA. If IDB is equal to IDA, the registration management unit 113 sends a response to the key management unit 104 at stage D1. If IDB is not equal to IDA, the registration management unit 113 sends a response to the key management unit 104 at stage D2.

At stage C2, a response is sent to the network device 112. In one implementation, the registration management unit 113 sends an OK response to the key management unit 104. For example, the OK response may include an acknowledgment that the network device 112 is ready to be registered and may also include IDX.

At stage D1, a response is sent to the network device 112. In one implementation, the registration management unit 113 sends the response to the key management unit 104 to indicate that the network device 112 is already registered with the key carrying device 102.

At stage D2, a response is sent to the network device 112. In one implementation, the registration management unit 113 sends the response to the key management unit 104 to indicate that the network device 112 is registered with another key carrying device.

At stage E, key agreement, key derivation and key confirmation operations are performed to establish a secure communication channel. In one implementation, the key management unit 104 and the registration management unit 113 perform the key agreement, key derivation and key confirmation operations to establish the secure communication channel. For example, the key management unit 104 and the registration management unit 113 can determine secure channel keys (e.g., an encryption key, an integrity key, and a sequence number counter). The key management unit 104 and the registration management unit 113 can establish the secure communication channel using the secure channel keys. The secure communication channel can ensure integrity and replay protection for any messages exchanged between the key carrying device 102 and the network device 112. The key management unit 104 and the registration management unit 113 may store the encryption key, the integrity key and the sequence number counter as long as the secure communication channel exists between the key carrying device 102 and the network device 112. The key management unit 104 and the registration management unit 113 can also store the secure channel keys as pairing data as described below at stages I1 and I2.

At stage F, a network key is sent over the secure communication channel. In one implementation, the key management unit 104 sends the network key of the communication network 100 stored at the key carrying device 102 to the registration management unit 113 over the secure communication channel. For example, the key management unit 104 may send the network key in a message (e.g., a message encrypted using the encryption key) along with the value of the sequence number counter (SN) at the time of message generation. It is noted that the sequence number counters stored at the network device 112 and the key carrying device 102 may be incremented each time a message is generated.

At stage G, it is determined whether the network key is received from the key carrying device 102. In one implementation, the registration management unit 113 determines whether the network key is received from the key carrying device 102. For example, the registration management unit 113 may utilize the value of the sequence number counter in the message received at stage F to determine whether the network key is received from the key carrying device 102. The registration management unit 113 may determine whether the network key is received from the key carrying device 102 by verifying that the value of the sequence number counter in the message received at stage F is in sequence after the last message received from the key carrying device 102. If the network key is not received from the key carrying device 102, the registration management unit 113 may send an error message at stage H1 to the key management unit 104. If the network key is received from the key carrying device 102, the registration management unit 113 may send a registration confirmation message at stage H2 to the key management unit 104 over the secure communication channel.

At stage H1, an error message is sent to the key carrying device 102. In one implementation, the registration management unit 113 sends the error message to the key management unit 104 to indicate that the network key sent to the network device 112 at stage F was not sent from the key carrying device 102. In some implementations, on receiving the error message at stage H1, the key management unit 104 may repeat the operations at stage F to send the network key to the registration management unit 113.

At stage H2, a registration confirmation message is sent to the key carrying device 102 over the secure communication channel. In one implementation, the registration management unit 113 sends the registration confirmation message (e.g., a message encrypted using the encryption key) over the secure communication channel to indicate to the key management unit 104 that the NK was successfully received at the network device 112.

At stage I1, pairing data at the key carrying device 102 is updated. In one implementation, the key management unit 104 updates the pairing data (corresponding to the network device 112) stored at the key carrying device 102. For example, the key management unit 104 may set IDY equal to IDX (received at stage C2), KI equal to the integrity key of the secure communication channel, KE equal to the encryption key of the secure communication channel, and SN equal to the sequence number counter of the secure communication channel.

At stage I2, pairing data at the network device 112 is updated. In one implementation, the registration management unit 113 updates the pairing data stored at the network device 112. For example, the registration management unit 113 may set IDB equal to IDA (received at stage A), KI' equal to the integrity key of the secure communication channel, KE' equal to the encryption key of the secure communication channel, and SN' equal to the sequence number counter of the secure communication channel.

Figure 6:
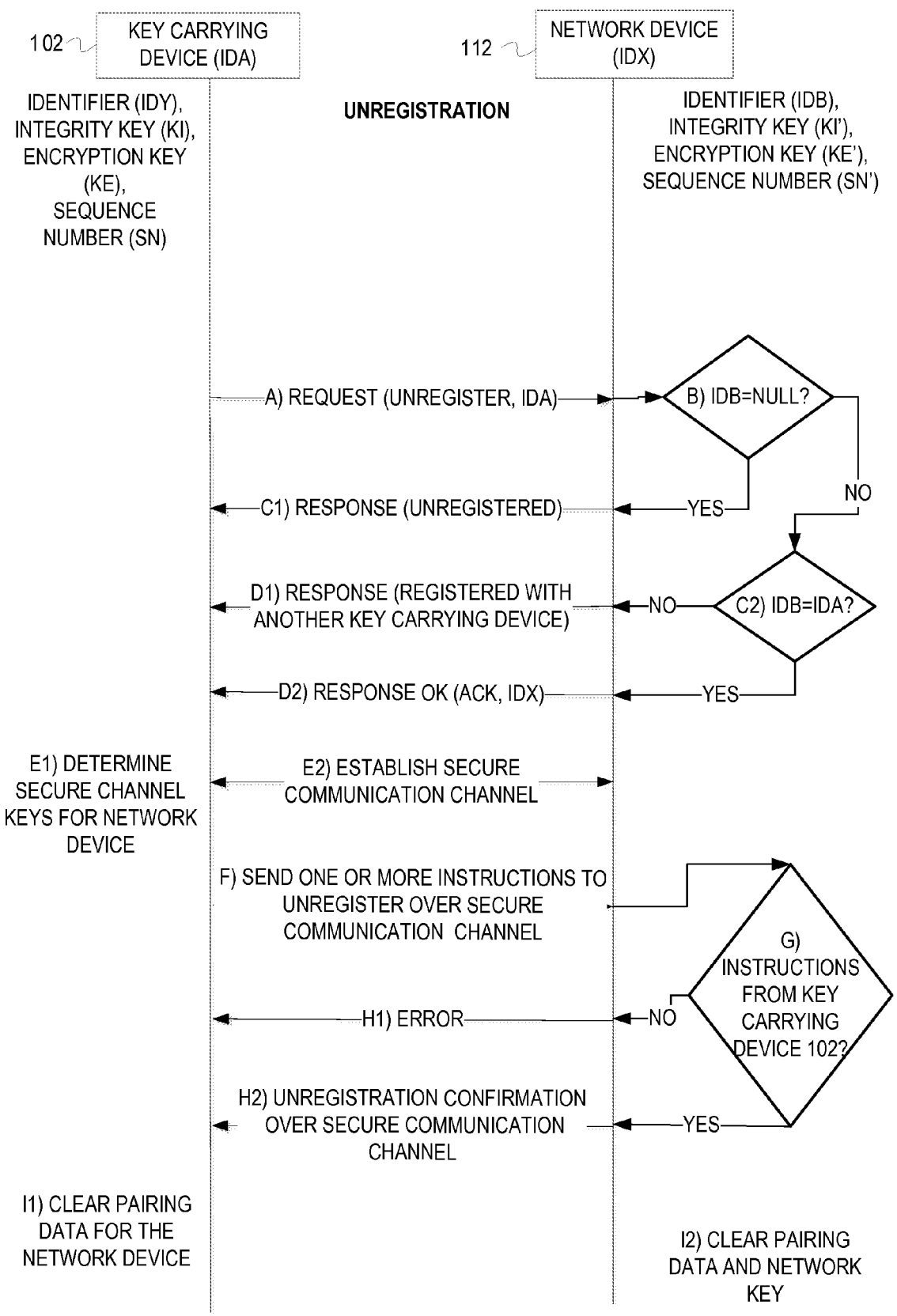
FIG. 6 illustrates a sequence diagram of example operations to unregister a network device using a first configuration technique.

FIG. 6 illustrates a sequence diagram of example operations to unregister a network device using a first configuration technique. FIG. 6 includes the key carrying device 102 and the network device 112 (as described above with reference to FIG. 5). The key carrying device 102 can utilize the first configuration technique to unregister the network device 112 when the pairing data stored on the key carrying device 102 and the network device 112 is similar to the pairing data described in FIG. 5. The key carrying device 102 can only unregister the network device 112 when the network device 112 is registered with the key carrying device 102. It is noted that when the network device 112 is registered with the key carrying device 102, IDY is equal to IDX, IDB is equal to IDA, KI' is equal to KI which is equal to the integrity key of a secure communication channel established during registration, KE' is equal to KE which is equal to the encryption key of the secure communication channel, and SN' is equal to SN which is equal to the sequence number of the secure communication channel. FIG. 6 illustrates interactions between the key carrying device 102 and the network device 112 to unregister the network device 112 in a sequence of stages A-I2. Although FIG. 6 illustrates the operations being performed by the key management unit 104 and the registration management unit 113, in some implementations the operations may be performed by other units in the key carrying device 102 and the network device 112, respectively.

At stage A, an unregistration request is sent to the network device 112. In one implementation, the key management unit 104 in the key carrying device 102 sends the unregistration request to the registration management unit 113. For example, the unregistration request may include an instruction to unregister (i.e., clear pairing data) and IDA.

At stage B, it is determined whether IDB is null. In one implementation, the registration management unit 113 determines whether the value of IDB stored at the network device 112 is null. If IDB is null, the registration management unit 113 sends a response at stage C1 to the key management unit 104. If IDB is not null, the registration management unit 113 can determine whether IDB is equal to IDA at stage C2.

At stage C1, a response is sent to the key carrying device 102. In one implementation, the registration management unit 113 sends the response to the key management unit 102. For example, the response may indicate to the key management unit 104 that the network device 102 is unregistered (i.e., not registered with any key carrying device).

At stage C2, it is determined whether IDB is equal to IDA. In one implementation, the registration management unit 113 determines whether IDB is equal to IDA. If IDB is equal to IDA, the registration management unit 113 sends a response to the key management unit 104 at stage D2. If IDB is not equal to IDA, the registration management unit 113 sends a response to the key management unit 104 at stage D1.

At stage D1, a response is sent to the network device 112. In one implementation, the registration management unit 113 sends the response to the key management unit 104 to indicate that the network device 112 is registered with another key carrying device.

At stage D2, a response is sent to the network device 112. In one implementation, the registration management unit 113 sends an OK response to the key management unit 104. For example, the OK response may include an acknowledgement that the network device 112 is ready to be unregistered. The OK response may also include IDX.

At stage E1, secure channel keys are determined for the network device 112. In one implementation, the key management unit 104 determines the secure channel keys for the network device 112. For example, the key management unit 104 determines the secure channel keys based on the IDX received at stage D2. The key management unit 104 may look up the secure channel keys (e.g., an integrity key, an encryption key, and a sequence number counter) stored at the key carrying device 102 during registration of the network device 112.

At stage E2, a secure communication channel is established. In one implementation, the key management unit 104 establishes a secure communication channel with the registration management unit 113 using the secure channel keys determined at stage E1. The secure communication channel can ensure integrity and replay protection for messages exchanged between the key carrying device 102 and the network device 112.

At stage F, one or more instructions are sent over the secure communication channel to unregister the network device 112. In one implementation, the key management unit 104 may send a message (e.g., a message encrypted using the encryption key) having one or more instructions to the registration management unit 113 to unregister the network device 112. For example, the message may include instructions to clear the pairing data and a network key stored at the network device 112. The message may also include the value of the sequence number counter (SN) at the time of message generation. It is noted that the sequence number counters stored at the network device 112 and the key carrying device 102 may be incremented each time a message is generated.

At stage G, it is determined whether the instructions are received from the key carrying device 102. In one implementation, the registration management unit 113 determines whether the instructions are received from the key carrying device 102. For example, the registration management unit 113 may utilize the value of the sequence number counter (SN) in the message received at stage F to determine whether the instructions are received from the key carrying device 102. The registration management unit 113 may determine whether the instructions are received from the key carrying device 102 by verifying that the value of the sequence number counter in the message received at stage F is in sequence after the last message received from the key carrying device 102. If the instructions are not received from the key carrying device 102, the registration management unit 113 may send an error message at stage H1 to the key management unit 104. If the instructions are received from the key carrying device 102, the registration management unit 113 may send an unregistration confirmation message at stage H2 to the key management unit 104 over the secure communication channel.

At stage H1, an error message is sent to the key carrying device 102. In one implementation, the registration management unit 113 sends the error message to the key management unit 104 to indicate that the instructions received at stage F were not sent from the key carrying device 102. In some implementations, on receiving the error message at stage H1, the key management unit 104 may resend the instructions to unregister the network device 112.

At stage H2, an unregistration confirmation message is sent to the key carrying device 102 over the secure communication channel. In one implementation, the registration management unit 113 sends the unregistration confirmation message (e.g., a message encrypted using the encryption key) over the secure communication channel to indicate to the key management unit 104 that the instructions to unregister were successfully received at the network device 112 from the key carrying device 102.

At stage I1, pairing data at the key carrying device 102 is cleared. In one implementation, the key management unit 104 clears the pairing data (corresponding to the network device 112) stored at the key carrying device 102. For example, the key management unit 104 may set IDY, KI, KE, and SN equal to null.

At stage I2, pairing data and a network key stored at the network device 112 are cleared. In one implementation, the registration management unit 113 clears the pairing data stored at the network device 112. For example, the registration management unit 113 may set IDB, KI', KE', and SN' equal to null. The registration management unit 113 may also delete the network key (which was received during registration with the key carrying device 102) stored at the network device 112.

Figure 7:
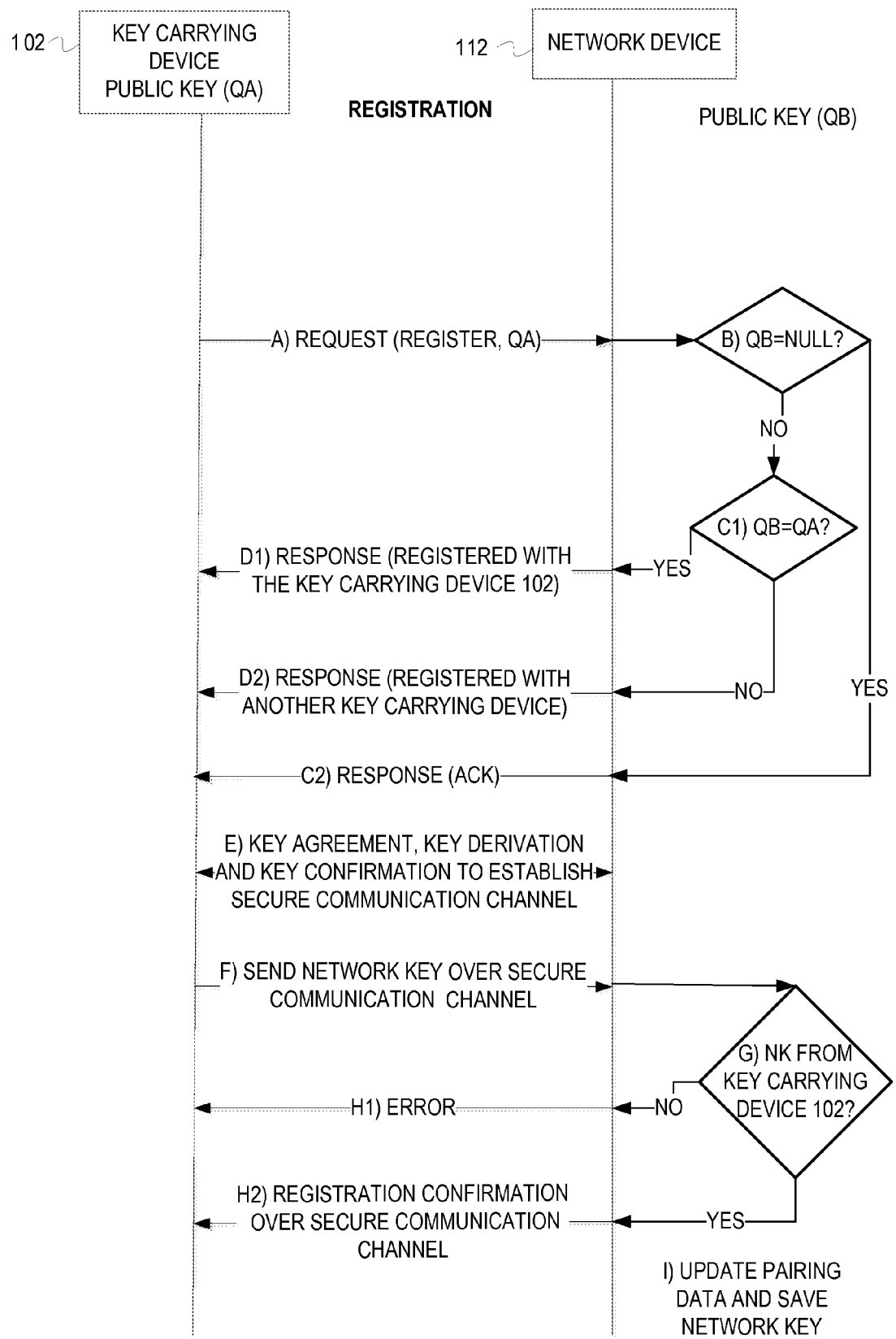
FIG. 7 illustrates a sequence diagram of example operations to register a network device using a second configuration technique.

FIG. 7 illustrates a sequence diagram of example operations to register a network device using a second configuration technique. FIG. 7 includes the key carrying device 102 and the network device 112 (as described above with reference to FIG. 1). The key carrying device 102 can utilize the second configuration technique when the pairing data stored on the network device 112 includes a public key of a key carrying device. For example, the network device 112 may store the public key in a variable QB. It is noted that the public key of the key carrying device 102 is QA, and when the network device 112 is registered with the key carrying device 102, QB can be set as QA. It is also noted that in the second configuration technique, the key carrying device 102 does not store pairing data for the network devices paired with the key carrying device 102. FIG. 7 illustrates interactions between the key carrying device 102 and the network device 112 to register the network device 112 in a sequence of stages A-I. Although FIG. 7 illustrates the operations being performed by the key management unit 104 and the registration management unit 113, in some implementations the operations may be performed by other units in the key carrying device 102 and the network device 112, respectively.

At stage A, a registration request is sent to the network device 112. In one implementation, the key management unit 104 in the key carrying device 102 sends the registration request to the registration management unit 113. For example, the registration request may include an instruction to register and QA.

At stage B, it is determined whether QB is null. In one implementation, the registration management unit 113 determines whether the value of QB stored at the network device 112 is null. If QB is null, the registration management unit 113 sends a response at stage C2 to the key management unit 104. If QB is not null, the registration management unit 113 can determine whether QB is equal to QA at stage C1.

At stage C1, it is determined whether QB is equal to QA. In one implementation, the registration management unit 113 determines whether QB is equal to QA. If QB is equal to QA, the registration management unit 113 sends a response to the key management unit 104 at stage D1. If QB is not equal to QA, the registration management unit 113 sends a response to the key management unit 104 at stage D2.

At stage C2, a response is sent to the network device 112. In one implementation, the registration management unit 113 sends the response to the key management unit 104. For example, the response may include an acknowledgment that the network device 112 is ready to be registered with the key carrying device 102.

At stage D1, a response is sent to the network device 112. In one implementation, the registration management unit 113 sends the response to the key management unit 104 to indicate that the network device 112 is already registered with the key carrying device 102.

At stage D2, a response is sent to the network device 112. In one implementation, the registration management unit 113 sends the response to the key management unit 104 to indicate that the network device 112 is registered with another key carrying device.

At stage E, key agreement, key derivation and key confirmation operations are performed to establish a secure communication channel. In one implementation, the key management unit 104 and the registration management unit 113 perform the key agreement, key derivation and key confirmation operations to establish the secure communication channel. For example, the key management unit 104 and the registration management unit 113 can determine secure channel keys (e.g., an encryption key, an integrity key, and a sequence number counter). The key management unit 104 and the registration management unit 113 can establish the secure communication channel using the secure channel keys. The secure communication channel can ensure integrity and replay protection for messages exchanged between the key carrying device 102 and the network device 112. The key management unit 104 and the registration management unit 113 may store the encryption key, the integrity key and the sequence number counter as long as the secure communication channel exists between the key carrying device 102 and the network device 112.

At stage F, a network key is sent over the secure communication channel. In one implementation, the key management unit 104 sends the network key of the communication network 100 stored at the key carrying device 102 to the registration management unit 113 over the secure communication channel. For example, the key management unit 104 may send the network key in a message (e.g., a message encrypted using the encryption key) along with the value of the sequence number counter at the time of message generation. It is noted that the sequence number counters stored at the network device 112 and the key carrying device 102 may be incremented each time a message is generated.

At stage G, it is determined whether the network key is received from the key carrying device 102. In one implementation, the registration management unit 113 determines whether the network key is received from the key carrying device 102. For example, the registration management unit 113 may utilize the value of the sequence number counter in the message received at stage F to determine whether the network key is received from the key carrying device 102. The registration management unit 113 can determine whether the network key is received from the key carrying device 102 by verifying that the value of the sequence number counter in the message is in sequence after the last message received from the key carrying device 102. If the network key is not received from the key carrying device 102, the registration management unit 113 may send an error message at stage H1 to the key management unit 104. If the network key is received from the key carrying device 102, the registration management unit 113 may send a registration confirmation message at stage H2 to the key management unit 104 over the secure communication channel.

At stage H1, an error message is sent to the key carrying device 102. In one implementation, the registration management unit 113 sends the error message to the key management unit 104 to indicate that the network key received by the network device 112 at stage F, was not sent from the key carrying device 102. In some implementations, on receiving the error message at stage H1, the key management unit 104 may resend the network key to the registration management unit 113.

At stage H2, a registration confirmation message is sent to the key carrying device 102 over the secure communication channel. In one implementation, the registration management unit 113 sends the registration confirmation message (e.g., a message encrypted using the encryption key) over the secure communication channel to indicate to the key management unit 104 that the network key was successfully received at the network device 112.

At stage I, pairing data at the network device 112 is updated and the network key is saved. In one implementation, the registration management unit 113 updates the pairing data stored at the network device 112. For example, the registration management unit 113 may set QB equal to QA (received at stage A) to update the pairing data. The registration management unit 113 may also save the network key received at stage F from the key management unit 104 at the network device 112.

Figure 8:
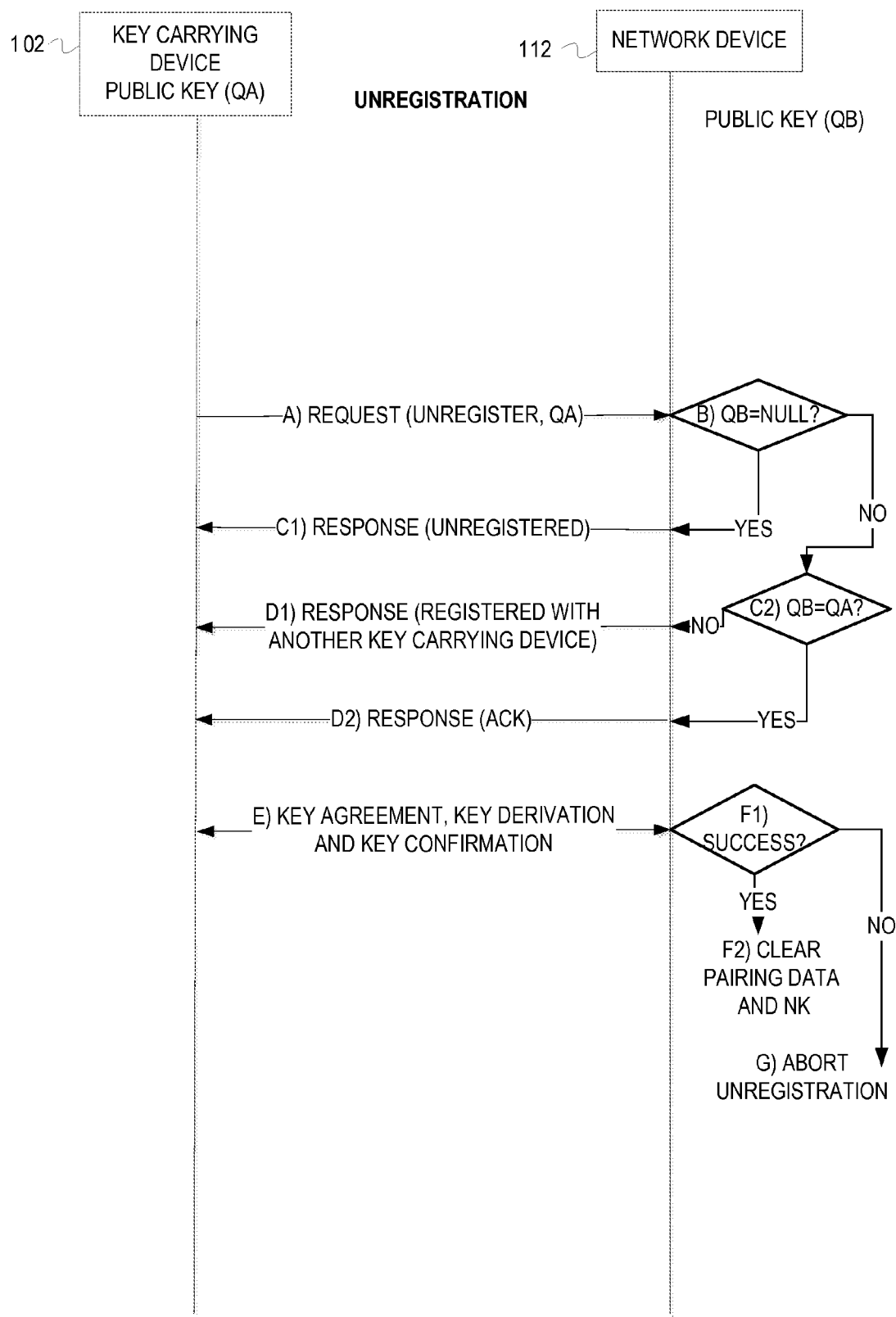
FIG. 8 illustrates a sequence diagram of example operations to unregister a network device using a second configuration technique.

FIG. 8 illustrates a sequence diagram of example operations to unregister a network device using a second configuration technique. FIG. 8 includes the key carrying device 102 and the network device 112 (as described above with reference to FIG. 7). The key carrying device 102 can utilize the second configuration technique to unregister the network device 112 when the pairing data stored on the network device 112 is similar to the pairing data described in FIG. 7. The key carrying device 102 can only unregister the network device 112 when the network device 112 is registered with the key carrying device 102. It is noted that when the network device 112 is registered with the key carrying device 102, QB is equal to QA. FIG. 8 illustrates interactions between the key carrying device 102 and the network device 112 to unregister the network device 112 in a sequence of stages A-G. Although FIG. 8 illustrates the operations being performed by the key management unit 104 and the registration management unit 113, in some implementations the operations may be performed by other units in the key carrying device 102 and the network device 112, respectively.

At stage A, an unregistration request is sent to the network device 112. In one implementation, the key management unit 104 in the key carrying device 102 sends the unregistration request to the registration management unit 113. For example, the unregistration request may include an instruction to unregister (i.e., clear pairing data) and QA.

At stage B, it is determined whether QB is null. In one implementation, the registration management unit 113 determines whether the value of QB stored at the network device 112 is null. If QB is null, the registration management unit 113 sends a response at stage C1 to the key management unit 104. If QB is not null, the registration management unit 113 can determine whether QB is equal to QA at stage C2.

At stage C1, a response is sent to the network device 112. In one implementation, the registration management unit 113 sends the response to the network device 112. For example, the response may indicate to the key management unit 104 that the network device 102 is unregistered (i.e., not registered with any key carrying device).

At stage C2, it is determined whether QB is equal to QA. In one implementation, the registration management unit 113 determines whether QB is equal to QA. If QB is equal to QA, the registration management unit 113 sends a response to the key management unit 104 at stage D1. If QB is not equal to QA, the registration management unit 113 sends a response to the key management unit 104 at stage D2.

At stage D1, a response is sent to the network device 112. In one implementation, the registration management unit 113 sends the response to the key management unit 104 to indicate that the network device 112 is registered with another key carrying device.

At stage D2, a response is sent to the network device 112. In one implementation, the registration management unit 113 sends the response to the key management unit 104. For example, the response may include an acknowledgement that the network device 112 is ready to be unregistered.

At stage E, key agreement, key derivation and key confirmation operations are performed. In one implementation, the key management unit 104 and the registration management unit 113 perform key agreement, key derivation, and key confirmation procedures. For example, the key management unit 104 unit may initiate the key agreement, key derivation, and key confirmation operations to prove its identity to the network device 112 (e.g., a successful key confirmation would indicate that the key carrying device 102 has knowledge of a secret key (e.g., an encryption key) associated with QB). In some implementations, the key management unit 104 may set an integrity key (e.g., MAC) (in messages sent to the registration management unit 113) as valid when the key carrying device 102 has knowledge of the secret key associated with QB. The success of key agreement, key derivation and key confirmation operations between the key carrying device 102 and the network device 112 can enable the network device 112 to identify the key carrying device 102.

At stage F1, it is determined whether the key agreement, key derivation, and key confirmation operations are successful. In one implementation, the registration management unit 113 determines whether the key agreement, key derivation, and key confirmation operations with the key carrying device 102 are successful. Success of the key agreement, key derivation, and key confirmation operations can allow the registration management unit 113 to determine that the unregistration request at stage A was received from the key carrying device 102. In some implementations, the registration management unit 113 determines whether an integrity key in a message received from the key management unit 104 is valid to determine that the unregistration request at stage A was received from the key carrying device 102. If the key agreement, key derivation, and key confirmation operations are successful, the registration management unit 113 clears the pairing data and the network key (received from the key carrying device 102 during registration) at stage F2. If the key agreement, key derivation, and key confirmation operations are not successful, the registration management unit 113 aborts the unregistration of the network device 112 at stage G.

At stage F2, pairing data and a network key stored at the network device 112 are cleared. In one implementation, the registration management unit 113 clears the pairing data and the network key stored at the network device 112. For example, the registration management unit 113 may delete the network key and set QB as null. In some implementations, on clearing the pairing data and the network key, the network device 112 may send a confirmation message to the key carrying device 102.

At stage G, an unregistration is aborted. In one implementation, the registration management unit 113 aborts the unregistration of the network device 112. For example, when the key agreement, key derivation, and key confirmation operations are not successful at stage F1, the registration management unit 113 may abort the unregistration of the network device 112. In some implementations, the registration management unit 113 may send an error message to the key management unit 104 on aborting the unregistration.

FIGS. 9, 10, 11 and 12 illustrate a sequence diagram of example operations to register a network device using a third configuration technique. FIGS. 9, 10, 11, and 12 include the key carrying device 102 and the network device 112 (as described above with reference to FIG. 1). The key carrying device 102 can utilize the third configuration technique when the pairing data stored on the key carrying device 102 includes a registration key (RKk) and the pairing data stored on the network device 112 includes a registration key (RKn). The key carrying device 102 and the network device 112 can also store a network key (NK) and a network key (NK'). The key carrying device 102 and the network device 112 may agree upon a hashing algorithm to encrypt and securely exchange RKk and RKn. The hashing algorithm may utilize a random number to encrypt RKk and RKn. For example, the random number may be concatenated with a registration key (i.e., the bits of the random number may be appended to the registration key to determine a concatenated value) and then a hashed value of the concatenated value may be calculated as the encrypted value of the registration key. The random number may be exchanged without any encryption between the network device 112 and the key carrying device 102, and allows the network device 112 and the key carrying device 102 to encrypt their registration keys. It is noted that RKk and RKn represent example variables for storing registration keys at the key carrying device 102 and the network device 112, respectively. Similarly, NK and NK' represent example variables for storing network keys at the key carrying device 102 and the network device 112, respectively. It is further noted that the values of RKk and RKn are equal when the network device 112 is registered with the key carrying device 102. Also, the values of NK and NK' are equal when the network device 112 is configured with the communication network (i.e., the communication network 100) managed by the key carrying device 102. It is also noted that RKn and NK' may be null when the network device 112 is in not registered with any key carrying device. In some implementations, RKk and NK may also be null (e.g., when the key carrying device 102 does not have the network key of the communication network 100). However, the key carrying device 102 includes capabilities to generate a random value of RKk and NK when the values of RKk and/or NK are null. FIGS. 9, 10, 11, and 12 illustrate interactions between the key carrying device 102 and the network device 112 to register the network device 112 in a sequence of stages A-AD. Although FIGS. 9, 10, 11 and 12 illustrate the operations being performed by the key management unit 104 and the registration management unit 113, in some implementations the operations may be performed by other units in the key carrying device 102 and the network device 112, respectively.

At stage A, a hello request is sent to the network device 112. In one implementation, the key management unit 104 in the key carrying device 102 sends the hello request to the registration management unit 113. For example, the hello request may include a random number N1. The random number N1 may be utilized by the registration management unit 113 to encrypt RKn at stage B.

At stage B, encrypted values of RKn and NK' are calculated. In one implementation, the registration management unit 113 calculates the encrypted values of RKn and NK'. For example, the registration management unit 113 can calculate a hashed value of RKn concatenated with N1, and a hashed value of NK' using the hashing algorithm agreed upon with the key carrying device 102. It is noted that when RKn and/or NK' are null, the encrypted values of the RKn and/or NK' may also be null.

At stage C, a hello response is sent to the key carrying device 102. In one implementation, the registration management unit 113 sends the hello response to the key management unit 104. For example, the hello response may include the encrypted values of RKn and NK' (calculated at stage B) and a random number N2. The random number N2 may be utilized by the key management unit 104 for encrypting RKk (as will be described below at stage O1).

At stage D, it is determined whether the encrypted value of RKn is null. In one implementation, the key management unit 104 determines whether the encrypted value of RKn (received at stage C) is null. If the encrypted value of RKn is null, the key management unit 104 can determine that the network device 112 is not registered to any key carrying device and the key management unit 104 can register the network device 112. For example, if the encrypted value of RKn is null, the key management unit 104 may perform operations at stage E. If the encrypted value of RKn is not null, the key management unit 104 can determine that the network device 112 is registered to a key carrying device and control flows to link 2.1 where the key management unit 104 may perform operations at stage K.

At stage E, it is determined whether RKk is null. In one implementation, the key management unit 104 determines whether the RKk stored at the key carrying device 102 is null. If RKk is null, the key management unit 104 may perform operations at stage F. If RKk is not null, the key management unit 104 may perform operations at stage G.

At stage F, a random RKk is generated. In one implementation, the key management unit 104 generates the random RKk using a pseudo random number algorithm. For example, when a registration key does not exist at the key carrying device 102, the key management unit 104 can generate a new random registration key that may be sent to the registration management unit 113 to register the network device 112 with the key carrying device 102. In some implementations, the key management unit 104 saves the random RKk as RKk stored at the key carrying device 102.

At stage G, a secure communication channel is established with the network device 112. In one implementation, the key management unit 104 can establish the secure communication channel by performing key agreement, key derivation, and key confirmation operations with the registration management unit 113. The secure communication channel can allow the key management unit 104 to send RKk to the registration management unit 113 (at stage H) without encrypting RKk.

At stage H, a registration request is sent to the network device 112. In one implementation, the key management unit 104 sends the registration request to the registration management unit 113 over the secure communication channel. For example, the registration request may include RKk.

At stage I, RKk is saved at the network device 112. In one implementation, the registration management unit 113 saves RKk received from the key management unit 104 in the registration request at stage H. For example, the registration management unit 113 may set RKn equal to RKk to save RKk and register with the key carrying device 102.

At stage J, a registration response is sent to the key carrying device 102. In one implementation, the registration management unit 113 sends the registration response to the key management unit 104. For example, the registration response may indicate to the key management unit 104 that the network device 112 is registered with the key carrying device 102. On receiving the registration response at stage J, control flows to link 2.2 where the key management unit 104 may perform operations at stage M.

At stage K, it is determined whether the encrypted value of RKn is equal to an encrypted value of RKk. In one implementation, the key management unit 104 determines whether the encrypted value of RKn (received at stage C) is equal to the encrypted value of RKk. The key management unit 104 can calculate the encrypted value of RKk by calculating a hashed value of RKk concatenated with N1 using the hashing algorithm agreed upon with the network device 112. If the encrypted value of RKn is equal to the encrypted value of RKk, the key management unit 104 can determine that the network device 112 is registered with the key carrying device 102, and the key management unit 104 may perform operations at stage M. If the encrypted value of RKn is not equal to the encrypted value of RKk, the key management unit 104 can determine that the network device 112 is registered with another key carrying device (different from the key carrying device 102), and the key management unit 104 can stop registration operations at stage L.

At stage L, registration operations are stopped. In one implementation, the key management unit 104 may stop the operations to register the network device 112 with the key carrying device 102.

At stage M, it is determined whether the encrypted value of NK' is null. In one implementation, the key management unit 104 determines whether the encrypted value of NK' (received at stage C) is null. If the encrypted value of the NK' is null the key management unit 104 can determine that a network key is not stored at the network device 112, and control flows to link 4 where the key management unit 104 may perform operations at stage V. If the encrypted value of NK' is not null, the key management unit 104 may perform operations at stage N.

At stage N, it is determined whether to use network key of the network device 112. In one implementation, the key management unit 104 determines whether to use the network key of the network device 112. For example, the key management unit 104 may determine to use (e.g., receive and save) the network key stored at the network device 112 when the network key of the communication network 100 is not stored at the key carrying device 102. If the key management unit 104 determines to use the network key of the network device 112, control flows to link 3 where the key management unit 104 may perform operations at stage O1. If the key management unit 104 determines not to use the network key of the network device 112, control flows to link 4 where the key management unit 104 may perform operations at stage V.

At stage O1, an encrypted value of RKk is calculated. In one implementation, the key management unit 104 calculates the encrypted value of RKk. For example, the key management unit 104 calculates a hashed value of RKk concatenated with N2 (i.e., the N2 received at stage C) using the hashing algorithm agreed upon with the network device 112.

At stage O2, a get network key request is sent to the network device 112. In one implementation, the key management unit 104 sends the get network key request to the registration management unit 113. For example, the get network key request includes the encrypted value of RKk (calculated at stage O1). The get network key request may include a request for NK' stored at the network device 112.

At stage P, it is determined whether the encrypted value of RKk is equal to an encrypted value of RKn. In one implementation, the registration management unit 113 determines whether the encrypted value of RKk (received at stage O2) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the get network key request was received from the key carrying device 102 (and not from a malicious device), and the registration management unit 113 can send a get network key response at stage R. If the encrypted value of RKk is not equal to the encrypted value of RKn, the registration management unit 113 may determine that the get network key request at stage O2 was sent by a malicious device and the registration management unit 113 can detect an error at stage Q.

At stage Q, an error is detected. In one implementation, the registration management unit 113 detects the error. For example, the registration management unit 113 may detect the error occurred as a result of a get network key request sent by a malicious device.

At stage R, a get network key response is sent to the network device 112. In one implementation, the registration management unit 113 sends the get network key response to the key management unit 104. For example, the get network key response may include NK' when the registration management unit 113 determines that the encrypted value of RKk is equal to the encrypted value of RKn at stage P. The get network key response may include the error detected at stage Q, when the encrypted value of RKk is not equal to the encrypted value of RKn at stage P. In some implementations, the registration management unit 113 may establish a secure channel (e.g., by performing key agreement, key derivation and key confirmation operations) with the key management unit 104, and may send the get network key response over the secure communication channel.

At stage S, it is determined whether the get network key response includes an error. In one implementation, the key management unit 104 determines whether the get network key response includes the error. For example, the key management unit 104 may determine that the get network key response includes the error detected by the registration management unit 113 at stage Q. If the get network key response includes the error, the key management unit 104 may stop the registration operations at stage U. If the get network key response does not include the error, the key management unit 104 may perform operations at stage T.

At stage T, NK' is saved. In one implementation, the key management unit 104 saves NK' received in the registration response from the registration management unit 113 at stage R. For example, the key management unit 104 may set NK equal to NK' to save NK'.

At stage U, the registration operations are stopped. In one implementation, the key management unit 104 stops the registration operations to register the network device 112 with the key carrying device 102.

At stage V, it is determined whether NK is null. In one implementation, the key management unit 104 determines whether NK stored at the key carrying device 102 is null. If NK is null, the key management unit 104 may perform operations at stage W. If NK is not null, the key management unit 104 may perform operations at stage X.

At stage W, a random NK is generated. In one implementation, the key management unit 104 generates the random NK. For example, the key management unit 104 may generate the random NK using a pseudo random number algorithm. In some implementations, the key management unit 104 saves the random NK as NK stored at the key carrying device 102. After stage W, the key management unit 104 may perform operations at stage X.

At stage X, an encrypted value of RKk is calculated. In one implementation, the key management unit 104 calculates the encrypted value of RKk. For example, the key management unit 104 may calculate a hashed value of RKk concatenated with N2 (i.e., N2 received at stage C) using the hashing algorithm agreed upon with the network device 112.

At stage Y, a set network key request is sent to the network device 112. In one implementation, the key management unit 104 sends the set network request to the registration management unit 113. For example, the set network key request may include NK and the encrypted value of RKk (calculated at stage X). In some implementations, the set network key request may include an encrypted value of NK instead of NK. In other implementations, the key management unit 104 may establish a secure communication channel with the registration management unit 113 and send the set network key request over the secure communication channel.

At stage Z, it is determined whether the encrypted value of RKk is equal to an encrypted value of RKn. In one implementation, the registration management unit 113 determines whether the encrypted value of RKk (received at stage Y) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the set network key request at stage Y was received from the key carrying device 102 (and not from a malicious device), and the registration management unit 113 can save NK at stage AB. If the encrypted value of RKk is not equal to the encrypted value of RKn, the registration management unit 113 may determine that the set network key request at stage Y was sent by a malicious device and the registration management unit 113 can detect an error at stage AA.

At stage AA, an error is detected. In one implementation, the registration management unit 113 detects the error. For example, the registration management unit 113 may detect the error occurred as a result of a set network key request sent by a malicious device.

At stage AB, NK is saved. In one implementation, the registration management unit 113 saves NK received in the set network key request at stage Y. For example, the registration management unit 113 may set NK' equal to NK to save NK at the network device 112.

At stage AC, a set network key response is sent to the key carrying device 102. In one implementation, the registration management unit 113 sends the set network key response to the key management unit 104. For example, the set network key response may include an acknowledgement when the registration management unit 113 saves NK at stage AB. The set network key response may include the error, when the registration management unit 113 detects the error at stage AA.

At stage AD, the registration operations are stopped. In one implementation, the key management unit 104 stops the registration operations to register the network device 112. For example, the key management unit 104 may stop the registration operations on receiving the set network key response from the registration management unit 113. In some implementations, when the set network key response includes the error, the key management unit 104 may perform one or more operations to resend the set network key request to the registration management unit 113.

FIG. 13 illustrates a sequence diagram of example operations of a first option to unregister a network device using a third configuration technique. FIG. 13 includes the key carrying device 102 and the network device 112 (as described above with reference to FIGS. 9, 10, 11, and 12). The key carrying device 102 can utilize the first option to unregister the network device 112 using the third configuration technique when the pairing data stored on the key carrying device 102 and the network device 112 is similar to the pairing data described in FIGS. 9, 10, 11 and 12. In the first option to unregister the network device 112 using the third configuration technique, the key carrying device 102 performs the operations to determine whether the network device 112 is registered with the key carrying device 102. The key carrying device 102 can only unregister the network device 112 when the network device 112 is registered with the key carrying device 102. It is noted that when the network device 112 is registered with the key carrying device 102, RKn is equal to RKk. FIG. 13 illustrates interactions between the key carrying device 102 and the network device 112 to unregister the network device 112 in a sequence of stages A-L. Although FIG. 13 illustrates the operations being performed by the key management unit 104 and the registration management unit 113, in some implementations the operations may be performed by other units in the key carrying device 102 and the network device 112, respectively.

At stage A, a hello request is sent to the network device 112. In one implementation, the key management unit 104 sends the hello request to the registration management unit 113. For example, the hello request may include a random number N1. The random number N1 may be utilized by the registration management unit 113 to encrypt RKn at stage B.

At stage B, encrypted values of RKn and NK' are calculated. In one implementation, the registration management unit 113 calculates the encrypted values of RKn and NK'. For example, the registration management unit 113 can calculate a hashed value of RKn concatenated with N1, and a hashed value of NK' using the hashing algorithm agreed upon with the key carrying device 102. It is noted that when RKn and/or NK' are null, the encrypted values of the RKn and/or NK' may also be null.

At stage C, a hello response is sent to the key carrying device 102. In one implementation, the registration management unit 113 sends the hello response to the key management unit 104. For example, the hello response may include the encrypted values of RKn and NK' (calculated at stage B) and a random number N2. The random number N2 may be utilized by the key management unit 104 for encrypting RKk (as will be described below at stage F).

At stage D, it is determined whether the encrypted value of RKn is null. In one implementation, the registration management unit 113 determines whether the encrypted value of RKn (received at stage C) is null. If the encrypted value of RKn is null, the key management unit 104 can determine that the network device 112 is not registered to any key carrying device and the key management unit 104 may stop unregistration operations at stage L. If the encrypted value of RKn is not null, the key management unit 104 can determine that the network device 112 is registered with a key carrying device, and the key management unit 104 may perform operations at stage E.

At stage E, it is determined whether the encrypted value of RKn is equal to an encrypted value of RKk. In one implementation, the key management unit 104 determines whether the encrypted value of RKn (received at stage C) is equal to the encrypted value of RKk. The key management unit 104 can calculate the encrypted value of RKk by calculating a hashed value of RKk concatenated with N1 using the hashing algorithm agreed upon with the network device 112. If the encrypted value of RKn is equal to the encrypted value of RKk, the key management unit 104 can determine that the network device 112 is registered with the key carrying device 102, and the key management unit 104 can unregister the network device 112. If the encrypted value of RKn is not equal to the encrypted value of RKk, the key management unit 104 can determine that the network device 112 is registered with another key carrying device (different from the key carrying device 102), and the key management unit 104 can stop the unregistration operations at stage L.

At stage F, an encrypted value of RKk is calculated. In one implementation, the key management unit 104 calculates the encrypted value of RKk. For example, the key management unit 104 calculates a hashed value of RKk concatenated with N2 (i.e., the N2 received at stage C) using the hashing algorithm agreed upon with the network device 112.

At stage G, an unregistration request is sent to the network device 112. In one implementation, the key management unit 104 sends the unregistration request to the registration management unit 113. For example, the unregistration request may include the encrypted value of RKk (calculated at stage F) and a request to delete values of RKn and NK'.

At stage H, it is determined whether the encrypted value of RKk is equal to an encrypted value of RKn. In one implementation, the registration management unit 113 determines whether the encrypted value of RKk (received at stage G) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the unregistration request was received from the key carrying device 102 (and not from a malicious device), and the registration management unit 113 can delete the values of RKn and NK' at stage I. If the encrypted value of RKk is not equal to the encrypted value of RKn, the registration management unit 113 may determine that the unregistration request at stage G was sent by a malicious device and the registration management unit 113 can detect an error at stage J.

At stage I, values of RKn and NK' are deleted. In one implementation, the registration management unit 113 deletes the values of RKn and NK'. Once the values of RKn and NK' are deleted, the network device 112 is no longer registered with the key carrying device 102, and the registration management unit 113 can send an acknowledgment to the key management unit 104 to confirm the unregistration of the network device 112 (as described below at stage K).

At stage J, an error is detected. In one implementation, the registration management unit 113 detects the error. For example, the registration management unit 113 may detect the error occurred as a result of an unregistration request sent by a malicious device.

At stage K, an unregistration response is sent to the key carrying device 102. In one implementation, the registration management unit 113 sends the unregistration response to the key management unit 104. For example, the unregistration response may include an acknowledgement when the registration management unit 113 deletes the values of RKn and NK' at stage I. The unregistration response may include the error, when the registration management unit 113 detects the error at stage J.

At stage L, unregistration operations are stopped. In one implementation, the key management unit 104 stops the unregistration operations to unregister the network device 112. In some implementations, the key management unit 104 may resend the unregistration request to the registration management unit 113 when the unregistration response (received at stage K) includes the error.

Figure 14:
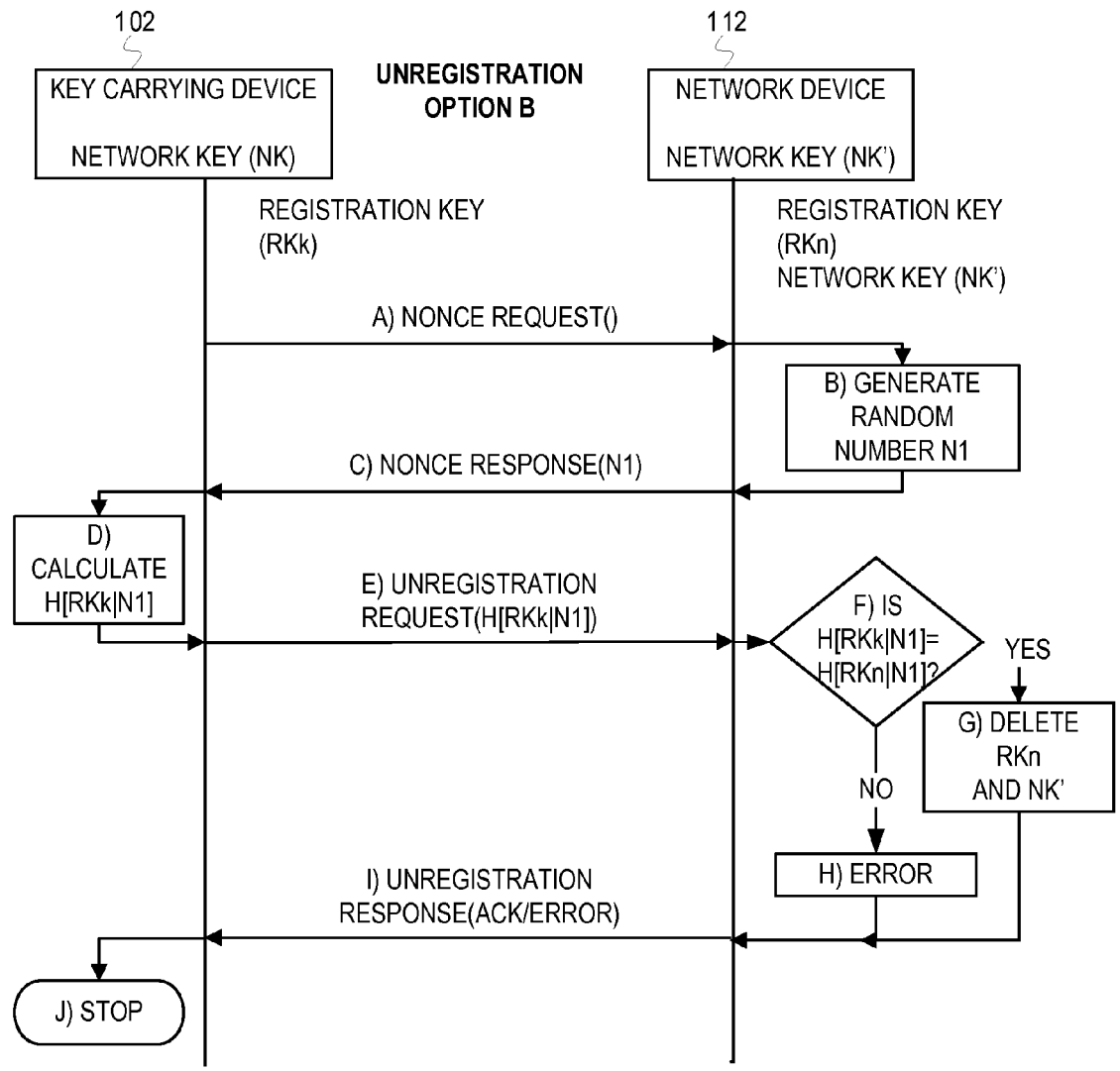
FIG. 14 illustrates a sequence diagram of example operations of a second option to unregister a network device using a third configuration technique.

FIG. 14 illustrates a sequence diagram of example operations of a second option to unregister a network device using a third configuration technique. FIG. 14 includes the key carrying device 102 and the network device 112 (as described above with reference to FIGS. 9, 10, 11, and 12). The key carrying device 102 can utilize the second option to unregister the network device 112 using the third configuration technique when the pairing data stored on the key carrying device 102 and the network device 112 is similar to the pairing data described in FIGS. 9, 10, 11 and 12. In the second option to unregister the network device 112 using the third configuration technique, the network device 112 performs the operations to determine whether the network device 112 is registered with the key carrying device 102. On receiving an unregistration request from the key carrying device 102, the network device 112 may only perform unregistration operations when the network device 112 determines that the network device 112 is registered with the key carrying device 102. It is noted that when the network device 112 is registered with the key carrying device 102, RKn is equal to RKk. FIG. 14 illustrates interactions between the key carrying device 102 and the network device 112 to unregister the network device 112 in a sequence of stages A-J. Although FIG. 14 illustrates the operations being performed by the key management unit 104 and the registration management unit 113, in some implementations the operations may be performed by other units in the key carrying device 102 and the network device 112, respectively.

At stage A, a nonce request is sent to the network device 112. In one implementation, the key management unit 104 sends the nonce request to the registration management unit 113. For example, the nonce request includes a request for a random number from the registration management unit 113.

At stage B, a random number is generated. In one implementation, the registration management unit 113 generates the random number (i.e., N1). For example, the registration management unit 113 may generate N1 such that N1 may be utilized to encrypt a registration key using the hashing algorithm agreed upon between the key carrying device 102 and the network device 112.

At stage C, a nonce response is sent to the network device 112. In one implementation, the registration management unit 113 sends the nonce response to the key management unit 104. For example, the nonce response can include N1 (generated at stage B).

At stage D, an encrypted value of RKk is calculated. In one implementation, the key management unit 104 calculates the encrypted value of RKk. For example, the key management unit 104 may calculate a hashed value of RKk concatenated with N1 (i.e., N1 received at stage C) using the hashing algorithm agreed upon with the network device 112.

At stage E, an unregistration request is sent to the network device 112. In one implementation, the key management unit 104 sends the unregistration request to the registration management unit 113. For example, the unregistration request may include the encrypted value of RKk (calculated at stage D) and a request to delete values of RKn and NK'.

At stage F, it is determined whether the encrypted value of RKk is equal to an encrypted value of RKn. In one implementation, the registration management unit 113 determines whether the encrypted value of RKk (received at stage E) is equal to the encrypted value of RKn. The registration management unit 113 can calculate the encrypted value of RKn by calculating a hashed value of RKn concatenated with N1 using the hashing algorithm agreed upon with the key carrying device 102. If the encrypted value of RKk is equal to the encrypted value of RKn the registration management unit 113 can determine that the unregistration request (received at stage E) was received from the key carrying device 102, and the registration management unit 113 can delete the values of RKn and NK' at stage G. If the encrypted value of RKk is not equal to the encrypted value of RKn, the registration management unit 113 can determine that the unregistration request was not received from the key carrying device 102 (and was instead received from a malicious device), and the registration management unit 113 may detect an error at stage H.

At stage G, values of RKn and NK' are deleted. In one implementation, the registration management unit 113 deletes the values of RKn and NK'. Once the values of RKn and NK' are deleted, the network device 112 is no longer registered with the key carrying device 102, and the registration management unit 113 can send an acknowledgment to the key management unit 104 to confirm the unregistration of the network device 112 (as described below at stage I).

At stage H, an error is detected. In one implementation, the registration management unit 113 detects the error. For example, the registration management unit 113 may detect the error occurred as a result of an unregistration request received from a malicious device.

At stage I, an unregistration response is sent to the key carrying device 102. In one implementation, the registration management unit 113 sends the unregistration response to the key management unit 104. For example, the unregistration response may include an acknowledgement when the registration management unit 113 deletes the values of RKn and NK' at stage G. The unregistration response may include the error, when the registration management unit 113 detects the error at stage H.

At stage J, unregistration operations are stopped. In one implementation, the key management unit 104 stops the unregistration operations to unregister the network device 112. In some implementations, the key management unit 104 may resend the unregistration request to the registration management unit 113 when the unregistration response (received at stage I) includes the error.

Figure 15:
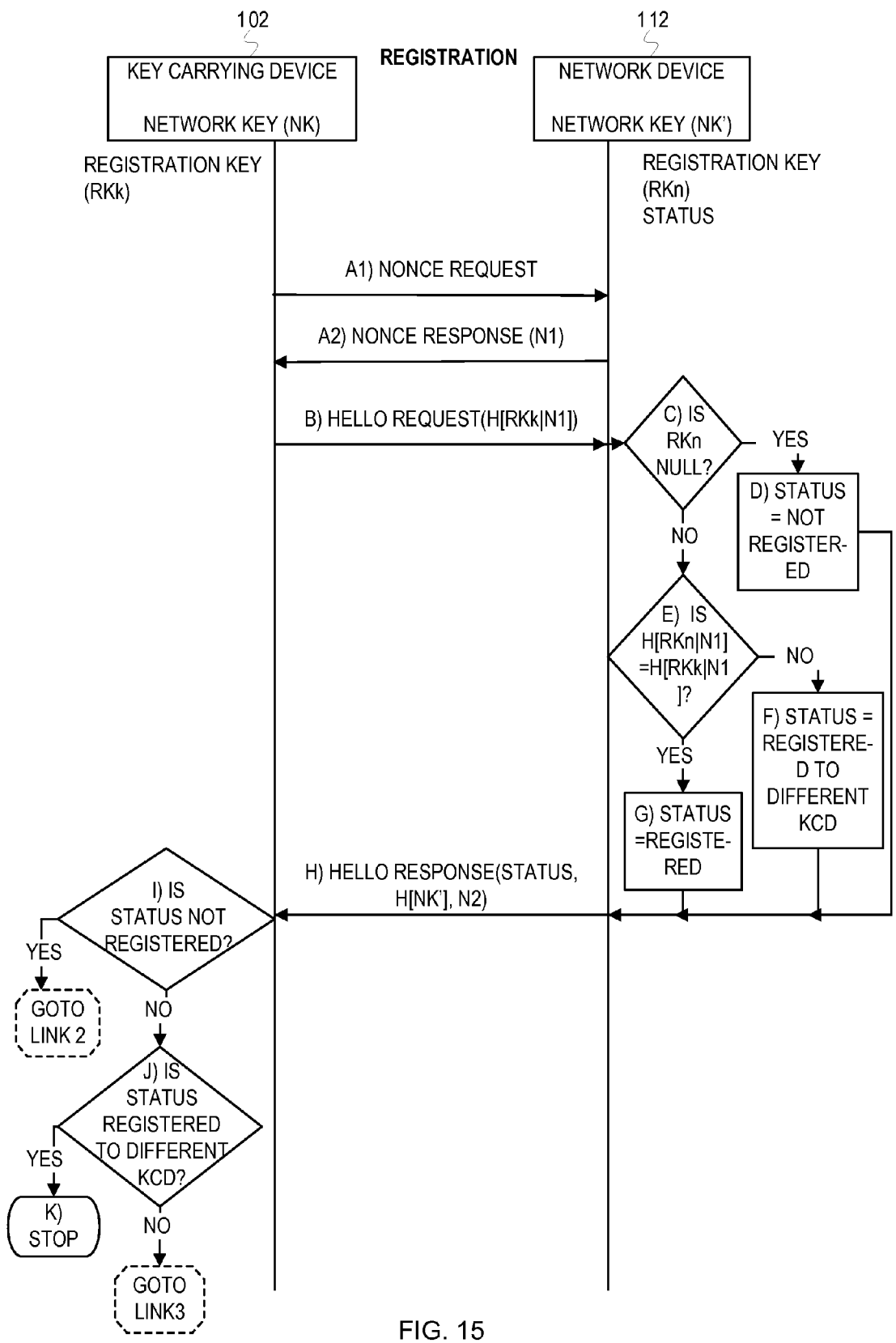
FIGS. 15, 16 and 17 illustrate a sequence diagram of example operations to register a network device using a fourth configuration technique.
Figure 16:
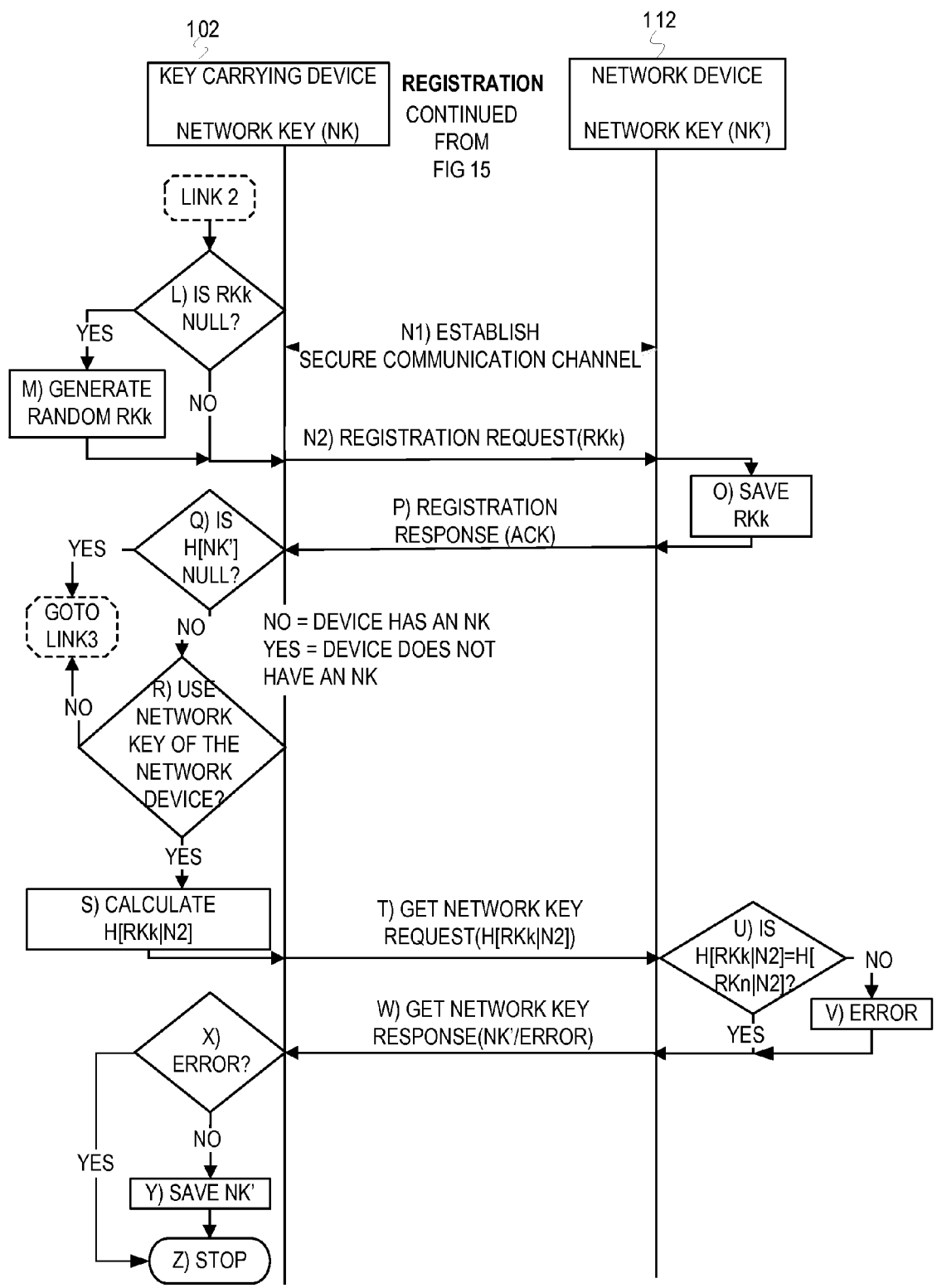
Figure 17:
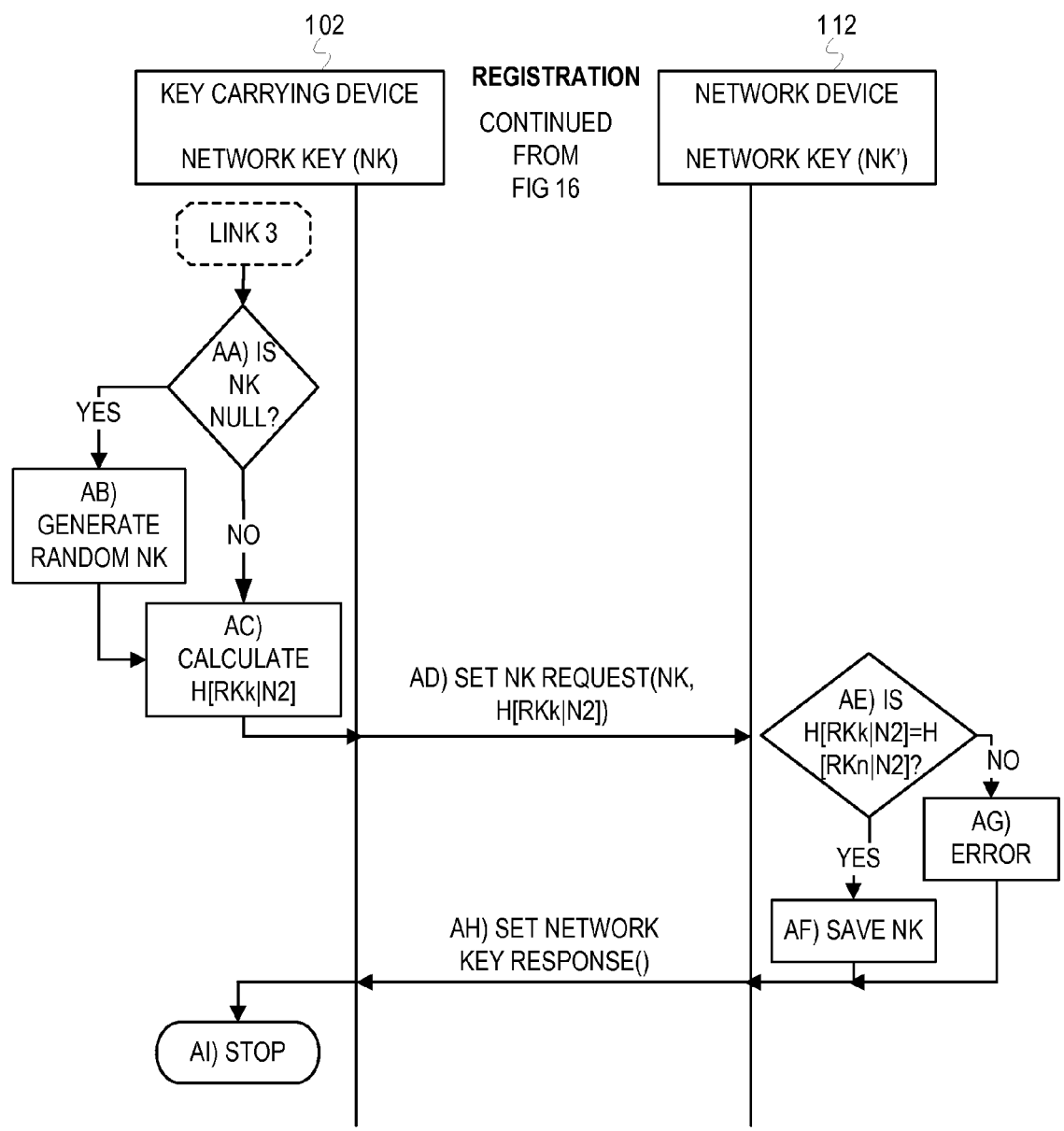

FIGS. 15, 16 and 17 illustrate a sequence diagram of example operations to register a network device using a fourth configuration technique. FIGS. 15, 16, and 17 include the key carrying device 102 and the network device 112 (as described above with reference to FIG. 1). The key carrying device 102 can utilize the fourth configuration technique when the pairing data stored on the key carrying device 102 includes a registration key (RKk) and the pairing data stored on the network device 112 includes a registration key (RKn), and a status of the network device 112 (Status). In the fourth configuration technique, the network device 112 performs the operations to determine the status of the network device 112 (e.g., whether the network device 112 is registered with the key carrying device 102, registered with another key carrying device or is unregistered). The network device 112 may send its status (e.g., by sending Status) to the key carrying device 102. The key carrying device 102 and the network device 112 can also store a network key (NK) and a network key (NK'). The key carrying device 102 and the network device 112 may agree upon a hashing algorithm to encrypt and securely exchange RKk and RKn. The hashing algorithm may utilize a random number to encrypt RKk and RKn. For example, the random number may be concatenated with a registration key (e.g., the bits of the random number can be appended to the registration key to determine a concatenated value) and then a hashed value of the concatenated value may be calculated as the encrypted value of the registration key. The random number may be exchanged without any encryption between the network device 112 and the key carrying device 102, and allows the network device 112 and the key carrying device 102 to encrypt their registration keys. It is noted that RKk and RKn, and Status represent example variables for storing a registration key at the key carrying device 102, a registration key at the network device 112, and a status of the network device 112, respectively. Similarly, NK and NK' represent example variables for storing a network key at the key carrying device 102, and a network key at the network device 112, respectively. It is further noted that Status is set as 'registered', and the values of RKk and RKn are equal when the network device 112 is registered with the key carrying device 102. Also, the values of NK and NK' are equal when the network device 112 is configured with the communication network (i.e., the communication network 100) managed by the key carrying device 102. It is also noted that Status may be set as 'not-registered', and RKn and NK' may be null when the network device 112 is not registered with any key carrying device. In some implementations, RKk and NK may also be null (e.g., when the key carrying device 102 does not have the network key of the communication network 100). However, the key carrying device 102 includes capabilities to generate a random value of RKk and NK when the values of RKk and/or NK are null. FIGS. 15, 16, and 17 illustrate interactions between the key carrying device 102 and the network device 112 to register the network device 112 in a sequence of stages A1-AI. Although FIGS. 15, 16, and 17 illustrate the operations being performed by the key management unit 104 and the registration management unit 113, in some implementations the operations may be performed by other units in the key carrying device 102 and the network device 112, respectively.

At stage A1, a nonce request is sent to the network device 112. In one implementation, the key management unit 104 sends the nonce request to the registration management unit 113. For example, the nonce request includes a request for a random number from the network device 112.

At stage A2, a nonce response is sent to the network device 112. In one implementation, the registration management unit 113 sends the nonce response to the key management unit 104. For example, the nonce response can include N1 (a random number generated by the registration management unit 113). N1 may be utilized to encrypt a registration key using the hashing algorithm agreed upon between the key carrying device 102 and the network device 112.

At stage B, a hello request is sent to the network device 112. In one implementation, the key management unit 104 sends the hello request to the registration management unit 113. For example, the hello request may include an encrypted value of RKk and a request for Status. The key management unit 104 may calculate the encrypted value of RKk by calculating a hashed value of RKk concatenated with N1 (i.e., N1 received at stage A2) using the hashing algorithm agreed upon with the network device 112.

At stage C, it is determined whether RKn is null. In one implementation, the registration management unit 113 determines whether RKn is null. For example, the registration management unit 113 can determine RKn is null by checking whether the encrypted value of RKn received at stage B is null. If RKn is null, the registration management unit 113 may set Status as 'not registered' at stage D. If RKn is not null, the registration management unit 113 may determine whether the encrypted value of RKk is equal to an encrypted value of RKn at stage E.

At stage D, Status is set as 'not registered'. In one implementation, the registration management unit 113 sets Status as 'not registered', and the registration management unit 113 may send Status to the key management unit 104 at stage H.

At stage E, it is determined whether the encrypted value of RKk is equal to an encrypted value of RKn. In one implementation, the registration management unit 113 determines whether the encrypted value of RKn (received at stage B) is equal to the encrypted value of RKn. The registration management unit 113 can calculate the encrypted value of RKn by calculating a hashed value of RKn concatenated with N1 using the hashing algorithm agreed upon with the key carrying device 102. If the encrypted value of RKk is equal to the encrypted value of RKn, the registration management unit 113 can determine that the network device 112 is registered with the key carrying device 102, and the registration management unit 113 may set Status as 'registered' at stage G. If the encrypted value of RKk is not equal to the encrypted value of RKn, the registration management unit 113 can determine that the network device 112 is registered with another key carrying device (different from the key carrying device 102), and the registration management unit 113 can set Status as 'registered to different KCD'.

At stage F, Status is set as 'registered to different KCD'. In one implementation, the registration management unit 113 sets Status stored at the network device 112 as 'registered to different KCD'. The registration management unit 113 may send Status to the key management unit 104 at stage H.

At stage G, Status is set as 'registered'. In one implementation, the registration management unit 113 sets Status as 'registered'. The registration management unit 113 may send Status to the key management unit 104 at stage H.

At stage H, a hello response is sent to the key carrying device 102. In one implementation, the registration management unit 113 sends the hello response to the key management unit 104. For example, the hello response may include Status, an encrypted value of NK', and a random number (N2). The registration management unit 113 can calculate the encrypted value of NK' using the hashing algorithm agreed upon with the key carrying device 102. N2 may be utilized by the key carrying device 102 to encrypt RKk using the hashing algorithm agreed upon between the key carrying device 102 and the network device 112 (as described below at stage S).

At stage I, it is determined whether Status received is 'not registered'. In one implementation, the key management unit 104 determines whether Status received at stage H is 'not registered'. If Status is 'not registered', control flows to link 2, and the key management unit 104 may perform operations at stage L. If Status is not 'not registered', the key management unit 104 may perform operations at stage J.

At stage J, it is determined whether Status is 'registered to different KCD'. In one implementation, the key management unit 104 determines whether Status is 'registered to different KCD'. If Status is 'registered to different KCD', the key management unit 104 can determine that the network device 112 is not registered with the key carrying device 102, and the key management unit 104 can stop registration operations at stage K. If Status is not 'registered to different KCD', control flows to link 3 and the key management unit 104 may perform operations at stage AA.

At stage K, the registration operations are stopped. In one implementation, the key management unit 104 stops the registration operations to register the network device 112 with the key carrying device 102.

At stage L, it is determined whether RKk is null. In one implementation, the key management unit 104 determines whether RKk stored at the key carrying device 102 is null. If RKk is null, the key management unit 104 generates a random RKk at stage M. If RKk is not null, the key management unit 104 establishes a secure communication channel at stage N1.

At stage M, a random RKk is generated. In one implementation, the key management unit 104 generates the random RKk using a pseudo random number algorithm. For example, when a registration key does not exist at the key carrying device 102, the key management unit 104 can generate a new random registration key that may be sent to a network device to register the network device with the key carrying device 102. In some implementations, the key management unit 104 saves the random RKk as RKk stored at the key carrying device 102.

At stage N1, a secure communication channel is established with the network device 112. In one implementation, the key management unit 104 can establish the secure communication channel by performing key agreement, key derivation, and key confirmation operations with the registration management unit 113. The secure communication channel can allow the key management unit 104 to send RKk to the registration management unit 113 (at stage N2) without encrypting RKk using the hashing algorithm.

At stage N2, a registration request is sent to the network device 112. In one implementation, the key management unit 104 sends the registration request to the registration management unit 113. The registration request may include RKk.

At stage O, RKk is saved at the network device 112. In one implementation, the registration management unit 113 saves RKk received from the key management unit 104 at stage N1. For example, the registration management unit 113 may set RKn as RKk to save RKk and set Status as 'registered'. On saving RKk, the network device 112 is registered with the key carrying device 102 and the registration management unit 113 may send an acknowledgement to the key management unit 104 at stage P.

At stage P, a registration response is sent to the key carrying device 102. In one implementation, the registration management unit 113 sends the registration response to the key management unit 104. For example, the registration response may include an acknowledgement that the network device 112 is registered with the key carrying device 102. In some implementations, the registration response may include Status stored at the network device 112.

At stage Q, it is determined whether the encrypted value of NK' is null. In one implementation, the key management unit 104 determines whether the encrypted value of NK' received at stage H is null. If the encrypted value of NK' is null, the key management unit 104 determines that the network device 112 does not have a network key, and the control flows to link 3 where the key management unit 104 may perform operations at stage AA. If the encrypted value of NK' is not null, the key management unit 104 determines that the network device 112 has a network key stored at the network device 112, and the key management unit 104 may perform operations at stage R.

At stage R, it is determined whether to use a network key of the network device 112. In one implementation, the key management unit 104 determines whether to use the network key of the network device 112. For example, the key management unit 104 may determine to use (e.g., receive and save) the network key stored at the network device 112 when the network key of the communication network 100 is not stored at the key carrying device 102. If the key management unit 104 determines not to use the network key of the network device 112, control flows to link 3 where the key management unit 104 may perform operations at stage AA. If the key management unit 104 determines to use the network key of the network device 112, the key management unit 104 may perform operations at stage S.

At stage S, an encrypted value of RKk is calculated. In one implementation, the key management unit 104 calculates the encrypted value of RKk. For example, the key management unit 104 calculates a hashed value of RKk concatenated with N2 (i.e., the N2 received at stage H) using the hashing algorithm agreed upon with the network device 112.

At stage T, a get network key request is sent to the network device 112. In one implementation, the key management unit 104 sends the get network key request to the registration management unit 113. For example, the get network key request includes the encrypted value of RKk (calculated at stage S). The get network key request may include a request for NK' stored at the network device 112.

At stage U, it is determined whether the encrypted value of RKk is equal to an encrypted value of RKn. In one implementation, the registration management unit 113 determines whether the encrypted value of RKk (received at stage T) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the get network key request was received from the key carrying device 102 (and not from a malicious device), and the registration management unit 113 can send a get network key response at stage W. If the encrypted value of RKk is not equal to the encrypted value of RKn, the registration management unit 113 may determine that the get network key request at stage T was sent by a malicious device and the registration management unit 113 can detect an error at stage V.

At stage V, an error is detected. In one implementation, the registration management unit 113 detects the error. For example, the registration management unit 113 may detect the error occurred as a result of a get network key request sent by a malicious device.

After stage W, a get network key response is sent to the network device 112. In one implementation, the registration management unit 113 sends the get network key response to the key management unit 104. For example, the get network key response may include NK' when the registration management unit 113 determines that the encrypted value of RKk is equal to the encrypted value of RKn at stage U. The get network key response may include the error detected at stage V, when the encrypted value of RKk is not equal to the encrypted value of RKn at stage U. In some implementations, the get network key response may include an encrypted value of NK' instead of NK'. In other implementations, the registration management unit 113 may establish a secure communication channel with the key management unit 104 and send the get network key response over the secure communication channel.

At stage X, it is determined whether the get network key response includes an error. In one implementation, the key management unit 104 determines whether the get network key response includes the error. For example, the key management unit 104 may determine that the get network key response includes the error detected by the registration management unit 113 at stage V. If the get network key response includes the error, the key management unit 104 may stop the registration operations at stage Z. If the get network key response does not include the error, the key management unit 104 may perform operations at stage Y.

At stage Y, NK' is saved. In one implementation, the key management unit 104 saves NK' received in the registration response from the registration management unit 113 at stage W. For example, the key management unit 104 may set NK equal to NK' to save NK'.

At stage Z, the registration operations are stopped. In one implementation, the key management unit 104 stops the registration operations to register the network device 112 with the key carrying device 102.

At stage AA, it is determined whether NK is null. In one implementation, the key management unit 104 determines whether NK stored at the key carrying device 102 is null. If NK is null, the key management unit 104 may perform operations at stage AB. If NK is not null, the key management unit 104 may perform operations at stage AC.

At stage AB, a random NK is generated. In one implementation, the key management unit 104 generates the random NK. For example, the key management unit 104 may generate the random NK using a pseudo random number algorithm. In some implementations, the key management unit 104 saves the random NK as NK stored at the key carrying device 102. After stage AB, the key management unit 104 may perform operations at stage AC.

At stage AC, an encrypted value of RKk is calculated. In one implementation, the key management unit 104 calculates the encrypted value of RKk. For example, the key management unit 104 may calculate a hashed value of RKk concatenated with N2 (i.e., N2 received at stage H) using the hashing algorithm agreed upon with the network device 112.

At stage AD, a set network key request is sent to the network device 112. In one implementation, the key management unit 104 sends the set network request to the registration management unit 113. For example, the set network key request may include NK and the encrypted value of RKk (calculated at stage AC). In some implementations, the set network key request may include an encrypted value of NK instead of NK. In other implementations, the key management unit 104 may establish a secure communication channel with the registration management unit 113 and send the set network key request over the secure communication channel.

At stage AE, it is determined whether the encrypted value of RKk is equal to an encrypted value of RKn. In one implementation, the registration management unit 113 determines whether the encrypted value of RKk (received at stage AD) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the set network key request at stage AD was received from the key carrying device 102 (and not from a malicious device), and the registration management unit 113 can save NK at stage AF. If the encrypted value of RKk is not equal to the encrypted value of RKn, the registration management unit 113 may determine that the set network key request at stage AD was sent by a malicious device and the registration management unit 113 can detect an error at stage AG.

At stage AF, NK is saved. In one implementation, the registration management unit 113 saves NK received in the set network key request at stage AD. For example, the registration management unit 113 may set NK' equal to NK to save NK at the network device 112.

At stage AG, an error is detected. In one implementation, the registration management unit 113 detects the error. For example, the registration management unit 113 may detect the error occurred as a result of a set network key request sent by a malicious device.

At stage AH, a set network key response is sent to the key carrying device 102. In one implementation, the registration management unit 113 sends the set network key response to the key management unit 104. For example, the set network key response may include an acknowledgement when the registration management unit 113 saves NK at stage AF. The set network key response may include the error, when the registration management unit 113 detects the error at stage AG.

At stage A1, the registration operations are stopped. In one implementation, the key management unit 104 stops the registration operations to register the network device 112 with the key carrying device 102. For example, the key management unit 104 may stop the registration operations on receiving the set network key response from the registration management unit 113. In some implementations, when the set network key response includes the error, the key management unit 104 may perform one or more operations to resend the set network key request to the registration management unit 113.

Figure 18:
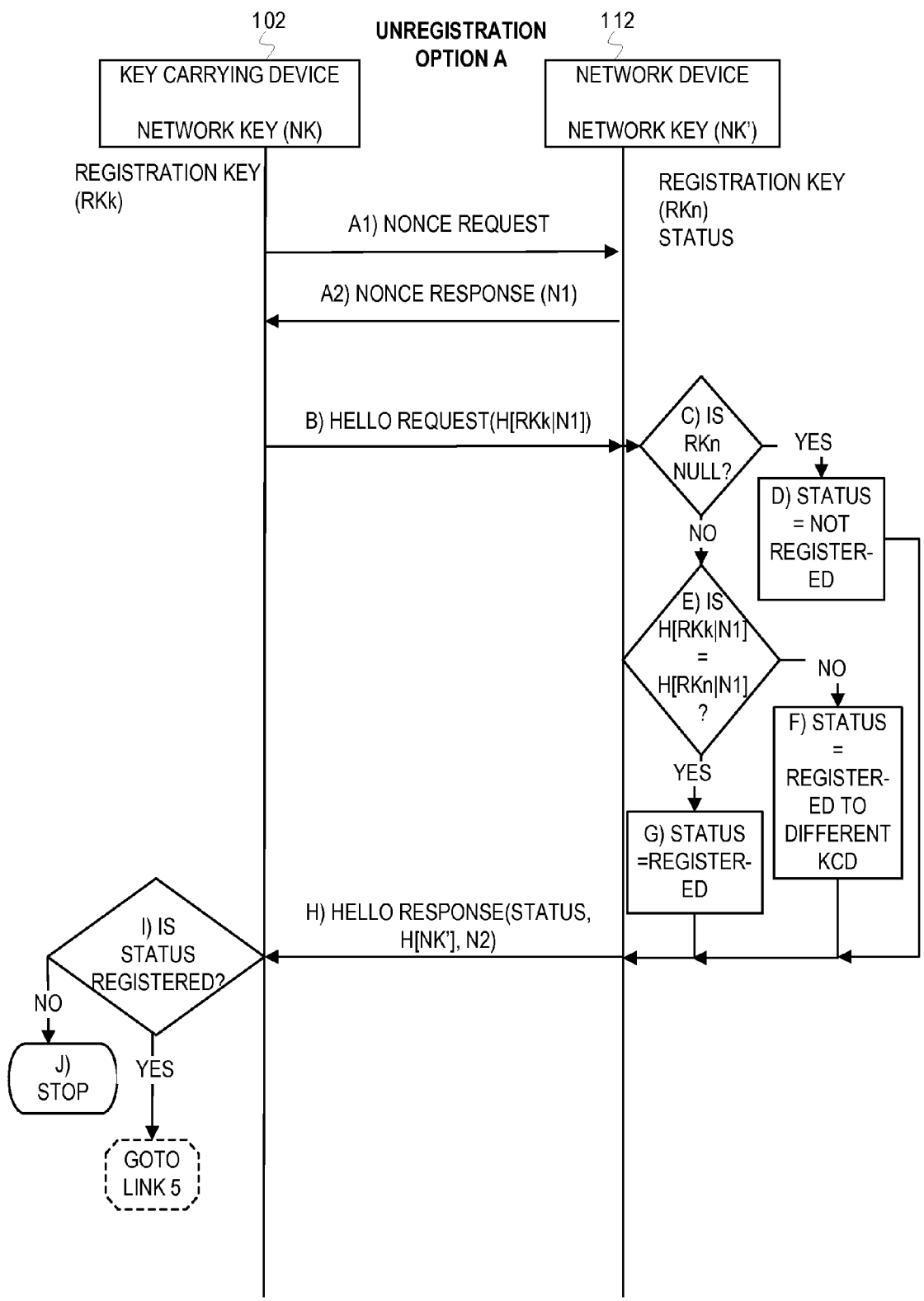
FIGS. 18 and 19 illustrate a sequence diagram of example operations of a first option to unregister a network device using a fourth configuration technique.
Figure 19:
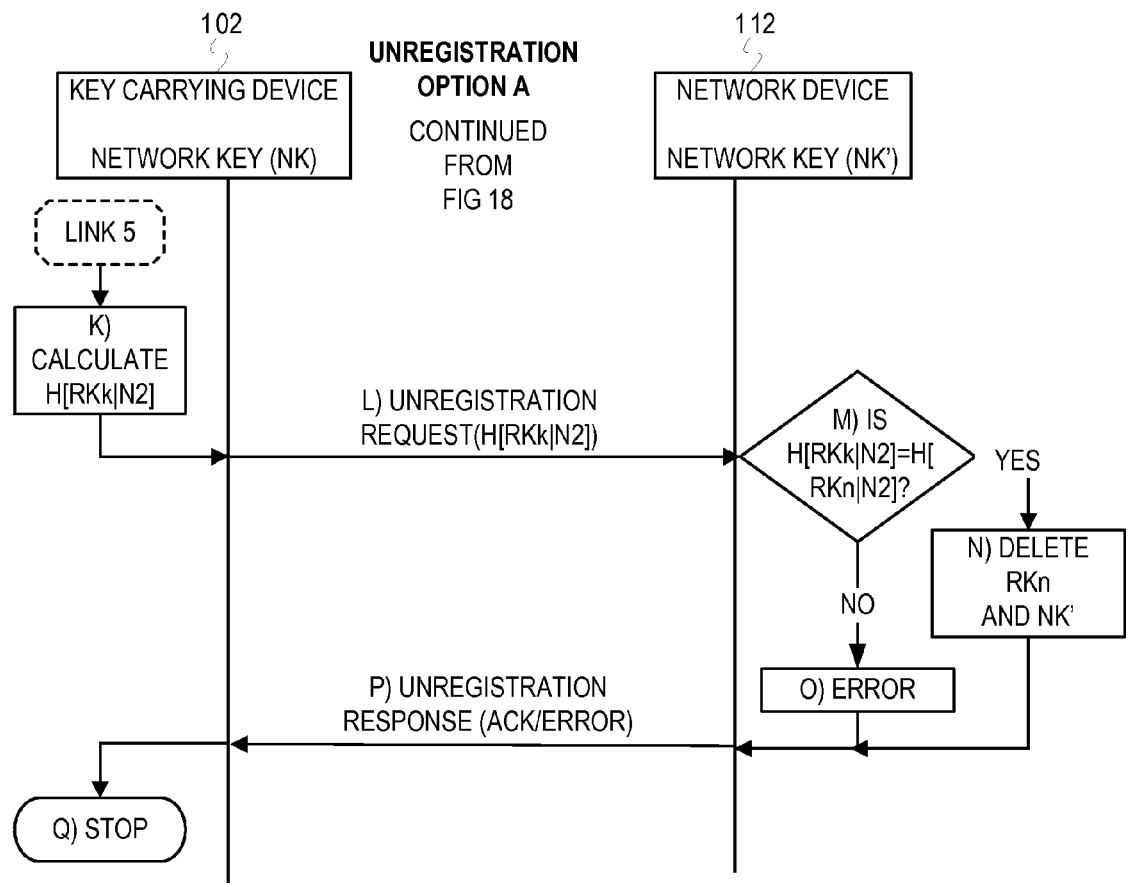

FIGS. 18 and 19 illustrate a sequence diagram of example operations of a first option to unregister a network device using a fourth configuration technique. FIGS. 18 and 19 include the key carrying device 102 and the network device 112 (as described above with reference to FIGS. 15, 16 and 17). The key carrying device 102 can utilize the first option to unregister the network device 112 using the fourth configuration technique when the pairing data stored on the key carrying device 102 and the network device 112 is similar to the pairing data described in FIGS. 15, 16 and 17. In the first option to unregister the network device 112 using the fourth configuration technique, the key carrying device 102 can send an unregistration request after determining that the network device 112 is registered with the key carrying device 102. The key carrying device 102 may receive information from the network device 112, that the network device 112 is registered with the key carrying device 102. The key carrying device 102 can only unregister the network device 112 when the network device 112 is registered with the key carrying device 102. It is noted that when the network device 112 is registered with the key carrying device 102, Status is set as 'registered', and RKn is equal to RKk. FIGS. 18 and 19 illustrate interactions between the key carrying device 102 and the network device 112 to unregister the network device 112 in a sequence of stages A1-Q. Although FIGS. 18 and 19 illustrate the operations being performed by the key management unit 104 and the registration management unit 113, in some implementations the operations may be performed by other units in the key carrying device 102 and the network device 112, respectively.

At stage A1, a nonce request is sent to the network device 112. In one implementation, the key management unit 104 sends the nonce request to the registration management unit 113. For example, the nonce request includes a request for a random number from the network device 112.

At stage A2, a nonce response is sent to the network device 112. In one implementation, the registration management unit 113 sends the nonce response to the key management unit 104. For example, the nonce response can include N1 (a random number generated by the registration management unit 113). N1 may be utilized to encrypt a registration key using the hashing algorithm agreed upon between the key carrying device 102 and the network device 112.

At stage B, a hello request is sent to the network device 112. In one implementation, the key management unit 104 sends the hello request to the registration management unit 113. For example, the hello request may include an encrypted value of RKk and a request for Status. The key management unit 104 may calculate the encrypted value of RKk by calculating a hashed value of RKk concatenated with N1 (i.e., N1 received at stage A2) using the hashing algorithm agreed upon with the network device 112.

At stage C, it is determined whether RKn is null. In one implementation, the registration management unit 113 determines whether RKn is null. For example, the registration management unit 113 can determine RKn is null by checking whether RKn stored at the network device 112 is null. If RKn is null, the registration management unit 113 may set Status as 'not registered' at stage D. If RKn is not null, the registration management unit 113 may determine whether the encrypted value of RKk is equal to an encrypted value of RKn at stage E.

At stage D, Status is set as 'not registered'. In one implementation, the registration management unit 113 sets Status as 'not registered', and the registration management unit 113 may send Status to the key management unit 104 at stage H.

At stage E, it is determined whether the encrypted value of RKk is equal to an encrypted value of RKn. In one implementation, the registration management unit 113 determines whether the encrypted value of RKk (received at stage B) is equal to the encrypted value of RKn. The registration management unit 113 can calculate the encrypted value of RKn by calculating a hashed value of RKn concatenated with N1 using the hashing algorithm agreed upon with the key carrying device 102. If the encrypted value of RKk is equal to the encrypted value of RKn, the registration management unit 113 can determine that the network device 112 is registered with the key carrying device 102, and the registration management unit 113 may set Status as 'registered' at stage G. If the encrypted value of RKk is not equal to the encrypted value of RKn, the registration management unit 113 can determine that the network device 112 is registered with another key carrying device (different from the key carrying device 102), and the registration management unit 113 can set Status as 'registered to different KCD' at stage F.

At stage F, Status is set as 'registered to different KCD'. In one implementation, the registration management unit 113 sets Status stored at the network device 112 as 'registered to different KCD'. The registration management unit 113 may send Status to the key management unit 104 at stage H.

At stage G, Status is set as 'registered'. In one implementation, the registration management unit 113 sets Status as 'registered'. The registration management unit 113 may send Status to the key management unit 104 at stage H.

At stage H, a hello response is sent to the key carrying device 102. In one implementation, the registration management unit 113 sends the hello response to the key management unit 104. For example, the hello response may include Status, an encrypted value of NK', and a random number (N2). The registration management unit 113 can calculate the encrypted value of NK' using the hashing algorithm agreed upon with the key carrying device 102. N2 may be utilized by the key carrying device 102 to encrypt RKk using the hashing algorithm agreed upon between the key carrying device 102 and the network device 112 (as described below at stage K).

At stage I, it is determined whether Status is 'registered'. In one implementation, the key management unit 104 determines whether Status received at stage H is 'registered'. If Status is 'registered', the key management unit 104 determines that the network device 112 is registered with the key carrying device 102, and control flows to link 5 where the key management unit 104 may perform operations at stage K. If Status is not 'registered', the key management unit 104 may stop unregistration operations at stage J.

At stage J, unregistration operations are stopped. In one implementation, the key management unit 104 stops the unregistration operations to unregister the network device 112.

At stage K, an encrypted value of RKk is calculated. In one implementation, the key management unit 104 calculates the encrypted value of RKk. For example, the key management unit 104 calculates a hashed value of RKk concatenated with N2 (i.e., the N2 received at stage H) using the hashing algorithm agreed upon with the network device 112.

At stage L, an unregistration request is sent to the network device 112. In one implementation, the key management unit 104 sends the unregistration request to the registration management unit 113. For example, the unregistration request may include the encrypted value of RKk (calculated at stage K) and a request to delete values of RKn and NK'.

At stage M, it is determined whether the encrypted value of RKk is equal to an encrypted value of RKn. In one implementation, the registration management unit 113 determines whether the encrypted value of RKk (received at stage L) is equal to the encrypted value of RKn. The registration management unit 113 can calculate the encrypted value of RKn by calculating a hashed value of RKn concatenated with N2 using the hashing algorithm agreed upon with the key carrying device 102. If the encrypted value of RKk is equal to the encrypted value of RKn, the registration management unit 113 can verify that the unregistration request was received from the key carrying device 102 (and not from a malicious device), and the registration management unit 113 can delete the values of RKn and NK' at stage N. If the encrypted value of RKk is not equal to the encrypted value of RKn, the registration management unit 113 may determine that the unregistration request at stage L was sent by a malicious device and the registration management unit 113 can detect an error at stage O.

At stage N, values of RKn and NK' are deleted. In one implementation, the registration management unit 113 deletes the values of RKn and NK'. Once the values of RKn and NK' are deleted, the network device 112 is no longer registered with the key carrying device 102, and the registration management unit 113 can send an acknowledgment to the key management unit 104 to confirm the unregistration of the network device 112 (as described below at stage P).

At stage O, an error is detected. In one implementation, the registration management unit 113 detects the error. For example, the registration management unit 113 may detect the error occurred as a result of an unregistration request sent by a malicious device.

At stage P, an unregistration response is sent to the key carrying device 102. In one implementation, the registration management unit 113 sends the unregistration response to the key management unit 104. For example, the unregistration response may include an acknowledgement when the registration management unit 113 deletes the values of RKn and NK' at stage N. The unregistration response may include the error, when the registration management unit 113 detects the error at stage O.

At stage Q, unregistration operations are stopped. In one implementation, the key management unit 104 stops the unregistration operations to unregister the network device 112. In some implementations, the key management unit 104 may resend the unregistration request to the registration management unit 113 when the unregistration response (received at stage P) includes the error.

Figure 20:
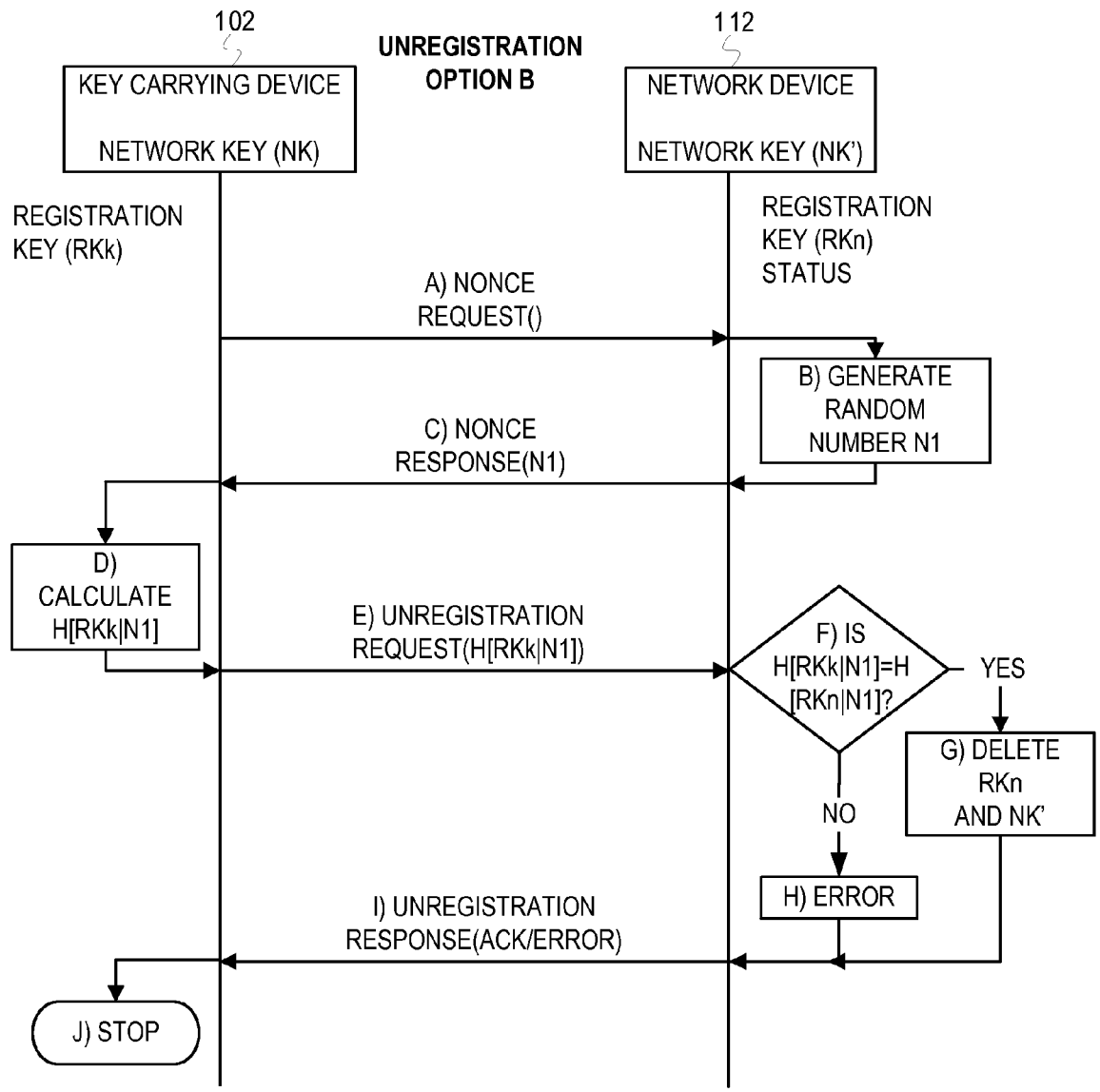
FIG. 20 illustrates a sequence diagram of example operations of a second option to unregister a network device using a fourth configuration technique.

FIG. 20 illustrates a sequence diagram of example operations of a second option to unregister a network device using a fourth configuration technique. FIG. 20 includes the key carrying device 102 and the network device 112 (as described above with reference to FIGS. 15, 16 and 17). The key carrying device 102 can utilize the second option to unregister the network device 112 using the fourth configuration technique when the pairing data stored on the key carrying device 102 and the network device 112 is similar to the pairing data described in FIGS. 15, 16 and 17. In the second option to unregister the network device 112 using the fourth configuration technique, the key carrying device 102 can send an unregistration request without determining that the network device 112 is registered with the key carrying device 102. The network device 112 may determine whether the network device 112 is registered with the key carrying device 102 and perform one or more operations to delete RKn and NK' to unregister. The key carrying device 102 can only unregister the network device 112 when the network device 112 is registered with the key carrying device 102. It is noted that when the network device 112 is registered with the key carrying device 102, Status is set as 'registered', and RKn is equal to RKk. FIG. 20 illustrates interactions between the key carrying device 102 and the network device 112 to unregister the network device 112 in a sequence of stages A-J. Although FIG. 20 illustrates the operations being performed by the key management unit 104 and the registration management unit 113, in some implementations the operations may be performed by other units in the key carrying device 102 and the network device 112, respectively.

At stage A, a nonce request is sent to the network device 112. In one implementation, the key management unit 104 sends the nonce request to the registration management unit 113. For example, the nonce request includes a request for a random number from the network device 112.

At stage B, a random number is generated. In one implementation, the registration management unit 113 generates the random number (i.e., N1). For example, the registration management unit 113 may generate N1 such that N1 may be utilized to encrypt a registration key using the hashing algorithm agreed upon between the key carrying device 102 and the network device 112.

At stage C, a nonce response is sent to the network device 112. In one implementation, the registration management unit 113 sends the nonce response to the key management unit 104. For example, the nonce response can include N1 (generated at stage B).

At stage D, an encrypted value of RKk is calculated. In one implementation, the key management unit 104 calculates the encrypted value of RKk. For example, the key management unit 104 may calculate a hashed value of RKk concatenated with N1 (i.e., N1 received at stage C) using the hashing algorithm agreed upon with the network device 112.

At stage E, an unregistration request is sent to the network device 112. In one implementation, the key management unit 104 sends the unregistration request to the registration management unit 113. For example, the unregistration request may include the encrypted value of RKk (calculated at stage D) and a request to delete values of RKn and NK'.

At stage F, it is determined whether the encrypted value of RKk is equal to an encrypted value of RKn. In one implementation, the registration management unit 113 determines whether the encrypted value of RKk (received at stage E) is equal to the encrypted value of RKn. The registration management unit 113 can calculate the encrypted value of RKn by calculating a hashed value of RKn concatenated with N1 using the hashing algorithm agreed upon with the key carrying device 102. If the encrypted value of RKk is equal to the encrypted value of RKn the registration management unit 113 can determine that the unregistration request (received at stage E) was received from the key carrying device 102, and the registration management unit 113 can delete the values of RKn and NK' at stage G. If the encrypted value of RKk is not equal to the encrypted value of RKn the registration management unit 113 can determine that the unregistration request was not received from the key carrying device 102 (and was instead received from a malicious device), and the registration management unit 113 may detect an error at stage H.

At stage G, values of RKn and NK' are deleted. In one implementation, the registration management unit 113 deletes the values of RKn and NK'. Once the values of RKn and NK' are deleted, the network device 112 is no longer registered with the key carrying device 102, and the registration management unit 113 can send an acknowledgment to the key management unit 104 to confirm the unregistration of the network device 112 (as described below at stage I).

At stage H, an error is detected. In one implementation, the registration management unit 113 detects the error. For example, the registration management unit 113 may detect the error occurred as a result of an unregistration request received from a malicious device.

At stage I, an unregistration response is sent to the key carrying device 102. In one implementation, the registration management unit 113 sends the unregistration response to the key management unit 104. For example, the unregistration response may include an acknowledgement when the registration management unit 113 deletes the values of RKn and NK' at stage G. The unregistration response may include the error, when the registration management unit 113 detects the error at stage H.

At stage J, unregistration operations are stopped. In one implementation, the key management unit 104 stops the unregistration operations to unregister the network device 112. In some implementations, the key management unit 104 may resend the unregistration request to the registration management unit 113 when the unregistration response (received at stage I) includes the error.

Figure 21:
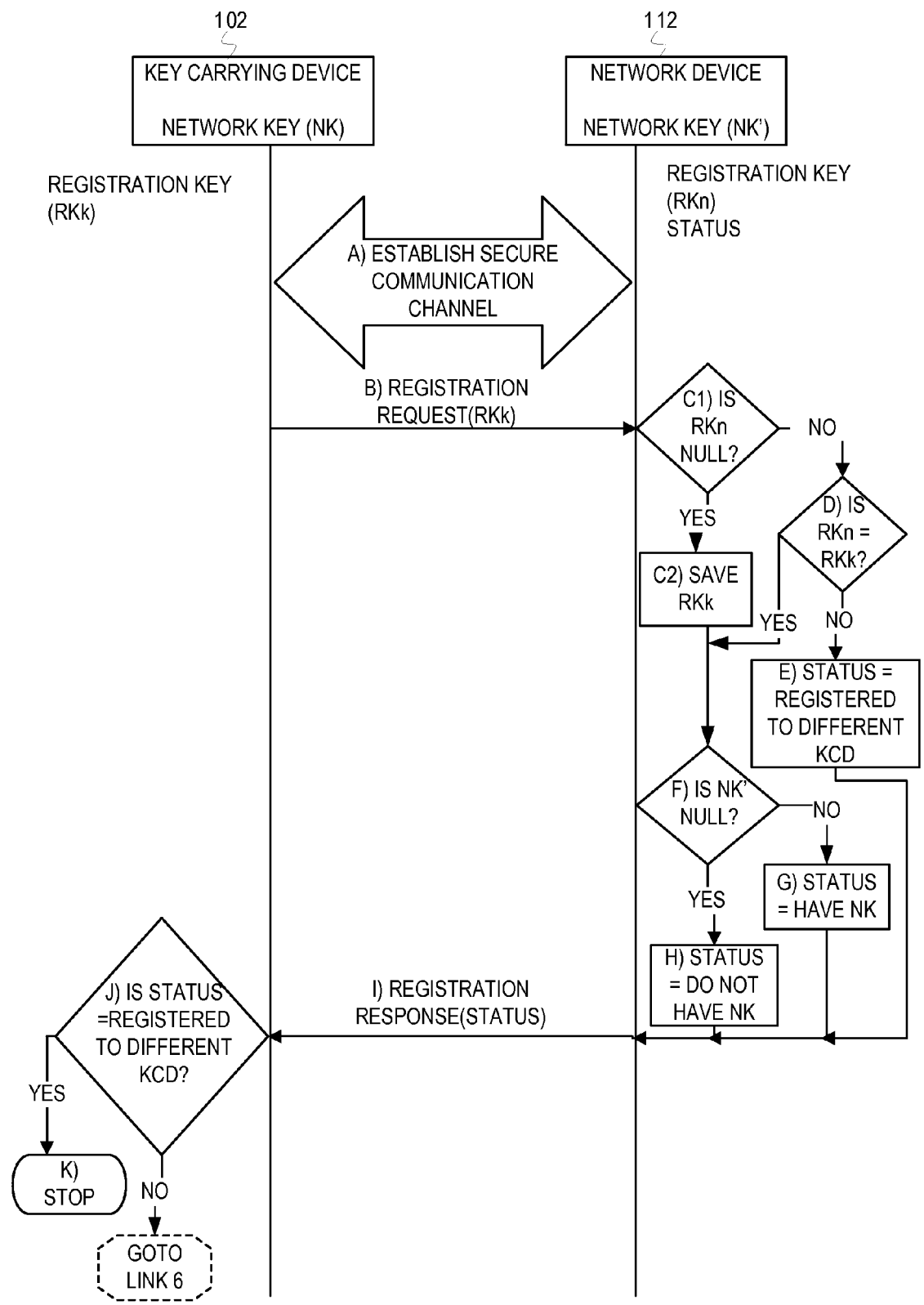
FIGS. 21 and 22 illustrate a sequence diagram of example operations to register a network device using a fifth configuration technique.
Figure 22:
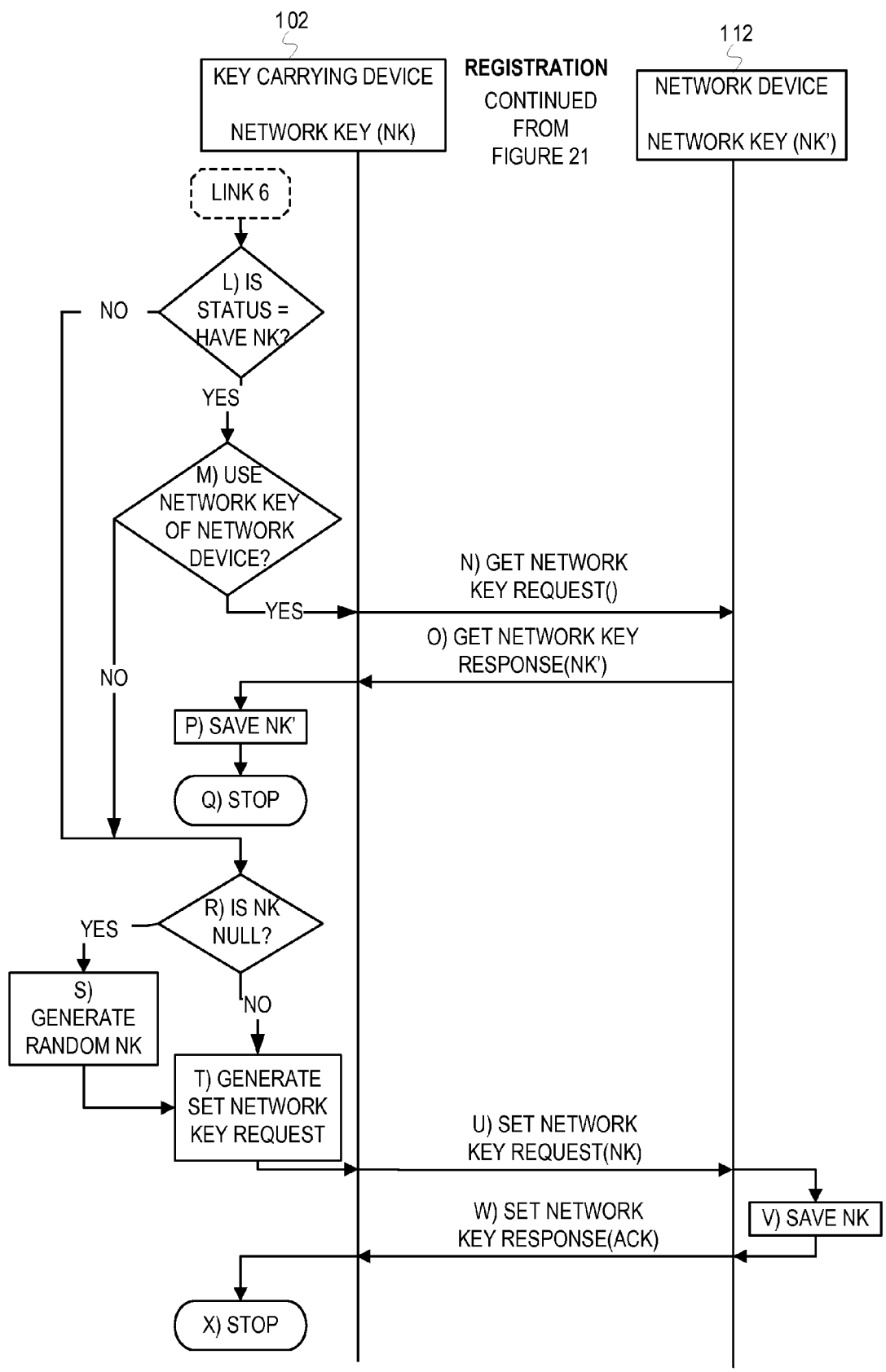

FIGS. 21 and 22 illustrate a sequence diagram of example operations to register a network device using a fifth configuration technique. FIGS. 21 and 22 include the key carrying device 102 and the network device 112 (as described above with reference to FIG. 1). The key carrying device 102 can utilize the fifth configuration technique when the pairing data stored on the key carrying device 102 includes a registration key (RKk) and the pairing data stored on the network device 112 includes a registration key (RKn), and a status of the network device 112 (Status). In the fifth configuration technique, the key carrying device 102 establishes a secure communication channel with the network device 112 before the key carrying device 102 begins operations to configure the network device 112. The key carrying device 102 and the network device 112 can exchange all messages including pairing data stored at the key carrying device 102 and the network device 112 over the secure communication channel without performing encryption operations on the pairing data. The key carrying device 102 and the network device 112 can also store a network key (NK) and a network key (NK'). It is noted that RKk and RKn, and Status represent example variables for storing a registration key at the key carrying device 102, a registration key at the network device 112, and a status of the network device 112, respectively. Similarly, NK and NK' represent example variables for storing a network key at the key carrying device 102 and the network device 112, respectively. It is further noted that Status may be set to indicate whether a network key (e.g., the network key of the communication network 100) is stored at the network device 112 when a registration request is received from the key carrying device 102 and the network device 112 is already registered with the key carrying device 102. The values of RKk and RKn are equal when the network device 112 is registered with the key carrying device 102. The values of NK and NK' are also equal when the network device 112 is configured with the communication network (i.e., the communication network 100) managed by the key carrying device 102. It is also noted that Status may be set as 'not registered', and RKn and NK' may be null when the network device 112 is in not registered with any key carrying device. In some implementations, RKk and NK may also be null (e.g., when the key carrying device 102 does not have the network key of the communication network 100). However, the key carrying device 102 includes capabilities to generate a random value of RKk and NK when the values of RKk and/or NK are null. FIGS. 21 and 22 illustrate interactions between the key carrying device 102 and the network device 112 to register the network device 112 in a sequence of stages A-X. Although FIGS. 21 and 22 illustrate the operations being performed by the key management unit 104 and the registration management unit 113, in some implementations the operations may be performed by other units in the key carrying device 102 and the network device 112, respectively.

At stage A, a secure communication channel is established with the network device 112. In one implementation, the key management unit 104 can establish the secure communication channel by performing key agreement, key derivation, and key confirmation operations with the registration management unit 113. The secure communication channel can allow the key management unit 104 and the registration management unit 113 to exchange pairing data (e.g., RKk, NK, NK', and Status, etc.) without performing encryption operations on the pairing data. The secure communication channel between the key carrying device 102 and the network device 112 may continue to exist until registration operations are completed.

At stage B, a registration request is sent to the network device 112. In one implementation, the key management unit 104 sends the registration request to the registration management unit 113. For example, the registration request includes RKk and a request to save RKk at the network device 112.

At stage C1, it is determined whether RKn is null. In one implementation, the registration management unit 113 determines whether RKn stored at the network device 112 is null. If RKn is null, the registration management unit 113 can save RKk at stage C2. If RKn is not null, the registration management unit 113 can determine whether RKn is equal to RKk at stage D.

At stage C2, RKk is saved. In one implementation, the registration management unit 113 saves RKk received at stage B. For example, the registration management unit 113 can set RKn equal to RKk to save RKk. Once the registration management unit 113 saves RKk, the network device 112 is registered with the key carrying device 102. After stage C2, the registration management unit 113 can determine whether NK' is null at stage F.

At stage D, it is determined whether RKn is equal to RKk. In one implementation, the registration management unit 113 determines whether RKn is equal to RKk (received at stage B). If RKn is equal to RKk, the registration management unit 113 can determine whether NK' is null at stage F. If RKn is not equal to RKk, the registration management unit 113 can determine that the network device 112 is registered to a key carrying device other than the key carrying device 102 and performs operations at stage E.

At stage E, Status is set as 'registered to different KCD'. In one implementation, the registration management unit 113 sets Status as 'registered to different KCD'. The registration management unit 113 may send Status to the key carrying device 102 at stage I.

At stage F, it is determined whether NK' is null. In one implementation, the registration management unit 113 determines whether NK' stored at the network device 112 is null. If NK' is null, the registration management unit 113 can determine that a network key is not stored at the network device 112 and perform operations at stage H. If NK' is not null, the registration management unit 113 can determine that a network key is stored at the network device 112 and perform operations at stage G.

At stage G, Status is set as 'have NK'. In one implementation, the registration management unit 113 sets Status as 'have NK'. The registration management unit 113 may send Status in the registration response at stage I.

At stage H, Status is set as 'do not have NK'. In one implementation, the registration management unit 113 sets Status as 'do not have NK'. The registration management unit 113 can send Status in the registration response at stage I.

At stage I, a registration response is sent to the key carrying device 102. In one implementation, the registration management unit 113 sends the registration response to the key management unit 104. For example, the registration response may include Status stored at the network device 112.

At stage J, it is determined whether Status is 'registered to different KCD'. In one implementation, the key management unit 104 determines whether Status (received at stage I) is 'registered to different KCD'. If Status is 'registered to different KCD', the key management unit 104 can determine that the network device 112 is registered to another key carrying device (different from the key carrying device 102), and the key management unit 104 can stop registration operations at stage K. If Status is not 'registered to different KCD', control flows to link 6 and the registration management unit 113 can perform operations at stage L.

At stage K, registration operations are stopped. In one implementation, the key management unit 104 stops the registration operations to register the network device 112.

At stage L, it is determined whether Status is 'have NK'. In one implementation, the key management unit 104 determines whether Status (received at stage I) is 'have NK'. If Status is 'have NK', the key management unit 104 can determine that a network key is stored at the network device 112 and the key management unit 104 can perform operations at stage M. If Status is not 'have NK', the key management unit 104 can determine that no network key is stored at the network device 112 and the key management unit 104 can perform operations at stage R.

At stage M, it is determined whether to use a network key of the network device 112. In one implementation, the key management unit 104 determines whether to use the network key of the network device 112. For example, the key management unit 104 may determine to use (e.g., receive and save) the network key stored at the network device 112 when the network key of the communication network 100 is not stored at the key carrying device 102. If the key management unit 104 determines to use the network key of the network device 112, the key management unit 104 may send a get network key request at stage N. If the key management unit 104 determines not to use the network key of the network device 112, the key management unit 104 may perform operations at stage R.

At stage N, a get network key request is sent to the network device 112. In one implementation, the key management unit 104 sends the get network key request to the registration management unit 113. For example, the get network key request includes a request for NK'.

At stage O, a get network key response is received from the network device 112. In one implementation, the key management unit 104 receives the get network key response from the registration management unit 113. For example, the get network key response includes NK' stored at the network device 112. It is noted that the registration management unit 113 may not perform operations to determine that the get network key request is received from the key carrying device 102 before sending the get network key response, since in the fifth configuration technique the secure communication channel ensures protection against any messages originating from malicious devices.

At stage P, NK' is saved. In one implementation, the key management unit 104 saves NK' received at stage O. For example, the key management unit 104 may set NK equal to NK' to save NK'. After saving NK', the key management unit 104 may stop the registration operations at stage Q.

At stage Q, registration operations are stopped. In one implementation, the key management unit 104 stops the registration operations to register the network device 112.

At stage R, it is determined whether NK is null. In one implementation, the key management unit 104 determines whether NK stored at the key carrying device 102 is null. If NK is null, the key management unit 104 can generate a random NK at stage S. If NK is not null, the key management unit 104 can perform operations at stage T.

At stage S, a random NK is generated. In one implementation, the key management unit 104 generates the random NK. For example, the key management unit 104 may generate the random NK using a pseudo random number algorithm. In some implementations, the key management unit 104 saves the random NK as NK stored at the key carrying device 102. After stage S, the key management unit 104 can perform operations at stage T.

At stage T, a set network key request is generated. In one implementation, the key management unit 104 generates the set network key request. For example, the set network key request may include NK stored at the key carrying device 102.

At stage U, the set network key request is sent to the network device 112. In one implementation, the key management unit 104 sends the set network key request (generated at stage T) to the registration management unit 113.

At stage V, NK is saved. In one implementation, the registration management unit 113 saves NK received in the set network key request. For example, the registration management unit 113 may set NK' equal to NK to save NK. After saving NK, the registration management unit 113 may send an acknowledgement to the key management unit 104 that NK is saved at the network device 112. It is noted that the registration management unit 113 may not perform operations to determine that the set network key request was received from the key carrying device 102 before saving NK, since in the fifth configuration technique the secure communication channel ensures protection against any messages originating from malicious devices.

At stage W, a set network key response is sent to the key carrying device 102. In one implementation, the registration management unit 113 sends the set network key response to the key management unit 104. For example, the set network key response includes the acknowledgement that that NK was saved at the network device 112. In some implementations, the set network key response may also include an error when NK is not successfully saved at the network device 112.

At stage X, registration operations are stopped. In one implementation, the key management unit 104 stops the operations to register the network device 112. In some implementations, on receiving the error in the set network key response (received at stage W), the key management unit 104 may resend NK to the registration management unit 113.

Figure 23:
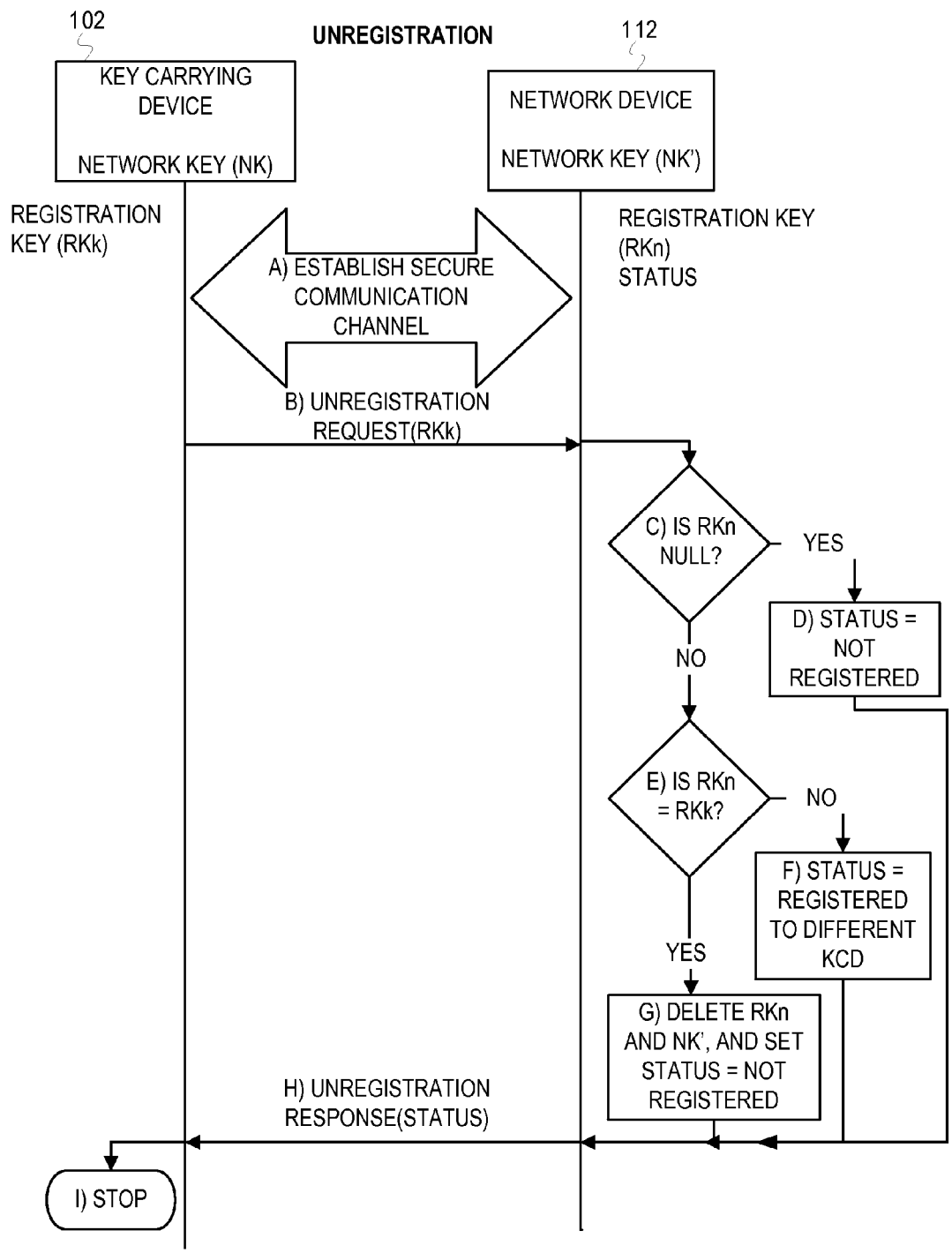
FIG. 23 illustrates a sequence diagram of example operations to unregister a network device using a fifth configuration technique.

FIG. 23 illustrates a sequence diagram of example operations to unregister a network device using a fifth configuration technique. FIG. 23 includes the key carrying device 102 and the network device 112 (as described above with reference to FIGS. 21 and 22). The key carrying device 102 can unregister the network device 112 using the fifth configuration technique when the pairing data stored on the key carrying device 102 and the network device 112 is similar to the pairing data described in FIGS. 21 and 22. In the fifth configuration technique, the key carrying device 102 establishes a secure communication channel with the network device 112 before the key carrying device 102 begins operations to configure the network device 112. The key carrying device 102 and the network device 112 can exchange all messages including pairing data stored at the key carrying device 102 and the network device 112 over the secure communication channel without performing encryption operations on the pairing data. The network device 112 may determine whether the network device 112 is registered with the key carrying device 102 on receiving an unregistration request from the key carrying device 102, and perform one or more operations to delete RKn and NK' to unregister. The key carrying device 102 can only unregister the network device 112 when the network device 112 is registered with the key carrying device 102. It is noted that when the network device 112 is registered with the key carrying device 102, RKn is equal to RKk. FIG. 23 illustrates interactions between the key carrying device 102 and the network device 112 to unregister the network device 112 in a sequence of stages A-I. Although FIG. 23 illustrates the operations being performed by the key management unit 104 and the registration management unit 113, in some implementations the operations may be performed by other units in the key carrying device 102 and the network device 112, respectively.

At stage A, a secure communication channel is established with the network device 112. In one implementation, the key management unit 104 can establish the secure communication channel by performing key agreement, key derivation, and key confirmation operations with the registration management unit 113. The secure communication channel can allow the key management unit 104 and the registration management unit 113 to exchange pairing data (e.g., RKk, Status, etc.) without performing encryption operations on the pairing data. The secure communication channel between the key carrying device 102 and the network device 112 may continue to exist until unregistration operations are completed.

At stage B, an uregistration request is sent to the network device 112. In one implementation, the key management unit 104 sends the unregistration request to the registration management unit 113. For example, the unregistration request includes RKk and a request to delete RKn and NK' stored at the network device 112.

At stage C, it is determined whether RKn is null. In one implementation, the registration management unit 113 determines whether RKn stored at the network device 112 is null. If RKn is null, the registration management unit 113 can perform operations at stage D. If RKn is not null, the registration management unit 113 can determine whether RKn is equal to RKk at stage E.

At stage D, Status is set as 'not registered'. In one implementation, the registration management unit 113 sets Status as 'not registered'. The registration management unit 113 may send Status to the key management unit 104 at stage H.

At stage E, it is determined whether RKn is equal to RKk. In one implementation, the registration management unit 113 determines whether RKn is equal to RKk (received at stage B). If RKn is equal to RKk, the registration management unit 113 can determine that the network device 112 is registered with the key carrying device 102 and the registration management unit 113 can perform operations at stage G. If RKn is not equal to RKk, the registration management unit 113 can determine that the network device 112 is not registered with the key carrying device 102 and the registration management unit 113 can perform operations at stage F. In some implementations, the registration management unit 113 can determine whether the network device 112 is registered with the key carrying device 102 by comparing one or more secure channel keys included in a message that includes the unregistration request with the secure channel keys (corresponding to the secure channel established at stage A) stored at the network device 112. If the secure channel keys included in the message match with the secure channel keys stored at the network device 112, the registration management unit 113 can determine that the network device 112 is registered with the key carrying device 102. If the secure channel keys included in the message do not match with the secure channel keys stored at the network device 112, the registration management unit 113 can determine that the network device 112 is not registered with the key carrying device 102.

At stage F, Status is set as 'registered to different KCD'. In one implementation, the registration management unit 113 sets Status as 'registered to different KCD'. The registration management unit 113 may send Status to the key management unit 104 at stage H.

At stage G, RKn and NK' are deleted and Status is set as 'not registered'. In one implementation, the registration management unit 113 deletes values of RKn and NK' stored at the network device 112 and sets Status as 'not registered'. It is noted that the registration management unit 113 may not perform operations to determine that the unregistration request was received from the key carrying device 102 before deleting the values of RKn and NK', since in the fifth configuration technique the secure communication channel ensures protection against any messages originating from malicious devices.

At stage H, an unregistration response is sent to the key carrying device 102. In one implementation, the registration management unit 113 sends the unregistration response to the key management unit 104. For example, the unregistration response may include Status to indicate to the key management unit 104 that the network device 112 is not registered or the network device 112 is registered with another key carrying device (different from the key carrying device 102). In some implementations, the unregistration response may also include an error when one or more unregistration operations were not successful at the network device 112.

At stage I, unregistration operations are stopped. In one implementation, the key management unit 104 stops the unregistration operations to unregister the network device 112. In some implementations, when the key management unit 104 receives an error in the unregistration response at stage H, the key management unit 104 may resend the unregistration request to the registration management unit 113.

It is noted that the configuration techniques described in FIGS. 5-23 are exemplary in nature and for simplification FIGS. 5-23 do not necessarily illustrate all operations performed by the key carrying device 102 and the network device 112. For example, the first configuration technique (described above in FIGS. 5 and 6) and the second configuration technique (described above in FIGS. 7 and 8) do not include the operations to receive a network key or generate a random network key when the network key is not stored at the key carrying device 102. However, it is noted that the key carrying device 102 includes the capabilities to perform such operations when the network key is not stored at the key carrying device 102. It is also noted that, the operations illustrated in FIGS. 5-23 may be performed in a different order, performed in parallel at the key carrying device 102 and the network device 112, etc. Also, the key carrying device 102 is not limited to utilizing one configuration technique at a time to configure a network device. In some embodiments, the key carrying device 102 may utilize two or more configuration techniques to configure network devices in same or different communication networks.

It should be understood that FIGS. 1-23 and the operations described herein are examples meant to aid in understanding embodiments and should not be used to limit embodiments or limit scope of the claims. Embodiments may perform additional operations, fewer operations, operations in a different order, operations in parallel, and some operations differently. For example, some of the operations in FIGS. 2-4 and/or FIGS. 5-23 can be modified or replaced with different decision steps to implement the procedures described in FIGS. 2-4. FIGS. 13 and 14 illustrate alternate implementations of the third configuration technique to unregister the network device 112. Similarly, FIGS. 18 and 19, and FIG. 20 illustrate alternate implementations of the fourth configuration technique to unregister the network device 112. It is noted that the second, the third, the fourth, and the fifth configuration techniques can comply with NFC-SEC-01 standard. Also in the second, the third, the fourth and the fifth configuration techniques, pairing data is not stored at the key carrying device 102 which allows utilizing multiple key carrying devices to configure network devices in the communication network 100 without the need to resynchronize with the key carrying device 102.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 24:
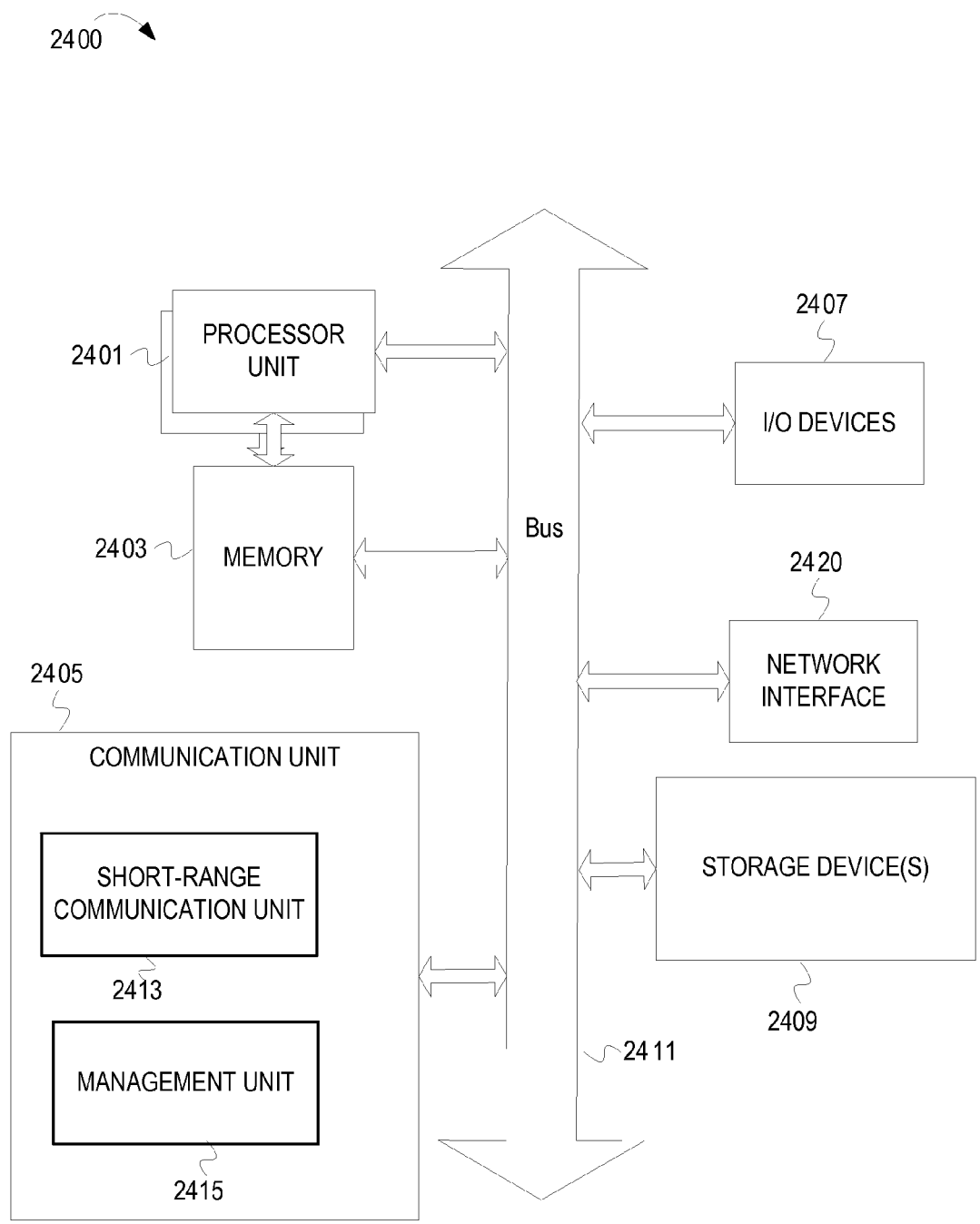
FIG. 24 illustrates an example network device.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks FIG. 24 depicts an example network device 2400. In some implementations, the network device 2400 may be a communication device with support for short-range communication (e.g., NFC, Bluetooth, ZigBee, etc.). The network device 2400 includes a processor unit 2401 (possibly including multiple processors, multiple cores, multiple nodes, and/or implementing multi-threading, etc.). The network device 2400 includes memory 2403. The memory 2403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device 2400 also includes a bus 2411 (PCI, PCI-Express, AHB™ AXI™ NoC, etc.), a storage device(s) 2409 (e.g., SD card, SIM card, optical storage, magnetic storage, etc.), a communication unit 2405 (e.g., a GSM unit, a CDMA unit, an FM unit, a Wi-Fi unit, etc.), I/O devices 2407 (e.g., a touchscreen, a camera, a microphone, a speaker, etc.), and a network interface 2420 (e.g., Bluetooth interface, an NFC interface, a Wi-Fi interface, a powerline interface, an Ethernet interface, a Frame Relay interface, SONET interface, etc.). The communication unit 2405 includes a short-range communication unit 2413 and a management unit 2415. The short-range communication unit 2413 includes components to implement for one or more short-range communication techniques (e.g., NFC, ZigBee, Bluetooth, etc.). The management unit 2415 may be a registration management unit or a key management unit (as described above in FIGS. 1-23). The management unit 2415 embodies functionality to implement some of the embodiments described above in FIGS. 1-23. The management unit 2415 may include one or more functionalities that facilitate securely configuring network devices using at least the five configuration techniques described above in FIGS. 5-23.

Any of these functionalities may be partially (or entirely) implemented in hardware and/or on the processor unit 2401 or in the memory 2403. For example, the functionality may be implemented with an application specific integrated circuit, in logic implemented in the processor unit 2401, in a co-processor on a peripheral device or card, etc. Further, realizations may include fewer or additional components not illustrated in FIG. 24 (e.g., video cards, audio cards, additional network interfaces, peripheral devices, etc.). The processor unit 2401, the storage device(s) 2409, the I/O devices 2407, the network interface 2420 and the communication unit 2405 are coupled to the bus 2411. Although illustrated as being coupled to the bus 2411, the memory 2403 may be coupled to the processor unit 2401.

While the embodiments are described with reference to various implementations and exploitations, it will be understood that these embodiments are illustrative and that the scope of the inventive subject matter is not limited to them. In general, techniques for securely configuring network devices using short-range wireless communication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for using a configuration device to configure a network device, the method comprising:
    initiating, by the configuration device, pairing operations with the network device via a short-range communication connection with the network device;
    determining, by the configuration device, whether the network device is in a registered state or an unregistered state with respect to the configuration device and other configuration devices;
    if determined that the network device is in the unregistered state,
        establishing a short-range communication channel between the configuration device and the network device; and
        transmitting a network key to the network device via the short-range communication channel for configuring the network device to communicatively connect to a communication network.

2. The method of claim 1, further comprising:
    if determined that the network device is in the unregistered state with respect to the configuration device and other configuration devices,
        registering the network device with the configuration device.

3. The method of claim 1, further comprising, if determined that the network device is in the registered state:
    determining that the network device is registered with the configuration device;
    determining whether to unregister the network device; and
    in response to determining the network device is registered with the configuration device and determining to unregister the network device, transmitting at least one message to the network device to unregister the network device over the short-range communication channel.

4. The method of claim 3, wherein said transmitting at least one message to unregister the network device comprises transmitting at least one instruction to delete data stored during the pairing operations at the network device.

5. The method of claim 1, wherein said initiating pairing operations with the network device comprises one of:
    pairing with the network device by exchanging and storing a device identifier of the network device and a plurality of pairing keys; and
    pairing with the network device using an asymmetric encryption scheme.

6. The method of claim 5, wherein said pairing with the network device using the asymmetric encryption scheme comprises storing a public key of the configuration device at the network device.

7. The method of claim 1, wherein said determining whether the network device is in the registered state or the unregistered state comprises:
    transmitting a first message including first information from the configuration device to the network device; and
    determining whether the network device is in the registered state or the unregistered state based on a second message received in response to the first message.

8. The method of claim 1, wherein the short-range communication connection is a near field communication (NFC) connection.

9. The method of claim 1, wherein the short-range communication connection is one of a Bluetooth communication connection, a ZigBee communication connection, and a wireless local area network (WLAN) communication connection.

10. The method of claim 1, wherein the short-range communication channel comprises a secure short-range communication channel having support for integrity, encryption, and replay protection.

11. The method of claim 1, wherein the short-range communication channel is an out-of-band communication channel using a first frequency band, wherein said transmitting the network key to the network device via the short-range communication channel is for configuring the network device to communicatively connect to the communication network using a second frequency band different than the first frequency band.

12. The method of claim 1, further comprising:
providing an identifier of the configuration device to the network device to register the network device; and
receiving, at the configuration device, an identifier of the network device and storing the identifier of the network device.

13. A method for configuring a network device, the method comprising:
receiving, at the network device, a request from a configuration device to register with the configuration device via a short-range communication connection;
determining whether the network device is in a registered state or an unregistered state with respect to the configuration device and other configuration devices;
if determined that the network device is in the unregistered state,
transmitting a response to the configuration device to indicate that the network device is in the unregistered state;
establishing a short-range communication channel between the network device and the configuration device;
receiving at least one key from the configuration device over the short-range communication channel to register with the configuration device;
receiving, from the configuration device over the short-range communication channel, a network key for configuring the network device to communicate over a communication network; and
using the network key to communicate over the communication network.

14. The method of claim 13, wherein the request to register comprises an identifier of the configuration device.

15. The method of claim 13, wherein the request to register comprises a public key of the configuration device.

16. The method of claim 13, wherein the short-range communication channel is an out-of-band communication channel using a first frequency band different than a second frequency band used by a communication network.

17. The method of claim 13, wherein the request to register comprises a random number, and responsive to receiving the random number at the network device, computing a hashed value of the at least one key stored at the network device and sending the hashed value to the configuration device.

18. The method of claim 16, wherein the request to register comprises a request for a random number, and responsive to receiving the request for the random number at the network device, sending a random number to the configuration device.

19. The method of claim 13, wherein said determining whether the network device is in the registered state or the unregistered state comprises comparing at least one parameter stored at the network device with a parameter received from the configuration device.

20. The method of claim 13, wherein said transmitting the response to the configuration device further comprises transmitting a network key of the communication network stored at the network device to the configuration device.

21. The method of claim 20, wherein said transmitting the network key of the communication network stored at the network device further comprises transmitting a hashed value of the network key to the configuration device.

22. The method of claim 13, wherein said communication network includes one or more other network devices.

23. The method of claim 13, further comprising:
receiving, at the network device, a request to unregister from the configuration device;
determining whether the network device is in the registered state or the unregistered state;
if determined that the network device is in the registered state,
determining whether the network device is registered with the configuration device that sent the request to unregister; and
if determined that the network device is registered with the configuration device that sent the request to unregister, deleting the at least one key stored in the network device.

24. The method of claim 23, wherein said determining the network device is registered with the configuration device that sent the request to unregister comprises comparing at least one parameter received in the unregistration request with a parameter stored in the network device during a registration operation.

25. The method of claim 23, wherein said determining the network device is registered with the configuration device that sent the request to unregister comprises determining whether an integrity field included in a message received from the configuration device is valid or invalid.

26. A method for using a configuration device to configure a network device, the method comprising:
transmitting, by the configuration device, a message to the network device to initiate registration operations with the network device;
determining whether the network device is in a registered state or an unregistered state with respect to the configuration device and other configurations devices based on at least one parameter received in a response received from the network device;
if determined that the network device is in the unregistered state, sending at least one key to register the network device with the configuration device;
determining whether a network key of the communication network is stored at the network device;
if determined that the network key is stored at the network device, receiving the network key from the network device; and
if determined that the network key is not stored at the network device, sending the network key to the network device for configuring the network device to communicatively connect to a communication network.

27. The method of claim 26, wherein the response from the network device comprises a hashed value of at least one key stored at the network device.

28. The method of claim 26, wherein said determining whether the network device is in the registered state or the unregistered state comprises one or more of:
determining the network device is in the unregistered state when a hashed value of at least one key received from the network device is null;
determining the network device is in the registered state when the hashed value of at least one key received from the network device is not null; and
determining the network device is registered with the configuration device when the hashed value of at least one key received from the network device matches with a hashed value of at least one key stored at the configuration device.

29. The method of claim 26, further comprising, transmitting the message to the network device over a secure short-range communication channel.

30. The method of claim 26, further comprising:
- transmitting, by the configuration device, a second message to the network device to determine whether to unregister the network device;
- determining whether the network device is registered with the configuration device based on at least one parameter received in a second response from the network device; and
- if determined that the network device is registered with the configuration device, sending at least one instruction to unregister the network device.

31. The method of claim 30, wherein the second response from the network device comprises a hashed value of at least one parameter stored at the network device.

32. The method of claim 30, wherein the second response from the network device comprises a status of the network device, wherein the status indicates whether the network device is registered with the configuration device.

33. A configuration device for configuring a network device, the configuration device comprising:
- a network interface;
- a key management unit configured to:
  - initiate pairing operations with the network device via a short-range communication connection with the network device;
  - determine whether the network device is in a registered state or an unregistered state with respect to the configuration device and other configuration devices;
  - if determined that the network device is in the unregistered state,
    - establish a short-range communication channel between the configuration device and the network device; and
    - transmit a network key to the network device via the short-range communication channel for configuring the network device to communicatively connect to a communication network.

34. The configuration device of claim 33, wherein the key management unit is further configured to:
- if determined that the network device is in the unregistered state with respect to the configuration device and other configuration devices,
  - registering the network device with the configuration device.

35. The configuration device of claim 33, if determined that the network device is in the registered state, the key management unit further configured to:
- determine whether the network device is registered with the configuration device or with a different configuration device;
- determine whether to unregister the network device; and
- in response to determining the network device is registered with the configuration device and determining to unregister the network device, transmit at least one message to the network device to unregister the network device over the short-range communication channel.

36. The configuration device of claim 35, wherein the key management unit configured to transmit at least one message to unregister the network device comprises the key management unit configured to transmit at least one instruction to delete data stored during the pairing operations at the network device.

37. The configuration device of claim 33, wherein the key management unit configured to initiate pairing operations with the network device comprises the key management unit configured to one of:
- pair with the network device by exchanging and storing a device identifier of the network device and a plurality of pairing keys; and
- pair with the network device using an asymmetric encryption scheme.

38. The configuration device of claim 37, wherein the key management unit configured to pair with the network device using the asymmetric encryption scheme comprises the key management unit configured to store a public key of the configuration device at the network device.

39. The configuration device of claim 33, wherein the key management unit configured to determine whether the network device is in the registered state or the unregistered state comprises the key management unit configured to:
- transmit a first message including first information from the configuration device to the network device; and
- determine whether the network device is in the registered state or the unregistered state based on a second message received in response to the first message.

40. The configuration device of claim 33, wherein the short-range communication channel comprises a secure short-range communication channel having support for integrity, encryption, and replay protection.

41. A network device of a communication network, the network device comprising:
- a network interface;
- a registration management unit configured to:
  - receive a request to register with a configuration device via a short-range communication connection;
  - determine whether the network device is in a registered state or an unregistered state with respect to the configuration device and other configuration devices;
  - if determined that the network device is in the unregistered state,
    - transmit a response to the configuration device to indicate that the network device is in the unregistered state;
  - establish a short-range communication channel between the network device and the configuration device;
  - receive at least one key from the configuration device over the short-range communication channel to register with the configuration device;
  - receive, from the configuration device over the short-range communication channel, a network key for configuring the network device to communicate over a communication network; and
  - use the network key to communicate over the communication network.

42. The network device of claim 41, wherein the request to register comprises an identifier of the configuration device.

43. The network device of claim 41, wherein the request to register comprises a public key of the configuration device.

44. The network device of claim 41, wherein the short-range communication channel is an out-of-band communication channel using a first frequency band different than a second frequency band used by a communication network.

45. The network device of claim 41, wherein the request to register comprises a random number, and responsive to receiving the random number at the network device, the registration management unit is configured to compute a hashed value of the at least one key stored at the network device and send the hashed value to the configuration device.

46. The network device of claim 41, wherein the request to register comprises a request for a random number, and responsive to receiving the request for the random number at the network device, the registration management unit is configured to send a random number to the configuration device.

47. The network device of claim 41, wherein the registration management unit configured to determine whether the network device is in the registered state or the unregistered state comprises the registration management unit configured to compare at least one parameter stored at the network device with a parameter received from the configuration device.

48. The network device of claim 41, wherein the registration management unit configured to transmit the response to the configuration device further comprises the registration management unit configured to transmit a network key of the communication network stored at the network device to the configuration device.

49. The network device of claim 48, wherein the registration management unit configured to transmit the network key of the communication network stored at the network device further comprises the registration management unit configured to transmit a hashed value of the network key to the configuration device.

50. The network device of claim 41, wherein the registration management unit configured to establish the short-range communication channel comprises the registration management unit configured to perform key agreement, key derivation and key confirmation procedures to establish a secure short-range communication channel.

51. The network device of claim 41, wherein the registration management unit is further configured to:
  receive, at the network device, a request to unregister from the configuration device;
  determine whether the network device is in the registered state or the unregistered state;
  if determined that the network device is in the registered state,
    determine whether the network device is registered with the configuration device that sent the request to unregister; and
    if determined that the network device is registered with the configuration device that sent the request to unregister, delete the at least one key stored in the network device.

52. The network device of claim 51, wherein the registration management unit configured to determine the network device is registered with the configuration device that sent the request to unregister comprises the registration management unit configured to compare at least one parameter received in the unregistration request with a parameter stored in the network device during a registration operation.

53. The network device of claim 51, wherein the registration management unit configured to determine the network device is registered with the configuration device that sent the request to unregister comprises the registration management unit configured to determine whether an integrity field included in a message received from the configuration device is valid or invalid.

54. A configuration device for configuring a network device, the configuration device comprising:
  a network interface;
  a key management unit configured to:
    transmit a message to the network device to initiate registration operations with the network device;
    determine whether the network device is in a registered state or an unregistered state with respect to the configuration device and other configuration devices based on at least one parameter received in a response received from the network device;
    if determined that the network device is in the unregistered state, send at least one key to register the network device with the configuration device;
    determine whether a network key of the communication network is stored at the network device;
    if determined that the network key is stored at the network device, receive the network key from the network device; and
    if determined that the network key is not stored at the network device, send the network key to the network device for configuring the network device to communicatively connect to a communication network.

55. The configuration device of claim 54, wherein the response from the network device comprises a hashed value of at least one key stored at the network device.

56. The configuration device of claim 54, wherein the key management unit configured to determine whether the network device is in the registered state or the unregistered state comprises the key management unit configured to one or more of:
  determine the network device is in the unregistered state when a hashed value of at least one key received from the network device is null;
  determine the network device is in the registered state when the hashed value of at least one key received from the network device is not null; and
  determine the network device is registered with the configuration device when the hashed value of at least one key received from the network device matches with a hashed value of at least one key stored at the configuration device.

57. The configuration device of claim 54, wherein the key management unit is further configured to, transmit the message to the network device over a secure short-range communication channel.

58. The configuration device of claim 54, wherein the key management unit is further configured to:
  transmit, by the configuration device, a second message to the network device to determine whether to unregister the network device;
  determine that the network device is registered with the configuration device based on at least one parameter received in a second response from the network device; and
  if determined that the network device is registered with the configuration device, send at least one instruction to unregister the network device.

59. A non-transitory machine-readable storage media having machine executable instructions stored therein, the machine executable instructions comprising instructions to:
  initiate, by a configuration device, pairing operations with a network device via a short-range communication connection with the network device;
  determine, by the configuration device, whether the network device is in a registered state or an unregistered state with respect to the configuration device and other configuration devices;
  if determined that the network device is in the unregistered state,
    establish a short-range communication channel between the configuration device and the network device; and
    transmit a network key to the network device via the short-range communication channel for configuring the network device to communicatively connect to a communication network.

60. The non-transitory machine-readable storage media of claim 59, wherein the instructions further comprise instructions to:

if determined that the network device is in the unregistered state with respect to the configuration device and other configuration devices,
register the network device with the configuration device.

61. The non-transitory machine-readable storage media of claim 59, wherein said instructions further comprise instructions to, if determined that the network device is in the registered state:
determine whether the network device is registered with the configuration device or with a different configuration device;
determine whether to unregister the network device; and
in response to determining the network device is registered with the configuration device and determining to unregister the network device, transmit at least one message to the network device to unregister the network device over the short-range communication channel.

62. The non-transitory machine-readable storage media of claim 61, wherein said instructions to transmit at least one message to unregister the network device comprises instructions to transmit at least one instruction to delete data stored during the pairing operations at the network device.

63. A non-transitory machine-readable storage media having machine executable instructions stored therein, the machine executable instructions comprising instructions to:
transmit, by a configuration device, a message to a network device to initiate registration operations with the network device;
determine whether the network device is in a registered state or an unregistered state with respect to the configuration device and other configuration devices based on at least one parameter received in a response received from the network device;
if determined that the network device is in the unregistered state, send at least one key to register the network device with the configuration device;
determine whether a network key of the communication network is stored at the network device;
if determined that the network key is stored at the network device, receive the network key from the network device; and
if determined that the network key is not stored at the network device, send the network key to the network device for configuring the network device to communicatively connect to a communication network.

64. The non-transitory machine-readable storage media of claim 63, wherein the response from the network device comprises a hashed value of at least one key stored at the network device.

65. The non-transitory machine-readable storage media of claim 63, wherein said instructions to determine whether the network device is in the registered state or the unregistered state comprise one or more of:
instructions to determine the network device is in the unregistered state when a hashed value of at least one key received from the network device is null;
instructions to determine the network device is in the registered state when the hashed value of at least one key received from the network device is not null; and
instructions to determine the network device is registered with the configuration device when the hashed value of at least one key received from the network device matches with a hashed value of at least one key stored at the configuration device.

66. The non-transitory machine-readable storage media of claim 63, wherein the instructions to transmit the message to the network device to initiate registration operations with the network device further comprise instructions to transmit the message over a secure short-range communication channel.

67. The non-transitory machine-readable storage media of claim 63, wherein the instructions further comprise instructions to:
transmit, by the configuration device, a second message to the network device to determine whether to unregister the network device;
determine whether the network device is registered with the configuration device based on at least one parameter received in a second response from the network device; and
if determined that the network device is registered with the configuration device, send at least one instruction to unregister the network device.

68. A configuration device for configuring a network device, the configuration device comprising:
means for initiating pairing operations with the network device via a short-range communication connection with the network device;
means for determining whether the network device is in a registered state or an unregistered state with respect to the configuration device and other configuration devices;
if determined that the network device is in the unregistered state,
means for establishing a short-range communication channel between the configuration device and the network device; and
means for transmitting a network key to the network device via the short-range communication channel for configuring the network device to communicatively connect to a communication network.

* * * * *